(12) United States Patent  (10) Patent No.: US 11,470,537 B2
Kim et al.  (45) Date of Patent: Oct. 11, 2022

(54) CELL ACCESS METHOD OF TERMINAL IN WIRELESS COMMUNICATION SYSTEM, AND APPARATUS THEREFOR

(71) Applicant: LG ELECTRONICS INC., Seoul (KR)

(72) Inventors: Jaehyung Kim, Seoul (KR); Seonwook Kim, Seoul (KR); Changhwan Park, Seoul (KR); Seokmin Shin, Seoul (KR); Joonkui Ahn, Seoul (KR); Suckchel Yang, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 54 days.

(21) Appl. No.: 17/267,432

(22) PCT Filed: Aug. 12, 2019

(86) PCT No.: PCT/KR2019/010219
§ 371 (c)(1),
(2) Date: Feb. 9, 2021

(87) PCT Pub. No.: WO2020/032771
PCT Pub. Date: Feb. 13, 2020

(65) Prior Publication Data
US 2021/0329533 A1      Oct. 21, 2021

Related U.S. Application Data

(60) Provisional application No. 62/755,378, filed on Nov. 2, 2018.

(30) Foreign Application Priority Data

Aug. 10, 2018   (KR) .......................... 10-2018-0093970

(51) Int. Cl.
*H04W 4/00*     (2018.01)
*H04W 48/02*    (2009.01)
(Continued)

(52) U.S. Cl.
CPC ............. *H04W 48/02* (2013.01); *H04W 4/70* (2018.02); *H04W 48/12* (2013.01)

(58) Field of Classification Search
CPC ........ H04W 48/02; H04W 4/70; H04W 48/12
(Continued)

(56) References Cited

U.S. PATENT DOCUMENTS

2013/0301552 A1* 11/2013 Xu ...................... H04W 72/042
                                                         370/329
2014/0198726 A1*  7/2014 Xu ........................ H04W 28/06
                                                         370/328
(Continued)

FOREIGN PATENT DOCUMENTS

WO    2013112019    8/2013
WO    2014126421    8/2014
(Continued)

OTHER PUBLICATIONS

PCT International Application No. PCT/KR2019/010219, International Search Report dated Dec. 16, 2019, 3 pages.
(Continued)

*Primary Examiner* — Mark G. Pannell
(74) *Attorney, Agent, or Firm* — Lee, Hong, Degerman, Kang & Waimey PC

(57) ABSTRACT

A cell access method of a terminal in a wireless communication system, and an apparatus therefor are disclosed. Particularly, provided is a cell access method by which a terminal supports standalone machine type communication (sMTC) in a wireless communication system, comprising the steps of: receiving, from a base station, one from among
(Continued)

a plurality of system information blocks (SIBs), wherein the one SIB includes first instruction information related to the blocking of cell access of terminals for supporting services other than the sMTC; performing the cell access; and performing, on the basis of the first instruction information, a specific operation related to the sMTC when the cell does not permit the cell access of the terminals for supporting services other than the sMTC.

17 Claims, 22 Drawing Sheets

(51) Int. Cl.
*H04W 4/70* (2018.01)
*H04W 48/12* (2009.01)
(58) Field of Classification Search
USPC ........................................................ 455/434
See application file for complete search history.

(56) References Cited

U.S. PATENT DOCUMENTS

2020/0178190 A1* 6/2020 Chen .................. H04W 72/005
2020/0252858 A1* 8/2020 Wang .................... H04W 48/10
2021/0314851 A1* 10/2021 Ratasuk ................ H04L 5/0048

FOREIGN PATENT DOCUMENTS

WO    2015026098    2/2015
WO    2017196056    11/2017

OTHER PUBLICATIONS

Nokia et al., "Cell access impact of CRS muting in eMTC," 3GPP TSG-RAN WG2 Meeting #102, R2-1807681, May 2018, 2 pages.

* cited by examiner

1000(102/106, 202/206)

CELL ACCESS METHOD OF TERMINAL IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2019/010219, filed on Aug. 12, 2019, which claims the benefit of KR application No. 10-2018-0093970, filed on Aug. 10, 2018, U.S. Provisional Application 62/755,378, filed on Nov. 2, 2018, the contents of which are all hereby incorporated by reference herein in their entirety.

TECHNICAL FIELD

The present disclosure relates to a wireless communication system, and more particularly to a cell access method of a terminal and an apparatus therefor.

BACKGROUND ART

Mobile communication systems were developed to ensure user activity and provide voice service. However, mobile communication systems have extended their range to data service as well as voice, and currently the explosive increase in traffic is causing a lack of resources and there is a users' demand for faster services, which is creating a need for advanced mobile communication systems.

The requirements for next-generation mobile communication systems largely include coping with explosive data traffic, very high data rates per user, coping with a surprisingly large number of connected devices, very low end-to-end latency, and support for high energy efficiency. To this end, research is ongoing on a variety of technologies such as dual connectivity, massive MIMO (massive multiple input multiple output), in-band full duplex, NOMA (non-orthogonal multiple access), support for super wideband, and device networking.

DISCLOSURE

Technical Problem

Furthermore, in this disclosure, the specific pattern includes one or more different OFDM symbols among the specific number of OFDM symbols based on that some of the specific number of OFDM symbols are copied to the LTE control region, and wherein the one or more different OFDM symbols are arranged in a random order within the specific pattern.

Furthermore, in this disclosure, the method may further comprise: receiving configuration information of a DRX (discontinuous reception) mode from the base station, wherein the first indication information is received during a listening interval of the DRX mode.

Another exemplary embodiment of the present disclosure provides a method for accessing a cell of terminal in a wireless communication system, which is performed by a base station, the method comprising: transmitting one system information block (SIB) among a plurality of SIBs to the terminal, wherein the one SIB includes first instruction information related to barring cell access of terminals supporting services other than the sMTC; performing the cell access with the terminal, wherein the terminal performs a specific operation related to the sMTC, based on that the cell does not permit the cell access of the terminals supporting other services than the sMTC based on the first instruction information.

Another exemplary embodiment of the present disclosure provides a terminal for performing cell access by a base station in a wireless communication system, the terminal comprising: a transmitter for transmitting a radio signal; a receiver for receiving the radio signal; and a processor functionally connected to the transmitter and the receiver, wherein the processor controls to: receive one system information block (SIB) among a plurality of SIBs from a base station, wherein the one SIB includes first instruction information related to barring cell access of terminals supporting services other than the sMTC; perform the cell access; and perform a specific operation related to the sMTC, based on that the cell does not permit the cell access of the terminals supporting other services than the sMTC based on the first instruction information.

Advantageous Effects

The present invention has the advantage of supporting cell access from a terminal in a wireless communication system.

Another advantage of the present disclosure is to support cell access from an sMTC (standalone Machine Type Communication) terminal in a wireless communication system.

Another advantage of the present disclosure is to properly bar cell access from Non-sMTC terminals other than an sMTC (standalone Machine Type Communication) terminal in a wireless communication system.

Another advantage of the present disclosure is that the same cell supports both an sMTC (standalone Machine Type Communication) and Non-sMTC terminals in a wireless communication system.

Advantages which may be obtained in this disclosure are not limited to the aforementioned advantages, and various other advantages may be evidently understood by those skilled in the art to which the present disclosure pertains from the following description.

DESCRIPTION OF DRAWINGS

The accompanying drawings, which are included as part of the detailed description in order to help understanding regarding the present disclosure, provide embodiments of the present disclosure and describe the technical characteristics of the present disclosure along with the detailed description.

MODE FOR INVENTION

Figure 1:
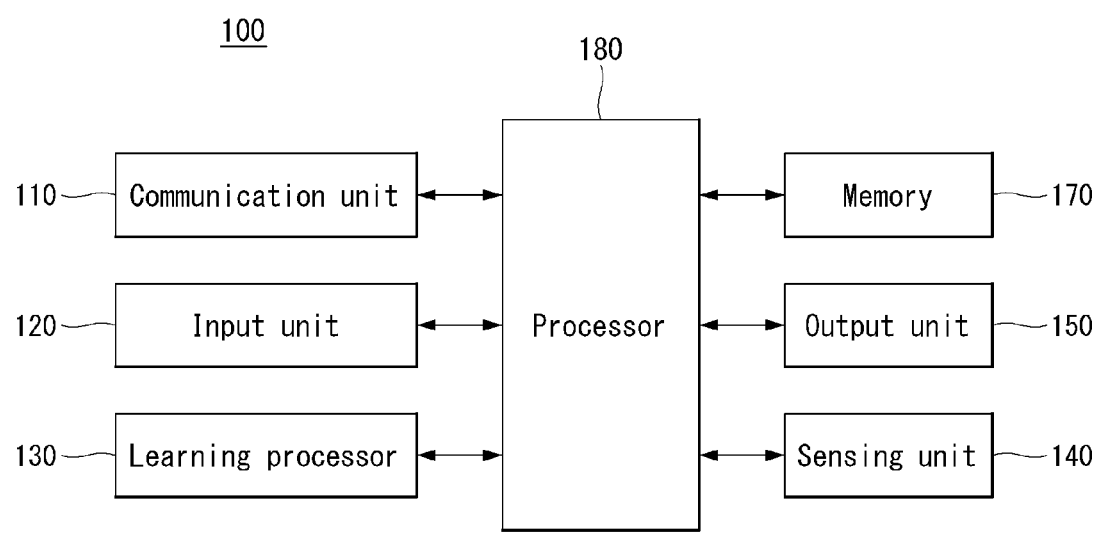
FIG. 1 illustrates an AI device according to an embodiment of the present disclosure.

Reference will now be made in detail to the preferred embodiments of the present disclosure, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present disclosure. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present disclosure.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and these specific terms may be replaced with other terms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as Universal Terrestrial Radio Access (UTRA) or CDMA2000. The TDMA may be implemented with a radio technology such as Global System for Mobile communications (GSM)/General Packet Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink and employs the SC-FDMA in uplink. LTE-advanced (LTE-A) is an evolution of the 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

For clarity, this application focuses on the 3GPP LTE/LTE-A. However, technical features of the present disclosure are not limited thereto.

<5G Scenario>

The three main requirements areas of 5G are: (1) Enhanced Mobile Broadband (eMBB) area, (2) massive Machine Type Communication (mMTC) area, and (3) ultra-reliability and It includes the area of Ultra-reliable and Low Latency Communications (URLLC).

Some use cases may require multiple areas for optimization, and other use cases may be focused on only one key performance indicator (KPI). 5G supports these various use cases in a flexible and reliable way.

eMBB goes far beyond basic mobile Internet access and covers media and entertainment applications in rich interactive work, cloud or augmented reality. Data is one of the key drivers of 5G and may not see dedicated voice services for the first time in the 5G era. In 5G, voice is expected to be treated as an application simply using the data connection provided by the communication system. The main reasons for the increased traffic volume are the increase in content size and the increase in the number of applications requiring high data rates. Streaming services (audio and video), interactive video, and mobile Internet connections will become more popular as more devices connect to the Internet. Many of these applications require always-on connectivity to push real-time information and notifications to the user. Cloud storage and applications are growing rapidly in mobile communication platforms, which can be applied to both work and entertainment. And, cloud storage is a special use case that drives the growth of uplink data rates. 5G is also used for remote tasks in the cloud and requires much lower end-to-end delays to maintain a good user experience when tactile interfaces are used. Entertainment, for example, cloud gaming and video streaming are another key factor in increasing the need for mobile broadband capabilities. Entertainment is essential in smartphones and tablets anywhere, including in high mobility environments such as trains, cars and airplanes. Another use case is augmented reality and information retrieval for entertainment. Here, augmented reality requires very low latency and instantaneous amount of data.

In addition, one of the most anticipated 5G use cases relates to the ability to seamlessly connect embedded sensors in all applications, namely mMTC. By 2020, potential IoT devices are expected to reach 20.4 billion. Industrial IoT is one of the areas where 5G plays a major role in enabling smart cities, asset tracking, smart utilities, agriculture and security infrastructure.

URLLC includes new services that will change the industry through links with ultra-reliability/low latency, such as remote control of key infrastructure and self-driving vehicles. The level of reliability and latency is essential for smart grid control, industrial automation, robotics, and drone control and coordination.

Next, a number of use cases will be described in more detail.

5G can complement fiber-to-the-home (FTTH) and cable-based broadband (or DOCSIS) as a means of providing streams that are rated at hundreds of megabits per second to gigabits per second. This high speed is required to deliver TVs in 4K and above (6K, 8K and above) resolutions as well as virtual and augmented reality. Virtual Reality (AVR) and Augmented Reality (AR) applications include nearly immersive sporting events. Certain applications may require special network settings. For example, for VR games, game companies may need to integrate core servers with network operator's edge network servers to minimize latency.

Automotive is expected to be an important new driver for 5G, with many examples for mobile communications to vehicles. For example, entertainment for passengers requires simultaneous high capacity and high mobility mobile broadband. This is because future users continue to expect high quality connections regardless of their location and speed. Another use case in the automotive field is augmented reality dashboards. It identifies objects in the dark above what the driver sees through the front window and overlays information that tells the driver about the distance and movement of the object. In the future, wireless modules enable communication between vehicles, the exchange of information between the vehicle and the supporting infrastructure, and the exchange of information between the vehicle and other connected devices (e.g., devices carried by pedestrians). Safety systems guide alternative courses of action to help drivers drive safer, reducing the risk of an accident. The next step will be a remotely controlled or self-driven vehicle. This is very reliable and requires very fast communication between different self-driving vehicles and between automobiles and infrastructure. In the future, self-driving vehicles will perform all driving activities, and drivers will focus on traffic anomalies that the vehicle itself cannot identify. The technical requirements of self-driving vehicles require ultra-low latency and ultra-fast reliability to increase traffic safety to an unachievable level.

Smart cities and smart homes, referred to as smart societies, will be embedded in high-density wireless sensor networks. The distributed network of intelligent sensors will identify the conditions for cost and energy-efficient maintenance of the city or home. Similar settings can be made for each hypothesis. Temperature sensors, window and heating controllers, burglar alarms and appliances are all connected wirelessly. Many of these sensors are typically low data rates, low power and low cost. However, for example, real-time HD video may be required in certain types of devices for surveillance.

The consumption and distribution of energy, including heat or gas, is highly decentralized, requiring automated control of distributed sensor networks. Smart grids interconnect these sensors using digital information and communication technologies to gather information and act accordingly. This information can include the behavior of suppliers and consumers, allowing smart grids to improve the distribution of fuels such as electricity in efficiency, reliability, economics, sustainability of production, and in an automated manner. Smart Grid can be viewed as another sensor network with low latency.

The health sector has many applications that can benefit from mobile communications. The communication system may support telemedicine that provides clinical care from a distance. This can help reduce barriers to distance and improve access to healthcare services that are not consistently available in remote rural areas. It is also used to save lives in critical care and emergencies. A mobile communication based wireless sensor network can provide remote monitoring and sensors for parameters such as heart rate and blood pressure.

Wireless and mobile communications are becoming increasingly important in industrial applications. Wiring is expensive to install and maintain. Thus, the possibility of replacing the cables with reconfigurable wireless links is an attractive opportunity in many industries. However, achieving this requires that the wireless connection operates with similar cable delay, reliability, and capacity, and that management is simplified. Low latency and very low error probability are new requirements that need to be connected in 5G.

Logistics and freight tracking are important use cases for mobile communications that enable the tracking of inventory and packages from anywhere using a location-based information system. The use of logistics and freight tracking typically requires low data rates but requires wide range and reliable location information.

<Artificial Intelligence (AI)>

Artificial intelligence refers to the field of researching artificial intelligence or the methodology that can produce it, and machine learning refers to the field of researching methodologies to define and solve various problems dealt with in the field of artificial intelligence. Machine learning is defined as an algorithm that improves the performance of a task through a consistent experience with a task.

Artificial Neural Network (ANN) is a model used in machine learning, and may refer to an overall problem-solving model composed of artificial neurons (nodes) networked by synapses. The artificial neural network may be defined by a connection pattern between neurons of different layers, a learning process of updating model parameters, and an activation function generating an output value.

The artificial neural network may include an input layer, an output layer, and optionally one or more hidden layers. Each layer contains one or more neurons, and the artificial neural network may include synapses that connect neurons to neurons. In an artificial neural network, each neuron may output a function value of an active function for input signals, weights, and deflections input through a synapse.

The model parameter refers to a parameter determined through learning and includes weights of synaptic connections and deflection of neurons. In addition, the hyperparameter means a parameter to be set before learning in the machine learning algorithm, and includes a learning rate, the number of iterations, a mini batch size, and an initialization function.

The purpose of learning artificial neural networks can be seen as determining model parameters that minimize the loss function. The loss function can be used as an index for determining optimal model parameters in the learning process of artificial neural networks.

Machine learning can be categorized into supervised learning, unsupervised learning, and reinforcement learning.

Supervised learning refers to a method of training artificial neural networks with a given label for training data, and a label indicates a correct answer (or result value) that the artificial neural network should infer when the training data is input to the artificial neural network. Unsupervised learning may refer to a method of training artificial neural networks in a state where a label for training data is not given. Reinforcement learning can mean a learning method that allows an agent defined in an environment to learn to choose an action or sequence of actions that maximizes cumulative reward in each state.

Machine learning, which is implemented as a deep neural network (DNN) including a plurality of hidden layers among artificial neural networks, is called deep learning (Deep Learning), which is part of machine learning. In the following, machine learning is used to mean deep learning.

<Robot>

A robot can mean a machine that automatically handles or operates a given task by its own ability. In particular, a robot having a function of recognizing the environment, judging itself, and performing an operation may be referred to as an intelligent robot.

Robots can be classified into industrial, medical, household, military, etc. according to the purpose or field of use.

The robot may include a driving unit including an actuator or a motor to perform various physical operations such as moving a robot joint. In addition, the movable robot includes a wheel, a brake, a propeller, and the like in the driving unit, and can travel on the ground or fly in the air through the driving unit.

<Self-Driving (Autonomous-Driving)>

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

eXtended Reality (XR)

eXtended Reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 illustrates an AI device 100 according to an embodiment of the present disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, a memory 170, and a processor 180.

The communication unit 110 may transmit and receive data to and from external devices, such as other AI devices 100a to 100e or an AI server 200, using wired and wireless communication technologies. For example, the communication unit 110 may transmit and receive sensor information, a user input, a learning model, and a control signal to and from external devices.

Examples of communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

The input unit 120 may include a camera for an image signal input, a microphone for receiving an audio signal, a user input unit for receiving information from a user, etc. Herein, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 180 may control at least some of the elements of the AI device 100 in order to run an application program stored in the memory 170. Moreover, the processor 180 may combine and drive two or more of the elements included in the AI device 100 in order to run the application program.

Figure 2:
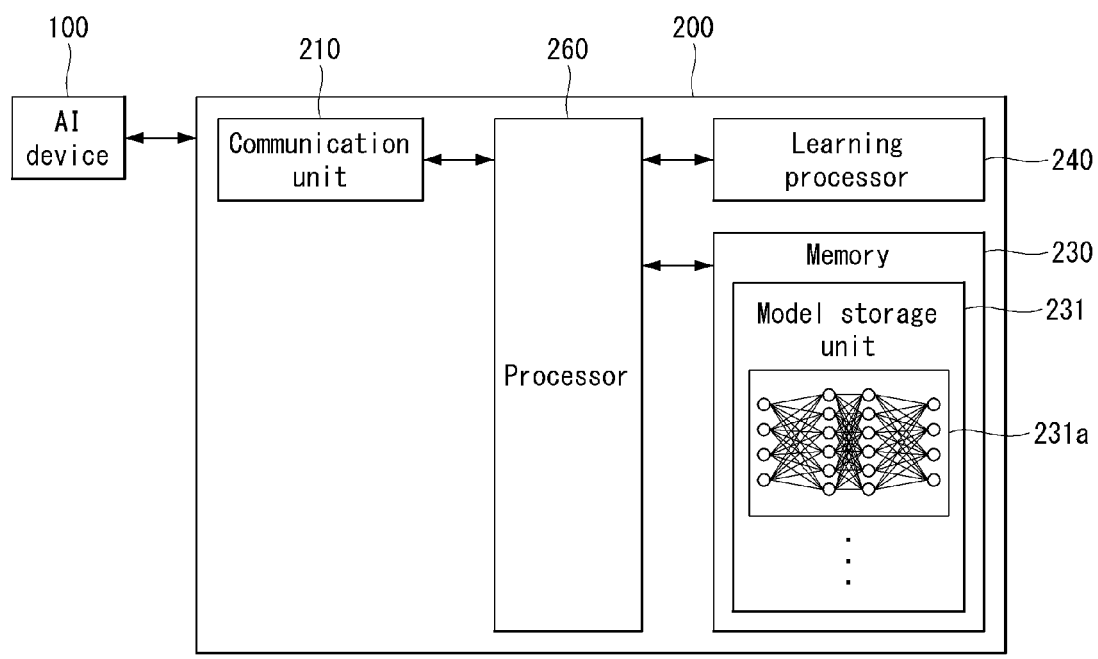
FIG. 2 illustrates an AI server according to an embodiment of the present disclosure.

FIG. 2 illustrates an AI server 200 according to an embodiment of the present disclosure.

Referring to FIG. 2, the AI server 200 may mean a device which is trained by an artificial neural network using a machine learning algorithm or which uses a trained artificial neural network. Herein, the AI server 200 consists of a plurality of servers and may perform distributed processing and may be defined as a 5G network. Further, the AI server 200 may be included as a partial configuration of the AI device 100 and may perform at least some of AI processing.

The AI server 200 may include a communication unit 210, a memory 230, a learning processor 240, and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If a part or all of the learning model is implemented as software, one or more instructions configuring the learning model may be stored in the memory 230.

The processor 260 may deduce a result value of new input data using the learning model, and may generate a response or control command based on the deduced result value.

Figure 3:
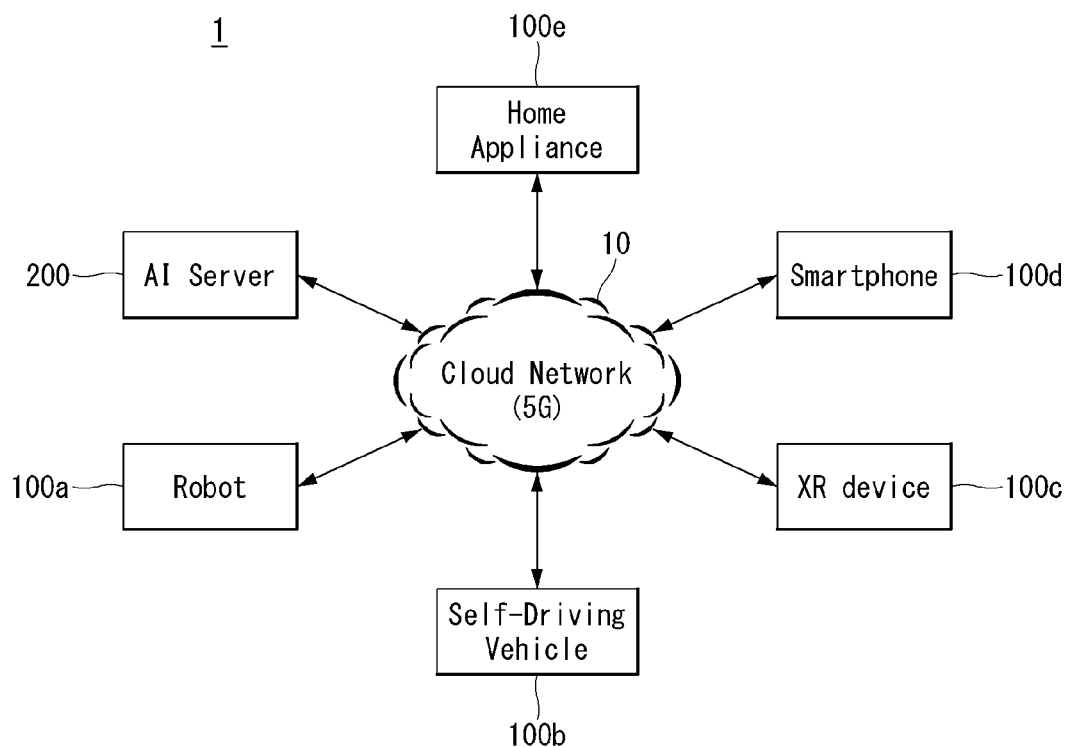
FIG. 3 illustrates an AI system according to an embodiment of the present disclosure.

FIG. 3 illustrates an AI system 1 according to an embodiment of the present disclosure.

Referring to FIG. 3, the AI system 1 is connected to at least one of the AI server 200, a robot 100a, a self-driving vehicle 100b, an XR device 100c, a smartphone 100d or a home appliance 100e over a cloud network 10. In this case, the robot 100a, the self-driving vehicle 100b, the XR device 100c, the smartphone 100d, or the home appliance 100e to which the AI technology has been applied may be called AI devices 100a to 100e.

The cloud network 10 may constitute part of a cloud computing infrastructure or may mean a network present within the cloud computing infrastructure. Here, the cloud network 10 may be configured using the 3G network, the 4G or long-term evolution (LTE) network or the 5G network.

That is, the devices 100a to 100e and 200 constituting the AI system 1 may be interconnected over the cloud network 10. Particularly, the devices 100a to 100e and 200 may communicate with one another through a base station, but also may communicate directly with one another without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various implementations of the AI devices 100a to 100e to which the above-described technology is applied are described. In this case, the AI devices 100a to 100e shown in FIG. 3 may be considered to be detailed implementations of the AI device 100 shown in FIG. 1.

<AI+Robot>

The robot 100a may be implemented as a guidance robot, a transportation robot, a cleaning robot, a wearable robot, an entertainment robot, a pet robot, an unmanned aerial robot, etc., to which the AI technology is applied.

The robot 100a may comprise a robot control module for controlling tasks. The robot control module may mean a software module or a chip in which a software module is implemented using hardware.

The robot 100a may obtain status information of the robot 100a, detect (recognize) a surrounding environment and objects, create map data, determine its movement path and travel plan, determine a response to a user interaction, or determine a task, by using sensor information obtained from various kinds of sensors.

Here, the robot 100a may use sensor information obtained from at least one sensor among lidar, radar, and a camera, in order to determine its movement path and travel plan.

The robot 100a may perform the above tasks by using a learning model consisting of at least one artificial neural network. For example, the robot 100a may recognize a surrounding environment and objects by using a learning model, and determine a task by using information on the recognized surrounding environment information or objects. Here, the learning model may be trained directly on the robot 100a, or may be trained on an external device, such as the AI server 200.

The robot 100a may perform a task by generating results directly by using the learning model, or may perform a task by transmitting sensor information to an external device, such as the AI server 200, and receiving results generated from it.

The robot 100a may determine its movement path and travel plan by using at least one among map data, object information detected from sensor information, and object information obtained from an external device. The robot 100a may travel according to the determined movement path and travel plan by controlling the driving unit.

The map data may include object identification information for various objects disposed in a space in which the robot 100a moves. For example, the map data may include object identification information for fixed objects, such as walls and doors, and movable objects, such as flowerpots and desks. Moreover, the object identification information may include name, type, distance, location, etc.

Moreover, the robot 100a may perform a task or travel by controlling the driving unit based on the user's control/interaction. At this point, the robot 100a may obtain information on the intent of the interaction according to the user's motion or speech utterance and perform a task by determining a response based on the obtained intention information.

<AI+Autonomous Driving>

The self-driving vehicle 100b may be implemented as a mobile robot, a vehicle, an unmanned aerial vehicle, etc., to which the AI technology is applied.

The self-driving vehicle 100b may comprise an autonomous driving control module for controlling the autonomous driving function, and the autonomous driving control module may mean a software module or a chip that implements the software module in hardware. The autonomous driving control module may be internally included as a component of the autonomous driving vehicle 100b, or may be configured as a separate piece of hardware and connected to the outside of the autonomous driving vehicle 100b.

The self-driving vehicle 100b may obtain status information of the self-driving vehicle 100b by using sensor information obtained from various types of sensors, detect (recognize) a surrounding environment and objects, generate map data, determine its movement path and travel plan, or determine an operation.

Like the robot 100*a*, the self-driving vehicle 100*b* may use sensor information obtained by at least one sensor among lidar, radar, and a camera, in order to determine its movement path and travel plan.

In particular, the self-driving vehicle 100*b* may recognize an environment or object in an area hidden from view or an area extending a certain distance or longer by receiving sensor information from external devices, or may receive recognized information directly from external devices.

The self-driving vehicle 100*b* may perform the above tasks by using a learning model consisting of at least one artificial neural network. For example, the self-driving vehicle 100*b* may recognize a surrounding environment and objects by using a learning model, and determine the course of travel by using the recognized surrounding environment information or object information. Here, the learning model may be trained directly on the self-driving vehicle 100*b*, or may be trained on an external device, such as the AI server 200.

The self-driving vehicle 100*b* may perform a task by generating results directly by using the learning model, or may perform a task by transmitting sensor information to an external device, such as the AI server 200, and receiving results generated from it.

The self-driving vehicle 100*b* may determine its movement path and travel plan by using at least one among map data, object information detected from sensor information, and object information obtained from an external device. The self-driving vehicle 100*b* may travel according to the determined movement path and travel plan by controlling the driving unit.

The map data may include object identification information for various objects disposed in a space (e.g., road) in which the self-driving vehicle 100*b* travels. For example, the map data may include object identification information for fixed objects, such as streetlights, rocks, and buildings, and movable objects, such as vehicles and pedestrians. Moreover, the object identification information may include name, type, distance, location, etc.

Moreover, the self-driving vehicle 100*b* may perform a task or travel by controlling the driving unit based on the user's control/interaction. In this case, the self-driving vehicle 100*b* may obtain information about the intent of the interaction via the user's motion or speech utterance and determine a response based on the obtained intention information and perform the task.

<AI+XR>

The XR device 100*c* may be implemented as a HUD (head-up display), television, a mobile phone, a smartphone, a computer, a wearable device, a home appliance, a digital signage, a vehicle, a stationary robot, or a mobile robot, to which the AI technology is applied.

The XR device 100*c* may obtain information on a surrounding space or real-world object by analyzing three-dimensional point cloud data or image data obtained through various sensors or from an external device and creating location data and attribute data for three-dimensional points, and may render and output an XR object. For example, the XR device 100*c* may output an XR object containing additional information on a recognized object by matching it to the recognized object.

The XR device 100*c* may perform the above tasks by using a learning model consisting of at least one artificial neural network. For instance, the XR device 100*c* may recognize a real-world object from three-dimensional point cloud data or image data by using a learning model, and provide information corresponding to the recognized real-world object. Here, the learning model may be trained directly on the XR device 100*c* or trained on an external device such as the AI server 200.

The XR device 100*c* may perform a task by generating results directly by using the learning model, or may perform a task by transmitting sensor information to an external device, such as the AI server 200, and receiving results generated from it.

<AFRobot+Autonomous Driving>

The robot 100*a* may be implemented as a guidance robot, a transportation robot, a cleaning robot, a wearable robot, an entertainment robot, a pet robot, or an unmanned aerial robot, to which the AI technology and the autonomous driving technology are applied.

The robot 100*a* to which the AI technology and the autonomous driving technology are applied may mean a robot 100*a* with autonomous driving functionality or a robot 100*a* that interacts with a self-driving vehicle 100*b*.

The robot 100*a* with autonomous driving functionality may collectively refer to devices that move on their own along a given route without user control or move along a route determined by themselves.

The robot 100*a* with autonomous driving functionality and the self-driving vehicle 100*b* may use a common sensing method to determine one or more between a movement path and a travel plan. For example, the robot 100*a* with autonomous driving functionality and the self-driving vehicle 100*b* may determine one or more between a movement path and a travel plan by using information sensed by lidar, radar, and a camera.

The robot 100*a* interacting with the self-driving vehicle 100*b* may exist separately from the self-driving vehicle 100*b* and, at the same time, may be associated with the autonomous driving function inside or outside the self-driving vehicle 100*b*, or may perform a task associated with a user riding in the self-driving vehicle 100*b*.

In this case, the robot 100*a* interacting with the self-driving vehicle 100*b* may acquire sensor information in place of the self-driving vehicle 100*b* and provide it to the self-driving vehicle 100*b*, or may acquire sensor information, create information on the surrounding environment or objects, and provide it to the self-driving vehicle 100*b*, thereby controlling or assisting the autonomous driving function of the self-driving vehicle 100*b*.

Alternatively, the robot 100*a*, while interacting with the self-driving vehicle 100*b*, may control the functions of the self-driving vehicle 100*b* by monitoring a user riding in the self-driving vehicle 100*b* or interacting with the user. For instance, if the driver is deemed dozing off, the robot 100*a* may enable the autonomous driving function of the self-driving vehicle 100*b* or assist in controlling the driving unit of the self-driving vehicle 100*b*. Here, the functions of the self-driving vehicle 100*b* controlled by the robot 100*a* may include functions provided by a navigation system or audio system provided inside the self-driving vehicle 100*b*, as well as the autonomous driving function.

Alternatively, the robot 100*a* outside the self-driving vehicle 100*b*, which is interacting with the self-driving vehicle 100*b*, may provide information to the self-driving vehicle 100*b* or assist the functions of the self-driving vehicle 100*b*. For instance, the robot 100*a* may provide traffic information including signaling information to the self-driving vehicle 100*b*, like smart traffic lights do, or may automatically connect an electricity charger to a socket by interacting with the self-driving vehicle 100*b*, like an automatic electricity charger of an electric vehicle does.

<AI+Robot+XR>

The robot 100a may be implemented as a guidance robot, a transportation robot, a cleaning robot, a wearable robot, an entertainment robot, a pet robot, an unmanned aerial robot, or a drone, to which the AI technology and the XR technology are applied.

The robot 100a to which the XR technology is applied may mean a robot that is controlled and interacted with within an XR image. In this case, the robot 100a is distinct from the XR device 100c, and may interface with it.

Once the robot 100a that is controlled and interacted with within an XR image obtains sensor information from sensors including a camera, the robot 100a or XR device 100c may generate an XR image based on the sensor information, and the XR device 100c may output the generated XR image. Also, such a robot 100a may operate based on a control signal fed through the XR device 100c or based on user interaction.

For example, the user may see an XR image from the point of view of a remotely connected robot 100a through an external device such as the XR device 100c, and may adjust the robot 100a's autonomous driving route via interaction, control tasks or driving, and see information on surrounding objects.

<AI+Autonomous Driving+XR>

The self-driving vehicle 100b may be implemented as a mobile robot, a vehicle, or an unmanned aerial vehicle, to which the AI technology and the XR technology are applied.

The self-driving vehicle 100b to which the XR technology is applied may mean a self-driving vehicle equipped with a means for providing an XR image or a self-driving vehicle that is controlled and interacted with within an XR image. Particularly, the self-driving vehicle 100b that is controlled and interacted with within an XR image is distinct from the XR device 100c, and may interface with it.

The self-driving vehicle 100b equipped with a means for providing an XR image may obtain sensor information from sensors including a camera, and output a generated XR image based on the obtained sensor information. For instance, the self-driving vehicle 100b may provide an XR object corresponding to a real-world object or on-screen object to a passenger by having an HUD and outputting an XR image on it.

In this instance, when an XR object is outputted on the HUD, at least part of the XR object may overlap a real object where the passenger's gaze is directed. On the other hand, when an XR object is outputted on a display provided inside the self-driving vehicle 100b, at least part of the XR object may overlap an on-screen object. For example, the self-driving vehicle 100b may output XR objects corresponding to objects such as driveways, other vehicles, traffic lights, traffic signs, two-wheel vehicles, pedestrians, buildings, etc.

Once the self-driving vehicle 100b that is controlled and interacted with within an XR image obtains sensor information from sensors including a camera, the self-driving vehicle 100b or XR device 100c may generate an XR image based on the sensor information, and the XR device 100c may output the generated XR image. Also, such a self-driving vehicle 100b may operate based on a control signal fed through an external device such as the XR device 100c or based on user interaction.

<LTE System in General>

Figure 4:
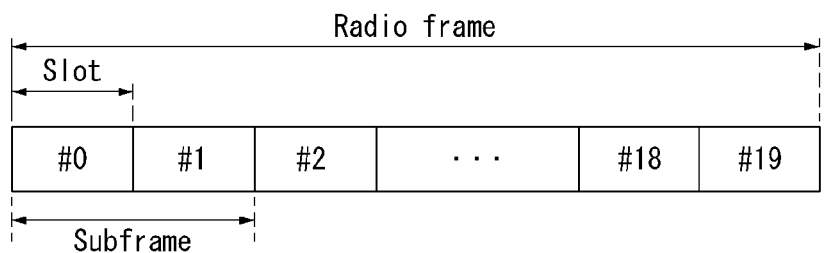
FIG. 4 is a diagram showing an example of an LTE radio frame structure.

FIG. 4 is a diagram showing an example of an LTE radio frame structure.

In FIG. 4, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

Figure 5:
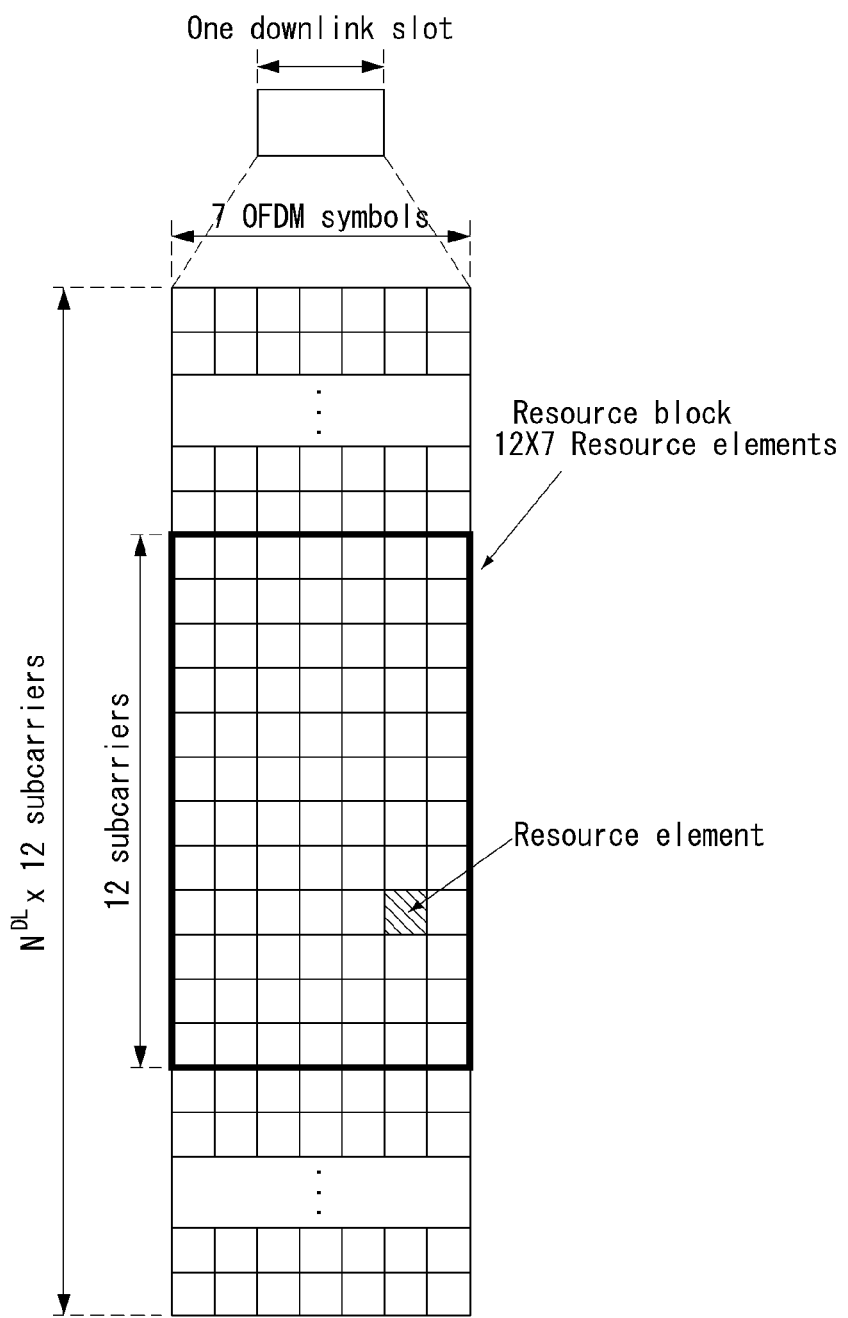
FIG. 5 is a diagram showing an example of a resource grid for a downlink slot.

FIG. 5 is a diagram showing an example of a resource grid for a downlink slot.

In FIG. 5, a downlink slot includes a plurality of OFDM symbols in time domain. It is described herein that one downlink slot includes 7 OFDM symbols, and one resource block (RB) includes 12 subcarriers in frequency domain as an example. However, the present disclosure is not limited thereto. Each element on the resource grid is referred to as a resource element (RE). One RB includes 12×7 REs. The number $N_{DL}$ of RBs included in the downlink slot depends on a downlink transmit bandwidth. The structure of an uplink slot may be same as that of the downlink slot.

Figure 6:
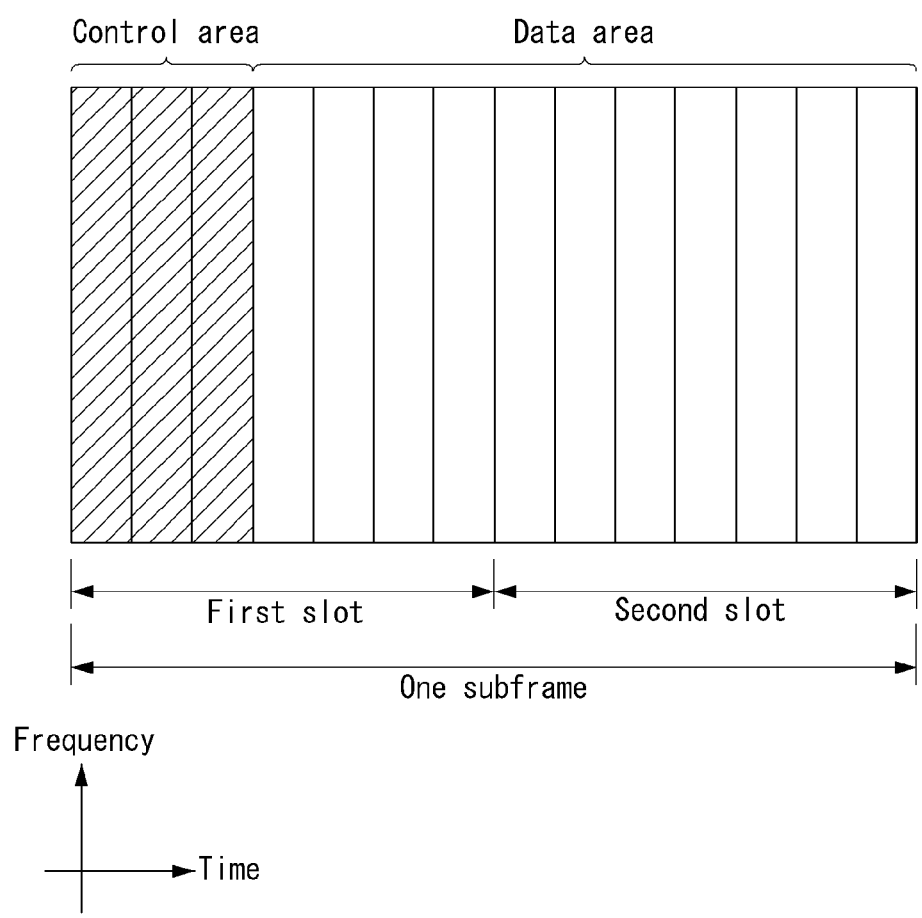
FIG. 6 shows an example of a downlink subframe structure.

FIG. 6 shows an example of a downlink subframe structure.

In FIG. 6, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 7:
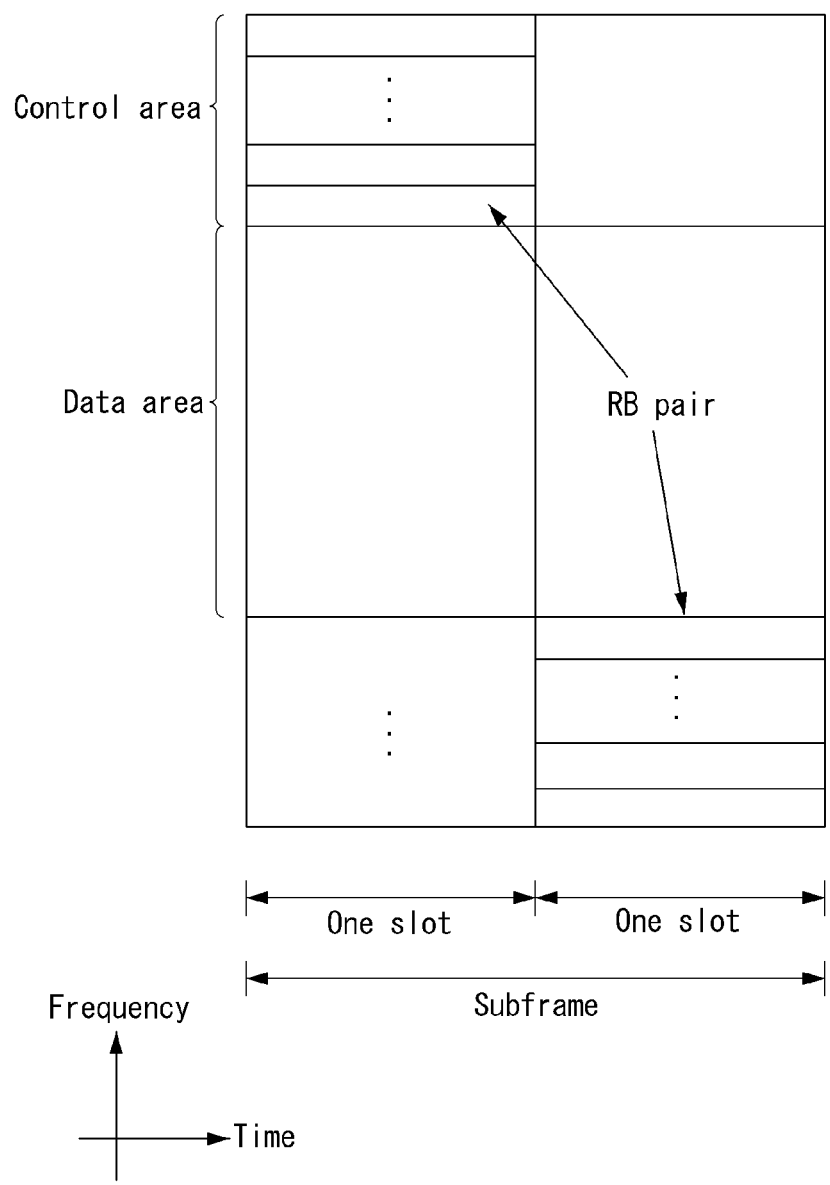
FIG. 7 shows an example of an uplink subframe structure.

FIG. 7 shows an example of an uplink subframe structure.

In FIG. 7, an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Hereinafter, an LTE frame structure is described more specifically.

Throughout LTE specification, unless otherwise noted, the size of various fields in the time domain is expressed as a number of time units $T_s=1/(15000 \times 2048)$ seconds.

Downlink and uplink transmissions are organized into radio frames with $T_f=307200 \times T_s=10$ ms duration. Two radio frame structures are supported:
Type 1: applicable to FDD
Type 2: applicable to TDD Frame Structure Type 1

Frame structure type 1 is applicable to both full duplex and half duplex FDD. Each radio frame is $T_f=307200 \cdot T_s=10$ ms long and consists of 20 slots of length $T_{slot}=15360 \cdot T_s=0.5$ ms, numbered from 0 to 19. A subframe is defined as two consecutive slots where subframe i consists of slots 2i and 2i+1.

For FDD, 10 subframes are available for downlink transmission and 10 subframes are available for uplink transmissions in each 10 ms interval.

Uplink and downlink transmissions are separated in the frequency domain. In half-duplex FDD operation, the UE cannot transmit and receive at the same time while there are no such restrictions in full-duplex FDD.

Figure 8:
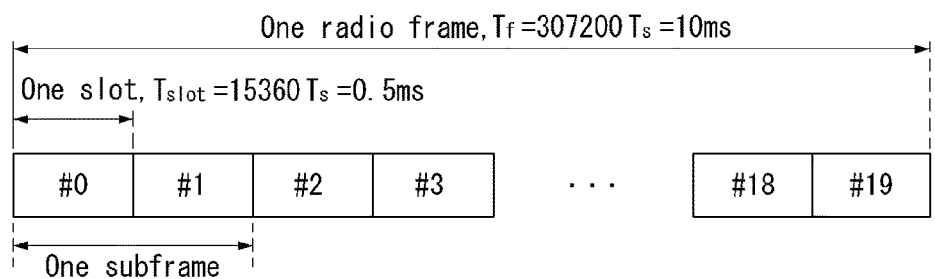
FIG. 8 shows an example of a frame structure type 1.

FIG. 8 shows an example of a frame structure type 1.

Frame structure type 2

Frame structure type 2 is applicable to TDD. Each radio frame of length $T_f=307200 \times T_s=10$ ms consists of two half-frames of length $15360 \cdot T_s=0.5$ ms each. Each half-frame consists of five subframes of length $30720 \cdot T_s=1$ ms. The supported uplink-downlink configurations are listed in Table 2 where, for each subframe in a radio frame, "D" denotes the subframe is reserved for downlink transmissions, "U" denotes the subframe is reserved for uplink transmissions and "S" denotes a special subframe with the three fields DwPTS, GP and UpPTS. The length of DwPTS and UpPTS is given by Table 1 subject to the total length of DwPTS, GP and UpPTS being equal to $30720 \cdot T_s=1$ ms. Each subframe i is defined as two slots, 2i and 2i+1 of length $T_{slot}=15360 \cdot T_s=0.5$ ms in each subframe.

Uplink-downlink configurations with both 5 ms and 10 ms downlink-to-uplink switch-point periodicity are supported. In case of 5 ms downlink-to-uplink switch-point periodicity, the special subframe exists in both half-frames. In case of 10 ms downlink-to-uplink switch-point periodicity, the special subframe exists in the first half-frame only. Subframes 0 and 5 and DwPTS are always reserved for downlink transmission. UpPTS and the subframe immediately following the special subframe are always reserved for uplink transmission.

Figure 9:
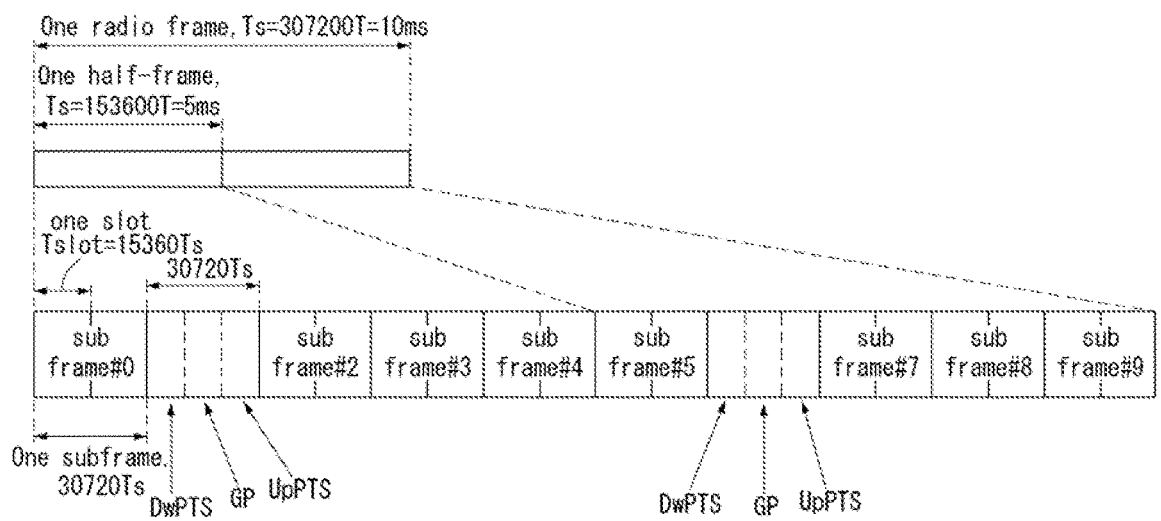
FIG. 9 is a diagram showing another example of a frame structure type 2.

FIG. 9 is a diagram showing another example of a frame structure type 2.

Table 1 shows an example of the configuration of a special subframe.

TABLE 1

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Table 2 shows an example of an uplink-downlink configuration

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

<NB-IoT>

A narrowband-Internet of things (NB-IoT) is a standard for supporting low complexity, low cost devices, and has been defined to perform only a relatively simple operation compared to the existing LTE devices. The NB-IoT follows the basic structure of LTE, but operates based on the following defined contents. If the NB-IoT reuses a channel or signal of LTE, it may follow the standard defined in the existing LTE.

Uplink

The following narrowband physical channels are defined.

Narrowband physical uplink shared channel (NPUSCH)

Narrowband physical random access channel (NPRACH)

The following uplink narrowband physical signals are defined.

Narrowband demodulation reference signal

The uplink bandwidth in terms of subcarriers $N_{sc}^{UL}$, and the slot duration $T_{slot}$ are given in Table 3.

Table 3 shows an example of NB-IoT parameters.

TABLE 3

| Subcarrier spacing | $N_{sc}^{UL}$ | $T_{slot}$ |
|---|---|---|
| Δf = 3.75 kHz | 48 | 61440 · $T_s$ |
| Δf = 15 kHz | 12 | 15360 · $T_s$ |

A single antenna port p=0 is used for all uplink transmissions.

Resource Unit

Resource units are used to describe the mapping of the NPUSCH to resource elements. A resource unit is defined as $N_{symb}^{UL} N_{slots}^{UL}$ consecutive SC-FDMA symbols in the time domain and $N_{sc}^{RU}$ consecutive subcarriers in the frequency domain, where $N_{sc}^{RU}$ and $N_{symb}^{UL}$ are given by Table 4.

Table 4 shows an example of supported combinations of $N_{sc}^{RU}$, $N_{slots}^{UL}$, and $N_{symb}^{UL}$.

TABLE 4

| NPUSCH format | Δf | $N_{sc}^{RU}$ | $N_{slots}^{UL}$ | $N_{symb}^{UL}$ |
|---|---|---|---|---|
| 1 | 3.75 kHz | 1 | 16 | 7 |
| | 15 kHz | 1 | 16 | |
| | | 3 | 8 | |
| | | 6 | 4 | |
| | | 12 | 2 | |
| 2 | 3.75 kHz | 1 | 4 | |
| | 15 kHz | 1 | 4 | |

Narrowband Uplink Shared Channel (NPUSCH)

The narrowband physical uplink shared channel supports two formats:

NPUSCH format 1, used to carry the UL-SCH

NPUSCH format 2, used to carry uplink control information

Scrambling shall be done according to clause 5.3.1 of TS36.211. The scrambling sequence generator shall be initialized with $c_{ini}=n_{RNTI} \cdot 2^{14}+n_f \mod 2 \cdot 2^{13}+\lfloor n_s/2 \rfloor+N_{ID}^{cell}$, where $n_s$ is the first slot of the transmission of the codeword. In case of NPUSCH repetitions, the scrambling sequence shall be reinitialized according to the above formula after every $M_{identical}^{NPUSCH}$ transmission of the codeword with $n_s$ and $n_f$ set to the first slot and the frame, respectively, used for the transmission of the repetition. The quantity $M_{identical}^{NPUSCH}$ is given by clause 10.1.3.6 in TS36.211.

Table 5 specifies the modulation mappings applicable for the narrowband physical uplink shared channel.

TABLE 5

| NPUSCH format | $N_{sc}^{RU}$ | Modulation scheme |
|---|---|---|
| 1 | 1 | BPSK, QPSK |
| | >1 | QPSK |
| 2 | 1 | BPSK |

NPUSCH can be mapped to one or more than one resource units, $N_{RU}$, as given by clause 16.5.1.2 of 3GPP TS 36.213, each of which shall be transmitted $M_{rep}^{NPUSCH}$ times.

The block of complex-valued symbols z(0), . . . , $z(M_{rep}^{NPUSCH}-1)$ shall be multiplied with the amplitude scaling factor $\beta_{NPUSCH}$ in order to conform to the transmit power $P_{NPUSCH}$ specified in 3GPP TS 36.213, and mapped in sequence starting with z(0) to subcarriers assigned for transmission of NPUSCH. The mapping to resource elements (k, l) corresponding to the subcarriers assigned for transmission and not used for transmission of reference signals, shall be in increasing order of first the index k, then the index l, starting with the first slot in the assigned resource unit.

After mapping to $N_{slots}$ slots, the $N_{slots}$ slots shall be repeated $M_{identical}^{NPUSCH}-1$ additional times, before continuing the mapping of z(•) to the following slot, where $$M_{idendical}^{NPUSCH} = \begin{cases} \min(\lceil M_{rep}^{NPUSCH}/2 \rceil, 4) & N_{sc}^{RU} > 1 \\ 1 & N_{sc}^{RU} = 1 \end{cases}$$ [Equation 1]

$$N_{slots} = \begin{cases} 1 & \Delta f = 3.75 \text{ kHz} \\ 2 & \Delta f = 15 \text{ kHz} \end{cases}$$

If a mapping to $N_{slots}$ slots or a repetition of the mapping contains a resource element which overlaps with any configured NPRACH resource according to NPRACH-ConfigSIB-NB, the NPUSCH transmission in overlapped $N_{slots}$ slots is postponed until the next $N_{slots}$ slots not overlapping with any configured NPRACH resource.

The mapping of z(0), . . . , $z(M_{rep}^{NPUSCH}-1)$ is then repeated until $M_{rep}^{NPUSCH} N_{RU} N_{slots}^{UL}$ slots have been transmitted. After transmissions and/or postponements due to NPRACH of $256 \cdot 30720 T_s$ time units, a gap of $40 \cdot 30720 T_s$ time units shall be inserted where the NPUSCH transmission is postponed. The portion of a postponement due to NPRACH which coincides with a gap is counted as part of the gap.

When higher layer parameter npusch-AllSymbols is set to false, resource elements in SC-FDMA symbols overlapping with a symbol configured with SRS according to srs-SubframeConfig shall be counted in the NPUSCH mapping but not used for transmission of the NPUSCH. When higher layer parameter npusch-AllSymbols is set to true, all symbols are transmitted.

Uplink Control Information on NPUSCH without UL-SCH Data

The one bit information of HARQ-ACK $o_0^{ACK}$ is coded according to Table 6, where for a positive acknowledgement $o_0^{ACK}=1$ and for a negative acknowledgement $o_0^{ACK}=0$ Table 6 shows an example of HARQ-ACK code words.

TABLE 6

| HARQ-ACK $<o_0^{ACK}>$ | HARQ-ACK $<b_0, b_1, b_2, \ldots, b_{15}>$ |
|---|---|
| 0 | <0, 0, 0, 0, 0, 0, 0, 0, 0, 0, 0, 0, 0, 0, 0, 0> |
| 1 | <1, 1, 1, 1, 1, 1, 1, 1, 1, 1, 1, 1, 1, 1, 1, 1> |

Power Control

The UE transmit power $P_{NPUSCH,c}(i)$ for NPUSCH transmission in NB-IoT UL slot i for the serving cell c is given by Equations 2 and 3.

If the number of repetitions of the allocated NPUSCH RUs is greater than 2, $$P_{NPUSCH,c}(i)=P_{CMAX,c}(i)[dBm] \quad \text{[Equation 2]}$$

otherwise, $$P_{NPUSCH,c}(i) = \min \begin{cases} P_{CMAX,c}(i), \\ 10\log_{10}(M_{NPUSCH,c}(i)) + P_{O\_NPUSCH,c}(j) + \alpha_c(j) \cdot PL_c \end{cases}[dBm] \quad \text{[Equation 3]}$$

where, $P_{CMAX,c}(i)$ is the configured UE transmit power defined in 3GPP TS36.101 in NB-IoT UL slot i for serving cell c.

$M_{NPUSCH,c}$ is {¼} for 3.75 kHz subcarrier spacing and {1, 3, 6, 12} for 15 kHz subcarrier spacing $P_{O\_NPUSCH,c}(j)$ is a parameter composed of the sum of a component $P_{O\_NOMINAL\_NPUSCH,c}(j)$ provided from higher layers and a component $P_{O\_UE\_NPUSCH,c}(j)$ provided by higher layers for j=1 and for serving cell c where j∈{1,2}. For NPUSCH (re)transmissions corresponding to a dynamic scheduled grant then j=1 and for NPUSCH (re)transmissions corresponding to the random access response grant then j=2.

$P_{O\_UE\_NPUSCH,c}(2)=0$ and $P_{O\_NORMINAL\_NPUSCH,c}(2)= P_{O\_PRE}+\Delta_{PREAMBLE\_Msg3}$, where the parameter preambleInitialReceivedTargetPower $P_{O\_PRE}$ and $\Delta_{PREAMBLE\_Msg3}$ are signalled from higher layers for serving cell c.

For j=1, for NPUSCH format 2, $\alpha_c(j)=1$; for NPUSCH format 1, $\alpha_c(j)$ is provided by higher layers for serving cell c. For j=2, $\alpha_c(j)=1$.

$PL_c$ is the downlink path loss estimate calculated in the UE for serving cell c in dB and $PL_c$=nrs-Power+nrs-PowerOffsetNonAnchor—higher layer filtered NRSRP, where nrs-Power is provided by higher layers and Subclause 16.2.2 in 3GPP 36.213, and nrs-powerOffsetNonAnchor is set to zero if it is not provided by higher layers and NRSRP is defined in 3GPP TS 36.214 for serving cell c and the higher layer filter configuration is defined in 3GPP TS 36.331 for serving cell c.

If the UE transmits NPUSCH in NB-IoT UL slot i for serving cell c, power headroom is computed using Equation 4.

$$PH_c(i)=P_{CMAX,c}(i)-\{P_{O\_NPUSCH,c}(1)+\alpha_c(1)\cdot PL_c\}[dB] \quad \text{[Equation 4]}$$

UE Procedure for Transmitting Format 1 NPUSCH

A UE shall upon detection on a given serving cell of a NPDCCH with DCI format N0 ending in NB-IoT DL subframe n intended for the UE, perform, at the end of n+$k_0$ DL subframe, a corresponding NPUSCH transmission using NPUSCH format 1 in N consecutive NB-IoT UL slots $n_i$ with i=0, 1, . . . , N−1 according to the NPDCCH information where subframe n is the last subframe in which the NPDCCH is transmitted and is determined from the starting subframe of NPDCCH transmission and the DCI subframe repetition number field in the corresponding DCI; and $N=N_{Rep}N_{RU}N_{slots}^{UL}$, where the value of $N_{rep}$ is determined by the repetition number field in the corresponding DCI, the value of $N_{RU}$ is determined by the resource assignment field in the corresponding DCI, and the value of $N_{slots}^{UL}$ is the number of NB-IoT UL slots of the resource unit corresponding to the allocated number of subcarriers in the corresponding DCI, $n_0$ is the first NB-IoT UL slot starting after the end of subframe n+$k_0$ value of $k_0$ is determined by the scheduling delay field ($I_{Delay}$) in the corresponding DCI according to Table 7.

Table 7 shows an example of $k_0$ for the DCI format N0.

TABLE 7

| $I_{Delay}$ | $k_0$ |
|---|---|
| 0 | 8 |
| 1 | 16 |
| 2 | 32 |
| 3 | 64 |

The resource allocation information in uplink DCI format N0 for NPUSCH transmission indicates to a scheduled UE.

a set of contiguously allocated subcarriers ($n_{sc}$) of a resource unit determined by the Subcarrier indication field in the corresponding DCI, a number of resource units ($N_{RU}$) determined by the resource assignment field in the corresponding DCI according to Table 9, a repetition number ($N_{Rep}$) determined by the repetition number field in the corresponding DCI according to Table 10.

The subcarrier spacing Δf of NPUSCH transmission is determined by the uplink subcarrier spacing field in the Narrowband Random Access Response Grant according to Subclause 16.3.3 in 3GPP TS36.213.

For NPUSCH transmission with subcarrier spacing Δf=3.75 kHz, $n_{sc}=I_{sc}$ where $I_{sc}$ is the subcarrier indication field in the DCI.

For NPUSCH transmission with subcarrier spacing Δf=15 kHz, the subcarrier indication field ($I_{sc}$) in the DCI determines the set of contiguously allocated subcarriers ($n_{sc}$) according to according to Table 8.

Table 8 shows an example of allocated subcarriers for NPUSCH with Δf=15 kHz.

TABLE 8

| Subcarrier indication field ($I_{sc}$) | Set of allocated subcarriers ($n_{sc}$) |
|---|---|
| 0-11 | $I_{sc}$ |
| 12-15 | $3(I_{sc} - 12) + \{0, 1, 2\}$ |
| 16-17 | $6(I_{sc} - 16) + \{0, 1, 2, 3, 4, 5\}$ |
| 18 | $\{0, 1, 2, 3, 4, 5, 6, 7, 8, 9, 10, 11\}$ |
| 19-63 | Reserved |

Table 9 shows an example of the number of resource units for NPUSCH.

TABLE 9

| $I_{RU}$ | $N_{RU}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

Table 10 shows an example of the number of repetitions for NPUSCH.

TABLE 10

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |

Demodulation Reference Signal (DMRS)

The reference signal sequence $\bar{r}_u(n)$ for $N_{sc}^{RU}=1$ is defined by Equation 5.

$$\bar{r}_u(n) = \frac{1}{\sqrt{2}}(1+j)(1-2c(n))w(n \bmod 16),$$ [Equation 5]

$$0 \le n < M_{rep}^{NPUSCH} N_{RU} N_{slots}^{UL}$$

where the binary sequence c (n) is defined by clause 7.2 of TS36.211 and shall be initialized with $c_{init}=35$ at the start of the NPUSCH transmission. The quantity w(n) is given by Table 11 where $u=N_{ID}^{Ncell} \bmod 16$ for NPUSCH format 2, and for NPUSCH format 1 if group hopping is not enabled, and by clause 10.1.4.1.3 of 3GPP TS36.211 if group hopping is enabled for NPUSCH format 1.

Table 11 shows an example of w(n).

TABLE 11

| u | w(0), . . . , w(15) |
|---|---|
| 0  | 1  1  1  1  1  1  1  1  1  1  1  1  1  1  1  1 |
| 1  | 1 −1  1 −1  1 −1  1 −1  1 −1  1 −1  1 −1  1 −1 |
| 2  | 1  1 −1 −1  1  1 −1 −1  1  1 −1 −1  1  1 −1 −1 |
| 3  | 1 −1 −1  1  1 −1 −1  1  1 −1 −1  1  1 −1 −1  1 |
| 4  | 1  1  1  1 −1 −1 −1 −1  1  1  1  1 −1 −1 −1 −1 |
| 5  | 1 −1  1 −1 −1  1 −1  1  1 −1  1 −1 −1  1 −1  1 |
| 6  | 1  1 −1 −1 −1 −1  1  1  1  1 −1 −1 −1 −1  1  1 |
| 7  | 1 −1 −1  1 −1  1  1 −1  1 −1 −1  1 −1  1  1 −1 |
| 8  | 1  1  1  1  1  1  1  1 −1 −1 −1 −1 −1 −1 −1 −1 |
| 9  | 1 −1  1 −1  1 −1  1 −1 −1  1 −1  1 −1  1 −1  1 |
| 10 | 1  1 −1 −1  1  1 −1 −1 −1 −1  1  1 −1 −1  1  1 |
| 11 | 1 −1 −1  1  1 −1 −1  1 −1  1  1 −1 −1  1  1 −1 |
| 12 | 1  1  1  1 −1 −1 −1 −1 −1 −1 −1 −1  1  1  1  1 |
| 13 | 1 −1  1 −1 −1  1 −1  1 −1  1 −1  1  1 −1  1 −1 |
| 14 | 1  1 −1 −1 −1 −1  1  1 −1 −1  1  1  1  1 −1 −1 |
| 15 | 1 −1 −1  1 −1  1  1 −1 −1  1  1 −1  1 −1 −1  1 |

The reference signal sequence for NPUSCH format 1 is given by Equation 6:

$$r_u(n) = \bar{r}_u(n)$$ [Equation 6]

The reference signal sequence for NPUSCH format 2 is given by Equation 7:

$$r_u(3n+m) = \bar{w}(m)\bar{r}_u(n), m=0,1,2$$ [Equation 7]

where $\bar{w}(m)$ is defined in Table 5.5.2.2.1-2 of 3GPP TS36.211 with the sequence index chosen according to $$\left(\sum_{i=0}^{7} c(8n_s + i)2^i\right) \bmod 3 \text{ with } c_{init} = N_{ID}^{Ncell}.$$

The reference signal sequences $r_u(n)$ for $N_{sc}^{RU}>1$ is defined by a cyclic shift α of a base sequence according to Equation 8:

$$r_u(n) = e^{j\alpha n} e^{j\phi(n)\pi/4}, 0 \le n < N_{sc}^{RU}$$ [Equation 8]

where φ(n) is given by Table 10.1.4.1.2-1 for $N_{sc}^{RU}=3$, Table 12 for $N_{sc}^{RU}=6$ and Table 13 for $N_{sc}^{RU}=12$.

If group hopping is not enabled, the base sequence index u is given by higher layer parameters threeTone-BaseSequence, sixTone-BaseSequence, and twelveTone-BaseSequence for $N_{sc}^{RU}=3$, $N_{sc}^{RU}=6$, and $N_{sc}^{RU}=12$, respectively. If not signalled by higher layers, the base sequence is given by Equation 9:

$$u = \begin{cases} N_{ID}^{Ncell} \bmod 12 & \text{for } N_{sc}^{RU} = 3 \\ N_{ID}^{Ncell} \bmod 14 & \text{for } N_{sc}^{RU} = 6 \\ N_{ID}^{Ncell} \bmod 30 & \text{for } N_{sc}^{RU} = 12 \end{cases}$$ [Equation 9]

If group hopping is enabled, the base sequence index u is given by clause 10.1.4.1.3 of 3GPP TS36.211.

The cyclic shift α for $N_{sc}^{RU}=3$ and $N_{sc}^{RU}=6$ is derived from higher layer parameters threeTone-CyclicShift and sixTone-CyclicShift, respectively, as defined in Table 14. For $N_{sc}^{RU}=12$, α=0.

Table 12 is a table showing an example of φ(n) for $N_{sc}^{RU}=3$.

TABLE 12

| u | φ(0), φ(1), φ(2) | | |
|---|---|---|---|
| 0 | 1 | −3 | −3 |
| 1 | 1 | −3 | −1 |
| 2 | 1 | −3 | 3 |
| 3 | 1 | −1 | −1 |
| 4 | 1 | −1 | 1 |
| 5 | 1 | −1 | 3 |
| 6 | 1 | 1 | −3 |
| 7 | 1 | 1 | −1 |
| 8 | 1 | 1 | 3 |
| 9 | 1 | 3 | −1 |
| 10 | 1 | 3 | 1 |
| 11 | 1 | 3 | 3 |

Table 13 is a table showing another example of φ(n) for $N_{sc}^{RU}=6$.

TABLE 13

| u | φ(0), . . . , φ(5) | | | | | |
|---|---|---|---|---|---|---|
| 0 | 1 | 1 | 1 | 1 | 3 | −3 |
| 1 | 1 | 1 | 3 | 1 | −3 | 3 |
| 2 | 1 | −1 | −1 | −1 | 1 | −3 |
| 3 | 1 | −1 | 3 | −3 | −1 | −1 |
| 4 | 1 | 3 | 1 | −1 | −1 | 3 |
| 5 | 1 | −3 | −3 | 1 | 3 | 1 |
| 6 | −1 | −1 | 1 | −3 | −3 | −1 |
| 7 | −1 | −1 | −1 | 3 | −3 | −1 |
| 8 | 3 | −1 | 1 | −3 | −3 | 3 |
| 9 | 3 | −1 | 3 | −3 | −1 | 1 |
| 10 | 3 | −3 | 3 | −1 | 3 | 3 |
| 11 | −3 | 1 | 3 | 1 | −3 | −1 |
| 12 | −3 | 1 | −3 | 3 | −3 | −1 |
| 13 | −3 | 3 | −3 | 1 | 1 | −3 |

Table 14 is a table showing an example of α.

TABLE 14

| $N_{sc}^{RU} = 3$ | | $N_{sc}^{RU} = 6$ | |
|---|---|---|---|
| threeTone-CyclicShift | α | sixTone-CyclicShift | α |
| 0 | 0 | 0 | 0 |
| 1 | 2π/3 | 1 | 2π/6 |
| 2 | 4π/3 | 2 | 4π/6 |
|   |   | 3 | 8π/6 |

For the reference signal for NPUSCH format 1, sequence-group hopping can be enabled where the sequence-group number u in slot $n_s$ is defined by a group hopping pattern $f_{gh}(n_s)$ and a sequence-shift pattern $f_{ss}$ according to Equation 10.

$$u = f_{gh}(n_s) + f_{ss}) \bmod N_{seq}^{RU}$$ [Equation 10]

where the number of reference signal sequences available for each resource unit size, $N_{seq}^{RU}$ is given by Table 15.

Table 15 shows an example of $N_{seq}^{RU}$.

TABLE 15

| $N_{sc}^{RU}$ | $N_{seq}^{RU}$ |
|---|---|
| 1 | 16 |
| 3 | 12 |
| 6 | 14 |
| 12 | 30 |

Sequence-group hopping can be enabled or disabled by means of the cell-specific parameter groupHoppingEnabled provided by higher layers. Sequence-group hopping for NPUSCH can be disabled for a certain UE through the higher-layer parameter groupHoppingDisabled despite being enabled on a cell basis unless the NPUSCH transmission corresponds to a Random Access Response Grant or a retransmission of the same transport block as part of the contention based random access procedure.

The group hopping pattern $f_{gh}(n_s)$ is given by Equation 11:

$$f_{gh}(n_s) = (\Sigma_{i=0}^{7} c(8n_s' + i) \cdot 2^i) \bmod N_{seq}^{RU}$$ [Equation 11]

where $n_s' = n_s$ for $N_{sc}^{RU} > 1$ and $n_s'$ is the slot number of the first slot of the resource unit for $N_{sc}^{RU} = 1$. The pseudo-random sequence c(i) is defined by clause 7.2. The pseudo-random sequence generator shall be initialized with $$c_{init} = \left\lfloor \frac{N_{ID}^{Ncell}}{N_{seq}^{RU}} \right\rfloor$$

at the beginning of the resource unit for $N_{sc}^{RU}=1$ and in every even slot for $N_{sc}^{RU}>1$.

The sequence-shift pattern $f_{ss}$ is given by Equation 12.

$$f_{ss} = (N_{ID}^{cell} + \Delta_{ss}) \bmod N_{seq}^{RU}$$ [Equation 12]

where $\Delta_{ss} \in \{0, 1, \ldots, 29\}$ is given by higher-layer parameter groupAssignmentNPUSCH. If no value is signalled, $\Delta_{ss}=0$.

The sequence r(·) shall be multiplied with the amplitude scaling factor $\beta_{NPUSCH}$ and mapped in sequence starting with r(0) to the sub-carriers.

The set of sub-carriers used in the mapping process shall be identical to the corresponding NPUSCH transmission as defined in clause 10.1.3.6 in 3GPP 36.211.

The mapping to resource elements (k,l) shall be in increasing order of first k, then l, and finally the slot number. The values of the symbol index l in a slot are given in Table 16.

Table 16 shows an example of demodulation reference signal locations for NPUSCH.

TABLE 16

| | Values for l | |
|---|---|---|
| NPUSCH format | Δf = 3.75 kHz | Δf = 15 kHz |
| 1 | 4 | 3 |
| 2 | 0, 1, 2 | 2, 3, 4 |

SF-FDMA Baseband Signal Generation

For $N_{sc}^{RU}>1$, the time-continuous signal $s_l(t)$ in SC-FDMA symbol l in a slot is defined by clause 5.6 with the quantity $N_{RB}^{UL} N_{sc}^{RB}$ replaced by $N_{sc}^{UL}$.

For $N_{sc}^{RU}=1$, the time-continuous signal $s_{k,l}(t)$ for subcarrier index k in SC-FDMA symbol l in an uplink slot is defined by Equation 13.

$$s_{k,l}(t)=a_{k^{(-)},l}e^{j2\pi(k+1/2)\Delta f(t-N_{CP,l}T_s)}$$

$$k^{(-)}=k+\lfloor N_{sc}^{UL}/2 \rfloor \qquad \text{[Equation 13]}$$

For $0 \le t < (N_{CP,l}+N)T_s$ where parameters for $\Delta f=15$ kHz and $\Delta f=3.75$ kHz are given in Table 17, $a_{k^{(-)},l}$ is the modulation value of symbol l and the phase rotation $\varphi_{k,l}$ is defined by Equation 14.

$$\varphi_{k,l} = \rho(\tilde{l}\bmod 2) + \hat{\varphi}_k(\tilde{l}) \qquad \text{[Equation 14]}$$

$$\rho = \begin{cases} \dfrac{\pi}{2} & \text{for BPSK} \\ \dfrac{\pi}{4} & \text{for QPSK} \end{cases}$$

$$\hat{\varphi}_k(\tilde{l}) = \begin{cases} 0 & \tilde{l}=0 \\ \hat{\varphi}_k(\tilde{l}-1) + 2\pi\Delta f(k+1/2)(N+N_{CP,l})T_s & \tilde{l}>0 \end{cases}$$

$$\tilde{l} = 0, 1, \ldots, M_{rep}^{NPUSCH} N_{RU} N_{slots}^{UL} N_{symb}^{UL} - 1$$

$$l = \tilde{l} \bmod N_{symb}^{UL}$$

where $\tilde{l}$ is a symbol counter that is reset at the start of a transmission and incremented for each symbol during the transmission.

Table 17 shows an example of SC-FDMA parameters for $N_{sc}^{RU}=1$.

TABLE 17

| Parameter | $\Delta f = 3.75$ kHz | $\Delta f = 15$ kHz |
| --- | --- | --- |
| N | 8192 | 2048 |
| Cyclic prefix length $N_{CP,l}$ | 256 | 160 for l = 0<br>144 for l = 1, 2, . . . , 6 |
| Set of values for $k$ | −24, −23, . . . , 23 | −6, −5, . . . , 5 |

The SC-FDMA symbols in a slot shall be transmitted in increasing order of l, starting with l=0, where SC-FDMA symbol l>0 starts at time $\sum_{l'=0}^{l-1}(N_{CP,l'}+N)T_s$ within the slot. For $\Delta f=3.75$ kHz, the remaining $2304T_s$ in $T_{slot}$ are not transmitted and used for guard period.

Narrowband Physical Random Access (NPRACH)

Figure 10:
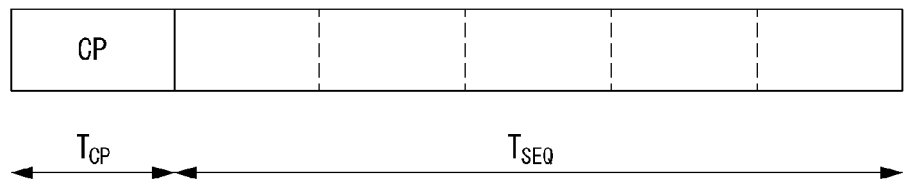
FIG. 10 shows an example of a random access symbol group.

The physical layer random access preamble is based on single-subcarrier frequency-hopping symbol groups. A symbol group is illustrated in FIG. 10, consisting of a cyclic prefix of length $T_{CP}$ and a sequence of 5 identical symbols with total length $T_{SEQ}$. The parameter values are listed in Table 18 Random access preamble parameters.

FIG. 10 shows an example of a random access symbol group.

Table 18 shows an example of random access preamble parameters.

TABLE 18

| Preamble format | $T_{CP}$ | $T_{SEQ}$ |
| --- | --- | --- |
| 0 | $2048T_s$ | $5 \cdot 8192T_s$ |
| 1 | $8192T_s$ | $5 \cdot 8192T_s$ |

The preamble consisting of 4 symbol groups transmitted without gaps shall be transmitted $N_{rep}^{NPRACH}$ times.

The transmission of a random access preamble, if triggered by the MAC layer, is restricted to certain time and frequency resources.

An NPRACH configuration provided by higher layers contains the following:

NPRACH resource periodicity $N_{period}^{NPRACH}$ (nprach-Periodicity), frequency location of the first subcarrier allocated to NPRACH $N_{scoffset}^{NPRACH}$ (nprach-SubcarrierOffset), number of subcarriers allocated to NPRACH $N_{sc}^{NPRACH}$ (nprach-NumSubcarriers), number of starting sub-carriers allocated to contention based NPRACH random access $N_{sc\_cont}^{NPRACH}$ (nprach-NumCBRA-StartSubcarriers), number of NPRACH repetitions per attempt $N_{rep}^{NPRACH}$ (numRepetitionsP erPreambleAttempt), NPRACH starting time $N_{start}^{NPRACH}$ (nprach-StartTime), Fraction for calculating starting subcarrier index for the range of NPRACH subcarriers reserved for indication of UE support for multi-tone msg3 transmission $N_{MSG3}^{NPRACH}$ (nprach-SubcarrierMSG3-RangeStart).

NPRACH transmission can start only $N_{start}^{NPRACH} \cdot 30720$ $T_s$ time units after the start of a radio frame fulfilling $n_f \bmod(N_{period}^{NPRACH}/10)=0$. After transmissions of $4 \cdot 64$ $(T_{CP}+T_{SEQ})$ time units, a gap of $40 \cdot 30720T_s$ time units shall be inserted.

NPRACH configurations where $N_{scoffset}^{NPRACH}+N_{sc}^{NPRACH}>N_{sc}^{UL}$ are invalid.

The NPRACH starting subcarriers allocated to contention based random access are split in two sets of subcarriers, {0, 1, . . . , $N_{sc\_cont}^{NPRACH} N_{MSG3}^{NPRACH}-1$} and {$N_{sc\_cont}^{NPRACH} N_{MSG3}^{NPRACH}, \ldots, N_{sc\_cont}^{NPRACH}-1$} where the second set, if present, indicate UE support for multi-tone msg3 transmission.

The frequency location of the NPRACH transmission is constrained within $N_{sc}^{RA}=12$ sub-carriers. Frequency hopping shall be used within the 12 subcarriers, where the frequency location of the $i^{th}$ symbol group is given by $N_{sc}^{RA}(i)=n_{start}+\tilde{n}_{sc}^{RA}(i)$ where $n_{start}=N_{scoffset}^{NPRACH}+\lfloor n_{init}/N_{sc}^{RA} \rfloor \cdot N_{sc}^{RA}$ and $\tilde{n}_{sc}^{RA}(i)$ is given by Equation 15.

$$\tilde{n}_{sc}^{RA}(i) = \qquad \text{[Equation 15]}$$

$$\begin{cases} (\tilde{n}_{sc}^{RA}(0) + f(i/4)) \bmod N_{sc}^{RA} & i\bmod 4 = 0 \text{ and } i>0 \\ \tilde{n}_{sc}^{RA}(i-1)+1 & i\bmod 4 = 1, \\ & 3 \text{ and } \tilde{n}_{sc}^{RA}(i-1)\bmod 2 = 0 \\ \tilde{n}_{sc}^{RA}(i-1)-1 & i\bmod 4 = 1, \\ & 3 \text{ and } \tilde{n}_{sc}^{RA}(i-1)\bmod 2 = 1 \\ \tilde{n}_{sc}^{RA}(i-1)+6 & i\bmod 4 = 2 \text{ and } \tilde{n}_{sc}^{RA}(i-1)<6 \\ \tilde{n}_{sc}^{RA}(i-1)-6 & i\bmod 4 = 2 \text{ and } \tilde{n}_{sc}^{RA}(i-1) \ge 6 \end{cases}$$

$$f(t) =$$

$$\left(f(t-1) + \left(\sum_{n=10t+1}^{10t+9} c(n)2^{n-(10t+1)}\right)\bmod(N_{sc}^{RA}-1)+1\right)\bmod N_{sc}^{RA}$$

$$f(-1)=0$$

where $\tilde{n}_{sc}^{RA}(0)=n_{init} \bmod N_{sc}^{RA}$ with $n_{init}$ being the subcarrier selected by the MAC layer from {0, 1, . . . , $N_{sc}^{NPRACH}-1$}, and the pseudo random sequence c(n) is given by clause 7.2 of 3GPP TS36.211. The pseudo random sequence generator shall be initialized with $c_{init}=N_{ID}^{Ncell}$.

The time-continuous random access signal $s_i(t)$ for symbol group i is defined by Equation 16:

$$s_i(t) = \beta_{NPRACH} e^{j2\pi(n_{SC}^{RA}(i)+Kk_0+1/2)\Delta f_{RA}(t-T_{CP})} \qquad [\text{Equation 16}]$$

where $0 \le t < T_{SEQ} + T_{CP}$, $\beta_{NPRACH}$ is an amplitude scaling factor in order to conform to the transmit power $P_{NPRACH}$ specified in clause 16.3.1 in 3GPP TS 36.213, $k_0 = -N_{sc}^{UL}/2$, $K = \Delta f / \Delta f_{RA}$ accounts for the difference in subcarrier spacing between the random access preamble and uplink data transmission, and the location in the frequency domain controlled by the parameter $n_{sc}^{RA}(i)$ is derived from clause 10.1.6.1 of 3GPP TS36.211. The variable $\Delta f_{RA}$ is given by Table 19.

Table 19 shows an example of random access baseband parameters.

TABLE 19

| Preamble format | $\Delta f_{RA}$ |
|---|---|
| 0, 1 | 3.75 kHz |

Downlink

A downlink narrowband physical channel corresponds to a set of resource elements that carry information originating from higher layers, and is the interface defined between 3GPP TS 36.212 and 3GPP TS 36.211.

The following downlink physical channels are defined:
Narrowband physical downlink shared channel (NPDSCH)
Narrowband physical broadcast channel (NPBCH)
Narrowband physical downlink control channel (NPDCCH)

A downlink narrowband physical signal corresponds to a set of resource elements used by the physical layer, but does not carry information originating from higher layers. The following downlink physical signals are defined:
Narrowband reference signal (NRS)
Narrowband synchronization signal
Narrowband Physical Downlink Shared Channel (NPDSCH)

The scrambling sequence generator shall be initialized with $c_{init} = n_{RNTI} \cdot 2^{14} + n_f \mod 2 \cdot 2^{13} + \lfloor n_s/2 \rfloor + N_{ID}^{Ncell}$ where $n_s$ is the first slot of the transmission of the codeword. In case of NPDSCH repetitions and the NPDSCH carrying the BCCH, the scrambling sequence generator shall be reinitialized according to the expression above for each repetition. In case of NPDSCH repetitions and the NPDSCH is not carrying the BCCH, the scrambling sequence generator shall be reinitialized according to the expression above after every min ($M_{rep}^{NPDSCH}$, 4) transmission of the codeword with $n_s$ and $n_f$ set to the first slot and the frame, respectively, used for the transmission of the repetition.

Modulation should be done using QPSK modulation scheme.

NPDSCH can be mapped to one or more than one subframes, $N_{SF}$, as given by clause 16.4.1.5 of 3GPP TS 36.213, each of which shall be transmitted NPDSCH $M_{rep}^{NPDSCH}$ times.

For each of the antenna ports used for transmission of the physical channel, the block of complex-valued symbols $y^{(p)}(0), \ldots, y^{(p)}(M_{symb}^{ap}-1)$ shall be mapped to resource elements (k, l) which meet all of the following criteria in the current subframe:
the subframe is not used for transmission of NPBCH, NPSS, or NSSS, and
they are assumed by the UE not to be used for NRS, and
they are not overlapping with resource elements used for CRS (if any), and
the index l in the first slot in a subframe fulfils $l \ge l_{DataStart}$ where $l_{DataStart}$ is given by clause 16.4.1.4 of 3GPP TS 36.213.

The mapping of $y^{(p)}(0), \ldots y^{(p)}(M_{symb}^{ap}-1)$ in sequence starting with $y^{(p)}(0)$ to resource elements (k,l) on antenna port p meeting the criteria above shall be increasing order of the first the index k and the index l, starting with the first slot and ending with the second slot in a subframe. For NPDSCH not carrying BCCH, after mapping to a subframe, the subframe shall be repeated for $M_{rep}^{NPDSCH}-1$ additional subframes, before continuing the mapping of $y^{(p)}(\cdot)$ to the following subframe. The mapping of $y^{(p)}(0), \ldots y^{(p)}(M_{symb}^{ap}-1)$ is then repeated until $M_{rep}^{NPDSCH}N_{SF}$ subframes have been transmitted. For NPDSCH carrying BCCH, the $y^{(p)}(0), \ldots y^{(p)}(M_{symb}^{ap}-1)$ is mapped to $N_{SF}$ subframes in sequence and then repeated until $M_{rep}^{NPDSCH}N_{SF}$ subframes have been transmitted.

The NPDSCH transmission can be configured by higher layers with transmission gaps where the NPSDCH transmission is postponed. There are no gaps in the NPDSCH transmission if $R_{max} < N_{gap,threshold}$ where $N_{gap,threshold}$ is given by the higher layer parameter dl-GapThreshold and $R_{max}$ is given by 3GPP TS 36.213. The gap starting frame and subframe is given by $(10n_f + \lfloor n_s/2 \rfloor) \mod N_{gap,period} = 0$ where the gap periodicity, $N_{gap,period}$, is given by the higher layer parameter dl-GapPeriodicity. The gap duration in number of subframes is given by $N_{gap,duration} = N_{gap,coeff} N_{gap,period}$, where $N_{gap,coeff}$ is given by the higher layer parameter dl-GapDurationCoeff. For NPDSCH carrying the BCCH there are no gaps in the transmission.

The UE shall not expect NPDSCH in subframe i if it is not a NB-IoT downlink subframe, except for transmissions of NPDSCH carrying SystemInformationBlockType1-NB in subframe 4. In case of NPDSCH transmissions, in subframes that are not NB-IoT downlink subframes, the NPDSCH transmission is postponed until the next NB-IoT downlink subframe.

UE Procedure for Receiving NPDSCH

A NB-IoT UE shall assume a subframe as a NB-IoT DL subframe if
the UE determines that the subframe does not contain NPSS/NSSS/NPBCH/NB-SIB1 transmission, and
for a NB-IoT carrier that a UE receives higher layer parameter operationModeInfo, the subframe is configured as NB-IoT DL subframe after the UE has obtained SystemInformationBlockType1-NB.
for a NB-IoT carrier that DL-CarrierConfigCommon-NB is present, the subframe is configured as NB-IoT DL subframe by the higher layer parameter downlinkBitmapNonAnchor.

For a NB-IoT UE that supports twoHARQ-Processes-r14, there shall be a maximum of 2 downlink HARQ processes.

A UE shall upon detection on a given serving cell of a NPDCCH with DCI format N1, N2 ending in subframe n intended for the UE, decode, starting in n+5 DL subframe, the corresponding NPDSCH transmission in N consecutive NB-IoT DL subframe(s) $n_i$ with i=0, 1, . . . , N−1 according to the NPDCCH information, where
subframe n is the last subframe in which the NPDCCH is transmitted and is determined from the starting subframe of NPDCCH transmission and the DCI subframe repetition number field in the corresponding DCI;
subframe(s) ni with i=0, 1, . . . , N−1 are N consecutive NB-IoT DL subframe(s) excluding subframes used for SI messages where, n0<n1< . . . , nN−1, $N = N_{Rep} N_{SF}$, where the value of $N_{Rep}$ is determined by the repetition number field in the corresponding DCI, and the value of $N_{SF}$ is determined by the resource assignment field in the corresponding DCI, and $k_0$ is the number of NB-IoT DL subframe(s) starting in DL subframe n+5 until DL subframe$_0$, where $k_0$ is determined by the scheduling delay field ($I_{Delay}$) for DCI format N1, and $k_0=0$ for DCI format N2. For DCI CRC scrambled by G-RNTI, $k_0$ is determined by the scheduling delay field ($I_{Delay}$) according to Table 21, otherwise $k_0$ is determined by the scheduling delay field ($I_{Delay}$) according to Table 20. The value of $R_{m,ax}$ is according to Subclause 16.6 in 3GPP 36.213 for the corresponding DCI format N1.

Table 20 shows an example of $k_0$ for DCI format N1.

TABLE 20

| $I_{Delay}$ | $k_0$ | |
| --- | --- | --- |
| | $R_{max} < 128$ | $R_{max} \geq 128$ |
| 0 | 0 | 0 |
| 1 | 4 | 16 |
| 2 | 8 | 32 |
| 3 | 12 | 64 |
| 4 | 16 | 128 |
| 5 | 32 | 256 |
| 6 | 64 | 512 |
| 7 | 128 | 1024 |

Table 21 shows an example of $k_0$ for DCI format N1 with DCI CRC scrambled by G-RNTI.

TABLE 21

| $I_{Delay}$ | $k_0$ |
| --- | --- |
| 0 | 0 |
| 1 | 4 |
| 2 | 8 |
| 3 | 12 |
| 4 | 16 |
| 5 | 32 |
| 6 | 64 |
| 7 | 128 |

A UE is not expected to receive transmissions in 3 DL subframes following the end of a NPUSCH transmission by the UE.

The resource allocation information in DCI format N1, N2 (paging) for NPDSCH indicates to a scheduled UE.

Table 22 shows an example of the number of subframes for NPDSCH. The number of subframes ($N_{SF}$) determined by the resource assignment field ($I_{SF}$) in the corresponding DCI according to Table 22.

A repetition number ($N_{Rep}$) determined by the repetition number field ($I_{Rep}$) in the corresponding DCI according to Table 23.

TABLE 22

| $I_{SF}$ | $N_{SF}$ |
| --- | --- |
| 0 | 1 |
| 1 | 2 |
| 2 | 3 |
| 3 | 4 |
| 4 | 5 |
| 5 | 6 |

TABLE 22-continued

| $I_{SF}$ | $N_{SF}$ |
| --- | --- |
| 6 | 8 |
| 7 | 10 |

Table 23 shows an example of the number of repetitions for NPDSCH.

TABLE 23

| $I_{Rep}$ | $N_{Rep}$ |
| --- | --- |
| 0 | 1 |
| 1 | 2 |
| 2 | 4 |
| 3 | 8 |
| 4 | 16 |
| 5 | 32 |
| 6 | 64 |
| 7 | 128 |
| 8 | 192 |
| 9 | 256 |
| 10 | 384 |
| 11 | 512 |
| 12 | 768 |
| 13 | 1024 |
| 14 | 1536 |
| 15 | 2048 |

The number of repetitions for the NPDSCH carrying SystemInformationBlockType1-NB is determined based on the parameter schedulingInfoSIB1 configured by higher-layers and according to Table 24.

Table 24 shows an example of the number of repetitions for SIB1-NB.

TABLE 24

| Value of schedulingInfoSIB1 | Number of NPDSCH repetitions |
| --- | --- |
| 0 | 4 |
| 1 | 8 |
| 2 | 16 |
| 3 | 4 |
| 4 | 8 |
| 5 | 16 |
| 6 | 4 |
| 7 | 8 |
| 8 | 16 |
| 9 | 4 |
| 10 | 8 |
| 11 | 16 |
| 12-15 | Reserved |

The starting radio frame for the first transmission of the NPDSCH carrying SystemInformationBlockType1-NB is determined according to Table 25.

Table 25 shows an example of the starting radio frame for the first transmission of the NPDSCH carrying SIB1-NB.

TABLE 25

| Number of NPDSCH repetitions | $N_{ID}^{Ncell}$ | Starting radio frame number for NB-SIB1 repetitions ($n_f$ mod 256) |
| --- | --- | --- |
| 4 | $N_{ID}^{Ncell}$ mod 4 = 0 | 0 |
| | $N_{ID}^{Ncell}$ mod 4 = 1 | 16 |
| | $N_{ID}^{Ncell}$ mod 4 = 2 | 32 |
| | $N_{ID}^{Ncell}$ mod 4 = 3 | 48 |
| 8 | $N_{ID}^{Ncell}$ mod 2 = 0 | 0 |
| | $N_{ID}^{Ncell}$ mod 2 = 1 | 16 |

TABLE 25-continued

| Number of NPDSCH repetitions | $N_{ID}^{Ncell}$ | Starting radio frame number for NB-SIB1 repetitions ($n_f$ mod 256) |
|---|---|---|
| 16 | $N_{ID}^{Ncell}$ mod 2 = 0 | 0 |
|  | $N_{ID}^{Ncell}$ mod 2 = 1 | 1 |

The starting OFDM symbol for NPDSCH is given by index $l_{DataStrart}$ in the first slot in a subframe k and is determined as follows if subframe k is a subframe used for receiving SIB1-NB $l_{DataStrart}$=3 if the value of the higher layer parameter operationModeInfo is set to '00' or '01'

$l_{DataStrart}$=0 otherwise.

else $l_{DataStrart}$ is given by the higher layer parameter eutra-ControlRegionSize if the value of the higher layer parameter eutraControlRegionSize is present.

$l_{DataStrart}$=0 otherwise.

UE Procedure for Reporting ACK/NACK

The UE shall upon detection of a NPDSCH transmission ending in NB-IoT subframe n intended for the UE and for which an ACK/NACK shall be provided, start, at the end of n+k$_0$−1 DL subframe transmission of the NPUSCH carrying ACK/NACK response using NPUSCH format 2 in N consecutive NB-IoT UL slots, where N=$N_{rep}^{AN} N_{slots}^{UL}$, where the value of $N_{Rep}^{AN}$ is given by the higher layer parameter ack-NACK-NumRepetitions-Msg4 configured for the associated NPRACH resource for Msg4 NPDSCH transmission, and higher layer parameter ack-NACK-NumRepetitions otherwise, and the value of $N_{slots}^{UL}$ is the number of slots of the resource unit, allocated subcarrier for ACK/NACK and value of k0 is determined by the ACK/NACK resource field in the DCI format of the corresponding NPDCCH according to Table 16.4.2-1, and Table 16.4.2-2 in 3GPP TS36.213.

Narrowband Physical Broadcast Channel (NPBCH)

The processing structure for the BCH transport channel is according to Section 5.3.1 of 3GPP TS 36.212, with the following differences:

The transmission time interval (TTI) is 640 ms.

The size of the BCH transport block is set to 34 bits

The CRC mask for NPBCH is selected according to 1 or 2 transmit antenna ports at eNodeB according to Table 5.3.1.1-1 of 3GPP TS 36.212, where the transmit antenna ports are defined in section 10.2.6 of 3GPP TS 36.211

The number of rate matched bits is defined in section 10.2.4.1 of 3GPP TS 36.211

Scrambling shall be done according to clause 6.6.1 of 3GPP TS 36.211 with $M_{bit}$ denoting the number of bits to be transmitted on the NPBCH. $M_{bit}$ equals 1600 for normal cyclic prefix. The scrambling sequence shall be initialized with $c_{init}=N_{ID}^{Ncell}$ in radio frames fulfilling $n_f$ mod 64=0.

Modulation should be done using QPSK modulation scheme for each antenna port is transmitted in subframe 0 during 64 consecutive radio frames starting in each radio frame fulfilling $n_f$ mod 64=0 and shall Layer mapping and precoding shall be done according to clause 6.6.3 of 3GPP TS 36.211 with P∈{1,2}. The UE shall assume antenna ports R$_{2000}$ and R$_{2001}$ are used for the transmission of the narrowband physical broadcast channel.

The block of complex-valued symbols $y^{(p)}(0), \ldots, y^{(p)}(M_{symb}-1)$ for each antenna port is transmitted in subframe 0 during 64 consecutive radio frames starting in each radio frame fulfilling $n_f$ mod 64=0 and shall be mapped in sequence starting consecutive radio frames starting with y(0) to resource elements (k, l) not reserved for transmission of reference signals shall be in increasing order of the first the index k, then the index 1. After mapping to a subframe, the subframe shall be repeated in subframe 0 in the 7 following radio frames, before continuing the mapping of $y^{(p)}(\cdot)$ to subframe 0 in the following radio frame. The first three OFDM symbols in a subframe shall not be used in the mapping process. For the purpose of the mapping, the UE shall assume cell-specific reference signals for antenna ports 0-3 and narrowband reference signals for antenna ports 2000 and 2001 being present irrespective of the actual configuration. The frequency shift of the cell-specific reference signals shall be calculated by replacing cell $N_{ID}^{cell}$ with $N_{ID}^{Ncell}$ in the calculation of $v_{shift}$ in clause 6.10.1.2 of 3GPP TS 36.211.

Narrowband Physical Downlink Control Channel (NPDCCH)

The narrowband physical downlink control channel carries control information. A narrowband physical control channel is transmitted on an aggregation of one or two consecutive narrowband control channel elements (NCCEs), where a narrowband control channel element corresponds to 6 consecutive subcarriers in a subframe where NCCE 0 occupies subcarriers 0 through 5 and NCCE 1 occupies subcarriers 6 through 11. The NPDCCH supports multiple formats as listed in Table 26. For NPDCCH format 1, both NCCEs belong to the same subframe. One or two NPDCCHs can be transmitted in a subframe.

Table 26 shows an example of supported NPDCCH formats.

TABLE 26

| NPDCCH format | Number of NCCEs |
|---|---|
| 0 | 1 |
| 1 | 2 |

Scrambling shall be done according to clause 6.8.2 of TS36.211. The scrambling sequence shall be initialized at the start of subframe k$_0$ according to section 16.6 of TS36.213 after every 4$^{th}$ NPDCCH subframe with $c_{init}=\lfloor n_s/2 \rfloor 2^9 + N_{ID}^{Ncell}$ where n$_s$ is the first slot of the NPDCCH subframe in which scrambling is (re-)initialized.

Modulation shall be done according to clause 6.8.3 of TS36.211 using the QPSK modulation scheme.

Layer mapping and precoding shall be done according to clause 6.6.3 of TS36.211 using the same antenna ports as the NPBCH.

The block of complex-valued symbols $y(0), \ldots y(M_{symb}-1)$ shall be mapped in sequence starting with y(0) to resource elements (k, l) on the associated antenna port which meet all of the following criteria:

they are part of the NCCE(s) assigned for the NPDCCH transmission, and they are not used for transmission of NPBCH, NPSS, or NSSS, and they are assumed by the UE not to be used for NRS, and they are not overlapping with resource elements used for PBCH, PSS, SSS, or CRS as defined in clause 6 of TS36.211 (if any), and the index l in the first slot in a subframe fulfils $l \geq l_{NPDCCHStart}$ where $l_{NPDCCHStart}$ is given by clause 16.6.1 of 3GPP TS 36.213.

The mapping to resource elements (k, l) on antenna port p meeting the criteria above shall be in increasing order of first the index k and then the index l, starting with the first slot and ending with the second slot in a subframe.

The NPDCCH transmission can be configured by higher layers with transmissions gaps where the NPDCCH transmission is postponed. The configuration is the same as described for NPDSCH in clause 10.2.3.4 of TS36.211.

The UE shall not expect NPDCCH in subframe i if it is not a NB-IoT downlink subframe. In case of NPDCCH transmissions, in subframes that are not NB-IoT downlink subframes, the NPDCCH transmission is postponed until the next NB-IoT downlink subframe.

DCI Format

DCI Format N0

DCI format N0 is used for the scheduling of NPUSCH in one UL cell. The following information is transmitted by means of the DCI format N0:

Flag for format N0/format N1 differentiation (1 bit), Subcarrier indication (6 bits), Resource assignment (3 bits), Scheduling delay (2 bits), Modulation and coding scheme (4 bits), Redundancy version (1 bit), Repetition number (3 bits), New data indicator (1 bit), DCI subframe repetition number (2 bits).

DCI Format N1

DCI format N1 is used for the scheduling of one NPDSCH codeword in one cell and random access procedure initiated by a NPDCCH order. The DCI corresponding to a NPDCCH order is carried by NPDCCH. The following information is transmitted by means of the DCI format N1:

Flag for format N0/format N1 differentiation (1 bit), NPDCCH order indicator (1 bit)

Format N1 is used for random access procedure initiated by a NPDCCH order only if NPDCCH order indicator is set to "1", format N1 CRC is scrambled with C-RNTI, and all the remaining fields are set as follows:

Starting number of NPRACH repetitions (2 bits), Subcarrier indication of NPRACH (6 bits), All the remaining bits in format N1 are set to one Otherwise, Scheduling delay (3 bits), Resource assignment (3 bits), Modulation and coding scheme (4 bits), Repetition number (4 bits), New data indicator (1 bit), HARQ-ACK resource (4 bits), DCI subframe repetition number (2 bits)

When the format N1 CRC is scrambled with an RA-RNTI, then the following fields among the fields above are reserved.

New data indicator, HARQ-ACK resource

If the number of information bits in format N1 is less than the number of information bits in format N0, zero shall be appended to format N1 until the payload size equals that of format N0.

DCI Format N2

DCI format N2 is used for paging and direct indication. The following information is transmitted by means of the DCI format N2.

Flag for paging/direct indication differentiation (1 bit)

If Flag=0:

Direct indication information (8 bits), reservation information bits are added until the size is equal to that of format N2 with Flag=1

If Flag=1:

Resource assignment (3 bits), Modulation and coding scheme (4 bits), Repetition number (4 bits), and DCI subframe repetition number (3 bits)

NPDCCH-Related Procedure

A UE shall monitor a set of NPDCCH candidates as configured by higher layer signalling for control information, where monitoring implies attempting to decode each of the NPDCCHs in the set according to all the monitored DCI formats.

An NPDCCH search space $NS_k^{(L',R)}$ at aggregation level $L' \in \{1,2\}$ and repetition level $R \in \{1, 2, 4, 8, 16, 32, 64, 128, 256, 512, 1024, 2048\}$ is defined by a set of NPDCCH candidates where each candidate is repeated in a set of R consecutive NB-IoT downlink subframes excluding subframes used for transmission of SI messages starting with subframe k.

The locations of starting subframe k are given by $k=k_b$ where $k_b$ is the $b^{th}$ consecutive NB-IoT DL subframe from subframe k0, excluding subframes used for transmission of SI messages, and $b=u \cdot R$, and $u=0, 1, \ldots$ $$\frac{R_{max}}{R} - 1,$$

and where subframe k0 is a subframe satisfying the condition $(10 n_f + \lfloor n_s/2 \rfloor) \bmod T = \lfloor \alpha_{offset} \cdot T \rfloor$, where $T = R_{max} \cdot G$, $T \geq 4$. G and $\alpha_{offset}$ are given by the higher layer parameters.

For Type1-NPDCCH common search space, k=k0 and is determined from locations of NB-IoT paging opportunity subframes.

If the UE is configured by high layers with a NB-IoT carrier for monitoring of NPDCCH UE-specific search space, the UE shall monitor the NPDCCH UE-specific search space on the higher layer configured NB-IoT carrier, the UE is not expected to receive NPSS, NSSS, NPBCH on the higher layer configured NB-IoT carrier.

otherwise, the UE shall monitor the NPDCCH UE-specific search space on the same NB-IoT carrier on which NPSS/NSSS/NPBCH are detected.

The starting OFDM symbol for NPDCCH given by index $l_{NPDCCHStart}$ in the first slot in a subframe k and is determined as follows.

if higher layer parameter eutraControlRegionSize is present, $l_{NPDCCHStart}$ is given by the higher layer parameter eutraControlRegionSize.

otherwise $l_{NPDCCHStart}=0$.

Narrowband Reference Signal (NRS)

Before a UE obtains operationModeInfo, the UE may assume narrowband reference signals are transmitted in subframes #0 and #4 and in subframes #9 not containing NSSS.

When a UE receives higher-layer parameter operationModeInfo indicating guardband or standalone, Before the UE obtains SystemInformationBlockType1-NB, the UE may assume narrowband reference signals are transmitted in subframes #9 not containing NSSS and in subframes #0, #1, #3, and #4.

After the UE obtains SystemInformationBlockType1-NB, the UE may assume narrowband reference signals are transmitted in subframes #9 not containing NSSS, in subframes #0, #1, #3, and #4, and in NB-IoT downlink subframes and shall not expect narrowband reference signals in other downlink subframes.

When a UE receives higher-layer parameter operationModeInfo indicating inband-SamePCI or inband-DifferentPCI, Before the UE obtains SystemInformationBlockType1-NB, the UE may assume narrowband reference signals are transmitted in subframes #9 not containing NSSS and in subframes #0 and #4.

After the UE obtains SystemInformationBlockType1-NB, the UE may assume narrowband reference signals are transmitted in subframes #9 not containing NSSS, in subframes #0 and #4, and in NB-IoT downlink subframes and shall not expect narrowband reference signals in other downlink subframes.

Narrowband Primary Synchronization Signal (NPSS)

The sequence $d_l(n)$ used for the narrowband primary synchronization signal is generated from a frequency-domain Zadoff-Chu sequence according to Equation 17:

$$d_l(n) = S(l) \cdot e^{-j\frac{\pi u n(n+1)}{11}}, \quad n = 0, 1, \ldots, 10 \quad \text{[Equation 17]}$$

where the Zadoff-Chu root sequence index u=5 and S(l) for different symbol indices l is given by Table 27.

Table 27 shows an example of S(l).

TABLE 27

| Cyclic prefix length | S(3), ..., S(13) |
|---|---|
| Normal | 1  1  1  1  −1  −1  1  1  1  −1  1 |

The same antenna port shall be used for all symbols of the narrowband primary synchronization signal within a subframe.

UE shall not assume that the narrowband primary synchronization signal is transmitted on the same antenna port as any of the downlink reference signals. The UE shall not assume that the transmissions of the narrowband primary synchronization signal in a given subframe use the same antenna port, or ports, as the narrowband primary synchronization signal in any other subframe.

The sequences $d_l(n)$ shall be mapped to resource elements (k, l) in increasing order of first the index k= 0, 1, ..., $N_{sc}^{RB}$−2 and then the index l=3, 4, ..., $2N_{symb}^{DL}$−1 in subframe 5 in every radio frame. For resource elements (k, l) overlapping with resource elements where cell-specific reference signals are transmitted, the corresponding sequence element d(n) is not used for the NPSS but counted in the mapping process.

Narrowband Secondary Synchronization Signal (NSSS)

The sequence d(n) used for the narrowband secondary synchronization signal is generated from a frequency-domain Zadoff-Chu sequence according to Equation 18:

$$d(n) = b_q(n) \cdot e^{-j2\pi\theta_f n} \cdot e^{-j\frac{\pi u n'(n'+1)}{131}} \quad \text{[Equation 18]}$$

where $n = 0, 1, \ldots, 131$ $n' = n \bmod 131$ $m = n \bmod 128$ $u = N_{ID}^{Ncell} \bmod 126 + 3$ $q = \left\lfloor \frac{N_{ID}^{Ncell}}{126} \right\rfloor$ The binary sequence $b_q(n)$ is given by Table 28. The cyclic shift $\theta_f$ in frame number $n_f$ is given by $\theta_f = 33/132 \cdot (n_f/2) \bmod 4$ Table 28 shows an example of $b_q(n)$.

TABLE 28

| q | $b_q(0), \ldots, b_q(127)$ |
|---|---|
| 0 | [1 1 1 1 1 1 1 1 1 1 1 1 1 1 1 1 1 1 1 1 1 1 1 1 1 1 1 1 1 1 1 1<br>1 1 1 1 1 1 1 1 1 1 1 1 1 1 1 1 1 1 1 1 1 1 1 1 1 1 1 1 1 1 1 1<br>1 1 1 1 1 1 1 1 1 1 1 1 1 1 1 1 1 1 1 1 1 1 1 1 1 1 1 1 1 1 1 1<br>1 1 1 1 1 1 1 1 1 1 1 1 1 1 1 1 1 1 1 1 1 1 1 1 1 1 1 1 1 1 1 1<br>1 1 1 1 1 1 1 1 1 1 1 1 1 1 1 1 1 1 1 1 1 1 1 1 1 1 1 1 1 1 1 1] |
| 1 | [1 −1 −1 1 −1 1 1 −1 −1 1 1 −1 1 −1 −1 1 −1 1 1 −1<br>1 −1 −1 1 1 −1 −1 1 −1 1 1 −1 1 −1 −1 1 −1 1 1 −1 −1 1<br>1 1 −1 1 −1 1 −1 1 1 1 −1 1 −1 −1 1 1 1 −1 −1<br>1 −1 1 1 −1 1 −1 1 −1 1 1 1 −1 1 1 −1 1 −1 −1 1<br>1 −1 1 1 −1 1 −1 1 1 −1 1 1 1 −1 1 1 −1 1 −1 −1 1<br>1 −1 1 1 −1 −1 1 1 −1 1 −1 1 1 1 −1 1 1 −1 1 −1 −1 1<br>1 1 −1 1 1 −1 1 1 1 −1]] |
| 2 | [1 −1 −1 1 −1 1 1 −1 −1 1 1 −1 1 −1 −1 1 −1 1 1 −1<br>1 −1 −1 1 1 −1 −1 1 −1 1 1 −1 1 −1 −1 1 −1 1 −1<br>1 1 −1 1 −1 1 1 −1 1 −1 −1 1 −1 1 1 −1 −1 1 1 1 −1<br>1 −1 −1 1 1 −1 −1 1 −1 1 −1 1 1 1 −1 1 1 −1 1 −1<br>1 −1 1 1 1 −1 1 −1 1 1 −1 −1 1 1 1 −1 1 −1 1 1<br>1 −1 1 −1 −1 1 1 1 −1 1 1 −1 1 −1 1 1 −1 1 −1 1 1 −1 1 1<br>1 −1 −1 1 1 −1 1 −1 1 1 1]] |
| 3 | [1 −1 −1 1 −1 1 1 −1 −1 1 1 −1 1 −1 −1 1 1 −1 1 1 1 −1<br>1 −1 −1 1 1 1 −1 1 −1 1 1 1 −1 1 1 1 −1 −1 1 1 −1<br>1 1 −1 1 −1 1 1 1 −1 1 1 −1 1 −1 −1 1 1 1 −1 −1 1 1 1 −1<br>1 −1 −1 1 −1 1 1 −1 1 −1 −1 1 1 −1 1 −1 1 1 1 −1<br>1 −1 −1 1 −1 1 1 −1 1 1 1 −1 1 1 −1 1 1 1 −1 1 1<br>1 −1 1 1 1 −1 1 1 1 −1 1 1 −1 1 1 −1 1 1 −1 1 −1 −1 1<br>1 1 −1 −1 1 1 −1 1 1 1 −1]] |

The same antenna port shall be used for all symbols of the narrowband secondary synchronization signal within a subframe.

The UE shall not assume that the narrowband secondary synchronization signal is transmitted on the same antenna port as any of the downlink reference signals. The UE shall not assume that the transmissions of the narrowband secondary synchronization signal in a given subframe use the same antenna port, or ports, as the narrowband secondary synchronization signal in any other subframe.

The sequence d(n) shall be mapped to resource elements (k,l) in sequence starting with d(0) in increasing order of first the index k over the 12 assigned subcarriers and then the index l over the last $N_{symb}^{NSSS}$ symbols allocated in radio frames fulfilling $n_f \bmod 2 = 0$, where $N_{symb}^{NSSS}$ is given by Table 29.

Table 29 shows an example of the number of NSSS symbols.

TABLE 29

| Cycle prefix length | $N_{symb}^{NSSS}$ |
|---|---|
| Normal | 11 |

OFDM Baseband Signal Generation

If the higher layer parameter operationModeInfo does not indicate 'inband-SamePCI' and samePCI-Indicator does not indicate 'samePCI', then the time-continuous signal $s_l^{(p)}(t)$ on antenna port p in OFDM symbol l in a downlink slot is defined by Equation 19:

$$s_l^{(p)}(t) = \sum_{k=-\lceil N_{sc}^{RB}/2 \rceil}^{\lceil N_{sc}^{RB}/2 \rceil - 1} a_{k^{(-)},l}^{(p)} \cdot e^{j2\pi(k+\frac{1}{2})\Delta f(t - N_{CP,i}T_s)}$$ [Equation 19]

for $0 \le t < (N_{CP,i}+N) \times T_s$ where $k^{(-)} = k + \lfloor N_{sc}^{RB}/2 \rfloor$, N=2048, $\Delta f$=15 kHz and $a_{k,l}^{(p)}$ is the content of resource element (k, l) on antenna port p.

If the higher layer parameter operationModeInfo indicates 'inband-SamePCI' or samePCI-Indicator indicate 'samePCI', then the time-continuous signal $s_l^{(p)}(t)$ on antenna port p in OFDM symbol l', where $l'=l+N_{symb}^{DL}$ ($n_s$ mod 4)∈ {0, . . . , 27} is the OFDM symbol index from the start of the last even-numbered subframe, is defined by Equation 20.

$$s_l^{(p)}(t) = \sum_{k=-\lfloor N_{RB}^{DL} N_{sc}^{RB}/2 \rfloor}^{-1} e_{k(-)}^{\theta} a_{k(-),l}^{(p)} \cdot e^{j2\pi k \Delta f \left(t - N_{CP,l' \bmod N_{symb}^{DL}} T_s\right)} + \sum_{k=1}^{\lceil N_{RB}^{DL} N_{sc}^{RB}/2 \rceil} e_{k(+)}^{\theta} a_{k(+),l}^{(p)} \cdot e^{j2\pi k \Delta f \left(t - N_{CP,l' \bmod N_{symb}^{DL}} T_s\right)}$$ [Equation 20]

for $0 \le t < (N_{CP,i}+N) \times T_s$ where $k^{(-)}=k+\lfloor N_{RB}^{DL} N_{sc}^{RB}/2 \rfloor$ and $k^{(+)}=k+\lfloor N_{RB}^{DL} N_{sc}^{RB}/2 \rfloor -1$, $\theta_{k,l}=j2\pi f_{NB-IoT}T_s(N+\Sigma_{i=0}^{l'} N_{CP,i \bmod 7})$ if resource element (k,l') is used for Narrowband IoT, and 0 otherwise, and $f_{NB-IoT}$ is the frequency location of the carrier of the Narrowband IoT PRB minus the frequency location of the center of the LTE signal.

In a specific 3GPP spec., only normal CP is supported for narrowband IoT downlink.

Hereinafter, a physical layer process of a narrowband physical broadcast channel (NPBCH) is described in more details.

Scrambling

Scrambling shall be done according to Clause 6.6.1 of 3GPP TS 36.211 with Mbit denoting the number of bits to be transmitted on the NPBCH. Mbit equals 1600 for normal cyclic prefix. The scrambling sequence shall be initialized with $c_{init}=N_{ID}^{Ncell}$ in radio frames that satisfy $n_f$ mod 64=0.

Modulation

Modulation shall be done according to Clause 6.6.2 of TS36.211 using the modulation scheme in Table30.

Table 30 shows an example of a modulation scheme for NPBCH.

TABLE 30

| Physical channel | Modulation methods |
|---|---|
| NPBCH | QPSK |

Layer Mapping and Precoding

Layer mapping and precoding shall be done according to Clause 6.6.3 of 3GPP TS 36.211 with P∈{1, 2}. The UE shall assume antenna ports $R_{2000}$ and $R_{2001}$ are used for the transmission of the narrowband physical broadcast channel.

Mapping to Resource Elements

The block of complex-valued symbols $y^{(p)}(0), \ldots, y^{(p)}(M_{symb}-1)$ for each antenna port is transmitted in subframe 0 during 64 consecutive radio frames starting in each radio frame fulfilling $n_f$ mod 64=0 and shall be mapped in sequence starting with y(0) to resource elements (k,l) The mapping to resource elements (k,l) not reserved for transmission of reference signals shall be in increasing order of first the index k, then the index l. After mapping to a subframe, the subframe shall be repeated in subframe 0 in the 7 following radio frames, before continuing the mapping of $y^{(p)}(\cdot)$ to subframe 0 in the following radio frame. The first three OFDM symbols in a subframe shall not be used in the mapping process.

For the purpose of the mapping, the UE shall assume cell-specific reference signals for antenna ports 0-3 and narrowband reference signals for antenna ports 2000 and 2001 being present irrespective of the actual configuration. The frequency shift of the cell-specific reference signals shall be calculated by replacing $N_{ID}^{cell}$ with $N_{ID}^{cell}$ in the calculation of $v_{shift}$ in clause 6.10.1.2.

Next, information related to MIB-NB and SIBN1-NB will be described more specifically.

MasterinformationBlock-NB

The MasterinformationBlock-NB includes the system information transmitted on BCH.

Signalling radio bearer: N/A
RLC-SAP: TM
Logical channel: BCCH
Direction: E-UTRAN to UE Table 31 shows an example of a MasterinformationBlock-NB format.

TABLE 31

| -- ASN1START | |
|---|---|
| MasterInformationBlock-NB ::= | SEQUENCE { |
|    systemFrameNumber-MSB-r13 | BIT STRING (SIZE (4)), |
|    hyperSFN-LSB-r13 | BIT STRING (SIZE (2)), |
|    schedulingInfoSIB1-r13 | INTEGER (0..15), |
|    systemInfoValueTag-r13 | INTEGER (0..31), |
|    ab-Enabled-r13 | BOOLEAN, |
|    operationModeInfo-r13 | CHOICE { |
|       inband-SamePCI-r13 | Inband-SamePCI-NB-r13, |
|       inband-DifferentPCI-r13 | Inband-DifferentPCI-NB-r13, |
|       guardband-r13 | Guardband-NB-r13, |
|       standalone-r13 | Standalone-NB-r13 |
|    }, | |
|    spare | BIT STRING (SIZE (11)) |
| } | |

TABLE 31-continued

```
ChannelRasterOffset-NB-r13 ::= ENUMERATED {khz-7dot5, khz-2dot5,khz2dot5,
khz7dot5}
Guardband-NB-r13 ::=           SEQUENCE {
    rasterOffset-r13           ChannelRasterOffset-NB-r13,
    spare                      BIT STRING (SIZE (3))
}
inband-SamePCI-NB-r13 ::=      SEQUENCE {
    eutra-CRS-SequenceInfo-r13     INTEGER (0..31)
}
inband-DifferentPCI-NB-r13 ::= SEQUENCE {
    eutra-NumCRS-Ports-r13         ENUMERATED {same, four},
    rasterOffset-r13           channelRasterOffset-NB-r13,
    spare                      BIT STRING (SIZE (2))
}
Standalone-NB-r13 ::=          SEQUENCE {
    spare                      BIT STRING (SIZE (5))
}
-- ASN1STOP
```

Table 32 shows the description of the MasterinformationBlock-NB field.

TABLE 32

MasterInformationBlock-NB field descriptions ab-Enabled
Value TRUE indicates that access barring is enabled and that the UE shall acquire SystemInformationBlockType14-NB before initiating RRC connection establishment or resume.
eutra-CRS-SequenceInfo
Information of the carrier containing NPSS/NSSS/NPBCH.
Each value is associated with an E-UTRA PRB index as an offset from the middle of the LTE system sorted out by channel raster offset. See TS 36.211 [21] and TS 36.213 [23].
eutra-NumCRS-Ports
Number of E-UTRA CRS antenna ports, either the same number of ports as NRS or 4 antenna ports. See TS 36.211 [21], TS 36.212 [22], and TS 36.213 [23].
hyperSFN-LSB
Indicates the 2 least significant bits of hyper SFN. The remaining bits are present in SystemInformationBlockType1-NB.
operationModeInfo
Deployment scenario (in-band/guard-band/standalone) and related information. See TS 36.211 [21] and TS 36.213 [23].
Inband-SamePCI indicates an in-band deployment and that the NB-IoT and LTE cell share the same physical cell id and have the same number of NRS and CRS ports.
Inband-DifferentPCI indicates an in-band deployment and that the NB-IoT and LTE cell have different physical cell id.
guardband indicates a guard-band deployment.
standalone indicates a standalone deployment.
rasterOffset
NB-IoT offset from LTE channel raster. Unit in kHz in set {−7.5, −2.5, 2.5, 7.5} See TS 36.211[21] and TS 36.213 [23].
schedulingInfoSIB1
This field contains an index to a table specified in TS 36.213 [23, Table 16.4.1.3-3] that defines SystemInformationBlockType1-NB scheduling information.
systemFrameNumber-MSB
Defines the 4 most significant bits of the SFN. As indicated in TS 36.211 [21], the 6 least significant bits of the SFN are acquired implicitly by decoding the NPBCH.
systemInfoValueTag
Common for all SIBs other than MIB-NB, SIB14-NB and SIB16-NB.

SystemInformationBlockType1-NB

The SystemInformationBlockType1-NB message contains information relevant when evaluating if a UE is allowed to access a cell and defines the scheduling of other system information.

Signalling radio bearer: N/A

RLC-SAP: TM

Logical channel: BCCH

Direction: E-UTRAN to UE

Table 33 shows an example of the SystemInformationBlockType1 (SIB1)-NB message.

TABLE 33

```
-- ASN1START
SystemInformationBlockType1-NB ::= SEQUENCE {
    hyperSFN-MSB-r13              BIT STRING (SIZE (8)),
    cellAccessRelatedInfo-r13     SEQUENCE {
        plmn-IdentityList-r13         PLMN-IdentityList-NB-r13,
        trackingAreaCode-r13          TrackingAreaCode,
        cellIdentity-r13              cellIdentity,
        cellBarred-r13                ENUMERATED {barred, notBarred},
        intraFreqReselection-r13      ENUMERATED {allowed, notAllowed}
    },
    cellSelectionInfo-r13         SEQUENCE {
        q-RxLevMin-r13                Q-RxLevMin,
        q-QualMin-r13                 Q-QualMin-r9
    },
    p-Max-r13                     P-Max                OPTIONAL,  -- Need OP
    freqBandIndicator-r13         FreqBandIndicator-NB-r13,
    freqBandInfo-r13              NS-PmaxList-NB-r13        OPTIONAL,
-- Need OR
    multiBandInfoList-r13         MultiBandInfoList-NB-r13           OPTIONAL, --
Need OR
    downlinkBitmap-r13            DL-Bitmap-NB-r13
OPTIONAL,    -- Need OP,
    eutraControlRegionSize-r13    ENUMERATED {n1, n2, n3}
OPTIONAL,    -- Cond inband
    nrs-CRS-PowerOffset-r13       ENUMERATED {dB-6,          dB-4dot77,
dB-3,
                                              dB-1dot77,    dB0,         dB1,
                                              dB1dot23,     dB2,         dB3,
                                              dB4,          dB4dot23,    dB5,
                                              dB6,          dB7,         dB8,
                                              dB9}   OPTIONAL,   -- Cond
inband-SamePCI
    schedulingInfoList-r13        SchedulingInfoList-NB-r13,
    si-WindowLength-r13           ENUMERATED {ms160, ms320, ms480,
    ms640,
                                              ms960, ms1280, ms1600, spare1},
    si-RadioFrameOffset-r13       INTEGER (1..15)    OPTIONAL, --
Need OP
    systemInfoValueTagList-r13    SystemInfoValueTagList-NB-r13
OPTIONAL,    -- Need OR
    lateNonCriticalExtension      OCTET STRING              OPTIONAL,
    nonCriticalExtension          SEQUENCE { }
    OPTIONAL
}
PLMN-IdentityList-NB-r13 ::=    SEQUENCE (SIZE (1..maxPLMN-r11)) OF PLMN-
IdentityInfo-NB-r13
PLMN-IdentityInfo-NB-r13 :: =   SEQUENCE {
    plmn-Identity-r13             PLMN-Identity,
    cellReservedForOperatorUse-r13        ENUMERATED {reserved, notReserved},
    attachWithoutPDN-Connectivity-r13     ENUMERATED {true} OPTIONAL   --
Need OP
}
SchedulingInfoList-NB-r13 ::= SEQUENCE (SIZE (1..maxSI-Message-NB-r13)) OF
SchedulingInfo-NB-r13
SchedulingInfo-NB-r13::=    SEQUENCE {
    si-Periodicity-r13            ENUMERATED {rf64, rf128, rf256, rf512,
                                              rf1024, rf2048, rf4096, spare},
    si-RepetitionPattern-r13      ENUMERATED {every2ndRF, every4thRF,
                                              every8thRF, every16thRF},
    sib-MappingInfo-r13           SIB-MappingInfo-NB-r13,
    si-TB-r13         ENUMERATED {b56, b120, b208, b256, b328, b440, b552, b680}
}
SystemInfoValueTagList-NB-r13 ::=   SEQUENCE (SIZE (1.. maxSI-Message-NB-r13))
OF
                                    SystemInfoValueTagSI-r13
SIB-MappingInfo-NB-r13 ::=          SEQUENCE (SIZE (0..maxSIB-1)) OF SIB-Type-
NB-r13
SIB-Type-NB-r13 ::=                 ENUMERATED {
                                    sibType3-NB-r13, sibType4-NB-r13, sibType5-
NB-r13,
                                    sibType14-NB-r13, sibType16-NB-r13, spare3,
spare2, spare1}
-- ASN1STOP
```

Table 34 shows the description of the SystemInformationBlockType1-NB field.

TABLE 34

| SystemInformationBlockType1-NB field descriptions |
| --- |
| attachWithoutPDN-Connectivity<br>If present, the field indicates that attach without PDN connectivity as specified in TS 24.301 [35] is supported for this PLMN.<br>cellBarred<br>Barred means the cell is barred, as defined in TS 36.304 [4].<br>cellIdentity<br>Indicates the cell identity.<br>cellReservedForOperatorUse<br>As defined in TS 36.304 [4].<br>cellSelectionInfo<br>Cell selection information as specified in TS 36.304 [4].<br>downlinkBitmapNB-IoT downlink subframe configuration for downlink transmission.<br>If the bitmap is not present, the UE shall assume that all subframes are valid (except for subframes carrying NPSS/NSSS/NPBCH/SIB1-NB) as specified in TS 36.213[23].<br>eutraControlRegionSize<br>Indicates the control region size of the E-UTRA cell for the in-band operation mode. Unit is in number of OFDM symbols.<br>freqBandIndicator<br>A list of as defined in TS 36.101 [42, table 6.2.4-1] for the frequency band in freqBandIndicator.<br>freqBandInfo<br>A list of additionalPmax and additionalSpectrumEmission values as defined in TS 36.101 [42, table 6.2.4-1] for the frequency band in freqBandIndicator.<br>hyperSFN-MSB<br>Indicates the 8 most significat bits of hyper-SFN. Together with hyperSFN-LSB in MIB-NB, the complete hyper-SFN is built up. hyper-SFN is incremented by one when the SFN wraps around.<br>intraFreqReselection<br>Used to control cell reselection to intra-frequency cells when the highest ranked cell is barred, or treated as barred by the UE, as specified in TS 36.304 [4].<br>multiBandInfoList<br>A list of additional frequency band indicators, additionalPmax and additionalSpectrumEmission values, as defined in TS 36.101 [42, table 5.5-1]. If the UE supports the frequency band in the freqBandIndicator IE it shall apply that frequency band. Otherwise, the UE shall apply the first listed band which it supports in the multiBandInfoList IE.<br>nrs-CRS-PowerOffset<br>NRS power offset between NRS and E-UTRA CRS. Unit in dB. Default value of 0.<br>plmn-IdentityList<br>List of PLMN identities. The first listed PLMN-Identity is the primary PLMN.<br>p-Max<br>Value applicable for the cell. If absent the UE applies the maximum power according to the UE capability.<br>q-QualMin<br>Parameter "$Q_{qualmin}$" in TS 36.304 [4].<br>q-RxLevMin<br>Parameter $Q_{rxlevmin}$ in TS 36.304 [4]. Actual value $Q_{rxlevmin}$ = IE value * 2 [dB].<br>schedulingInfoList<br>Indicates additional scheduling information of SI messages.<br>si-Periodicity<br>Periodicity of the Si-message in radio frames, such that rf256 denotes 256 radio frames, rf512 denotes 512 radio frames, and so on.<br>si-RadioFrameOffset<br>Offset in number of radio frames to calculate the start of the SI window.<br>If the field is absent, no offset is applied.<br>si-RepetitionPattern<br>Indicates the starting radio frames within the SI window used for SI message transmission. Value every2ndRF corresponds to every second radio frame, value every4thRF corresponds to every fourth radio frame and so on starting from the first radio frame of the SI window used for SI transmission.<br>si-TB<br>This field indicates the transport block size in number of bits used to broadcast the SI message.<br>si-WindowLength<br>Common SI scheduling window for all SIs. Unit in milliseconds, where ms160 denotes 160 milliseconds, ms320 denotes 320 milliseconds and so on.<br>sib-MappingInfo<br>List of the SIBs mapped to this SystemInformation message. There is no mapping information of SIB2; it is always present in the first SystemInformation message listed in the schedulingInfoList list.<br>systemInfoValueTagList<br>Indicates SI message specific value tags. It includes the same number of entries, and listed in the same order, as in SchedulingInfoList.<br>systemInfoValueTagSI<br>SI message specific value tag as specified in Clause 5.2.1.3. Common for all SIBs within the SI message other than SIB14.<br>trackingAreaCode<br>A trackingAreaCode that is common for all the PLMNs listed. |

TABLE 35

| Conditional presence | Explanation |
| --- | --- |
| inband | The field is mandatory present if IE operationModeInfo in MIB-NB is set to inband-SamePCI or inband-DifferentPCI. Otherwise the field is not present. |
| inband-SamePCI | The field is mandatory present, if IE operationModeInfo in MIB-NB is set to inband-SamePCI Otherwise the field is not present. |

Initial Access Procedure for NB-IoT

The procedure in which the NB-IoT UE initially accesses the BS is briefly described in the section "General Signal Transmission and Reception Procedure in NB-IoT". Specifically, the above procedure may be subdivided into a procedure in which the NB-IoT UE searches for an initial cell and a procedure in which the NB-IoT UE obtains system information.

Figure 11:
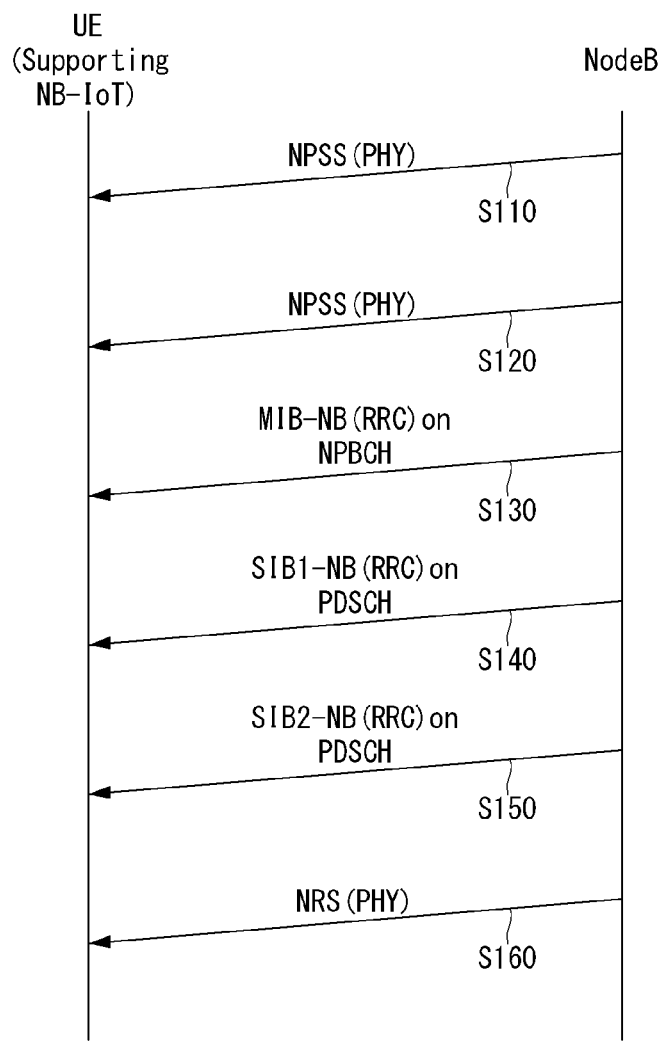
FIG. 11 illustrates an example of an initial access procedure for NB-IoT.

In this regard, FIG. 11 illustrates a particular procedure for signaling between a UE and a BS (e.g., NodeB, eNodeB, eNB, gNB, etc.) for initial access in the NB-IoT. In the following, a normal initial access procedure, an NPSS/NSSS configuration, and acquisition of system information (e.g., MIB, SIB, etc.) in the NB-IoT will be described with reference to FIG. 11.

FIG. 11 illustrates an example of an initial access procedure for NB-IoT. The name of each physical channel and/or signal may vary depending on the wireless communication system to which the NB-IoT is applied. For example, although the NB-IoT based on the LTE system is considered in FIG. 11, this is merely for convenience of description and details thereof are applicable to the NB-IoT based on the NR system. The details of the initial access procedure are also applicable to the Nb-IOT.

As shown in FIG. 11, NB-IoT is based on following signals transmitted in the downlink: the primary and secondary narrowband synchronization signals (NPSS & NSSS). The NPSS is transmitted over 11 sub-carriers from the first subcarrier to the eleventh subcarrier in the sixth subframe of each frame (S110), and the NSSS is transmitted over 12 sub-carriers in the NB-IoT carrier in the tenth subframe for FDD and the first subframe for TDD of every other frame (S120).

the UE may receive MasterinformationBlock-NB (MIB-NB) on NPBCH (NB Physical Broadcast Channel) (S130).

The MIB-NB uses a fixed schedule with a periodicity of 640 ms and repetitions made within 640 ms. The first transmission of the MIB-NB is scheduled in subframe #0 of radio frames for which the SFN mod 64=0 and repetitions are scheduled in subframe #0 of all other radio frames. The transmissions are arranged in 8 independently decodable blocks of 80 ms duration.

Then, the UE may receive SystemInformationBlock-Type1-NB (SIB1-NB) on PDSCH (S140).

The SIB1-NB uses a fixed schedule with a periodicity of 2560 ms. SIB1-NB transmission occurs in subframe #4 of every other frame in 16 continuous frames. The starting frame for the first transmission of the SIB1-NB is derived from the cell PCID and the number of repetitions within the 2560 ms period and repetitions are made, equally spaced, within the 2560 ms period. TBS for SystemInformationBlockType1-NB and the repetitions made within the 2560 ms are indicated by schedulingInfoSIB1 field in the MIB-NB.

The SI messages are transmitted within periodically occurring time domain windows (referred to as SI-windows) using scheduling information provided in SystemInformationBlockType1-NB. Each SI message is associated with a SI-window and the SI-windows of different SI messages do not overlap. That is, within one SI-window only the corresponding SI is transmitted. The length of the SI-window is common for all SI messages, and is configurable.

Within the SI-window, the corresponding SI message can be transmitted a number of times over 2 or 8 consecutive NB-IoT downlink subframes depending on TBS. The UE acquires the detailed time/frequency domain scheduling information and other information, e.g. used transport format for the SI messages from schedulingInfoList field in SystemInformationBlockType1-NB. The UE is not required to accumulate several SI messages in parallel but may need to accumulate a SI message across multiple SI windows, depending on coverage condition.

SystemInformationBlockType1-NB configures the SI-window length and the transmission periodicity for all SI messages.

Further, the NB-IoT UE may receive SystemInformationBlockType2-NB (SIB2-NB) on PDSCH for additional information (S150).

Meanwhile, as shown in FIG. 11, NRS means a narrowband reference signal.

Random Access Procedure for NB-IoT

The procedure in which the NB-IoT UE performs random access to the base station is briefly described in the section "General Signal Transmission and Reception Procedure in NB-IoT". Specifically, the above procedure may be subdivided into a procedure in which the NB-IoT UE transmits a preamble to the base station and a procedure in which the NB-IoT receives a response for the preamble.

Figure 12:
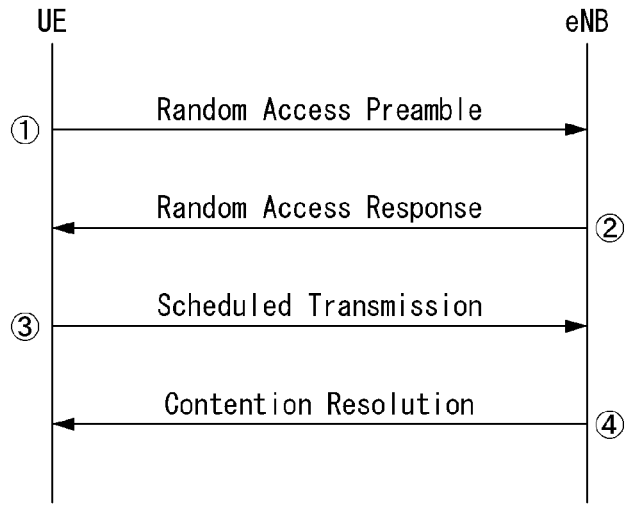
FIG. 12 illustrates an example of a random access procedure for NB-IoT.

In this regard, FIG. 12 illustrates a particular procedure for signaling between a UE and a base station (e.g., NodeB, eNodeB, eNB, gNB, etc.) for random access in the NB-IoT. In the following, details of a random access procedure based on messages (e.g., msg1, msg2, msg3, msg4) used for a normal random access procedure for NB-IoT will be described.

FIG. 12 illustrates an example of the random access procedure for NB-IoT. The name of each physical channel, physical signal, and/or message may vary depending on the wireless communication system to which the NBIoT is applied. For example, although the NB-IoT based on the LTE system is considered in FIG. 12, this is merely for convenience of description and details thereof are applicable to the NB-IoT based on the NR system.

As shown in FIG. 12, for NB-IoT, the RACH procedure has the same message flow as LTE with different parameters.

Hereinafter, the NPRACH transmitted by the NB-IoT terminal to the base station in relation to the random access procedure of the NB-IoT will be described in detail.

Figure 13:
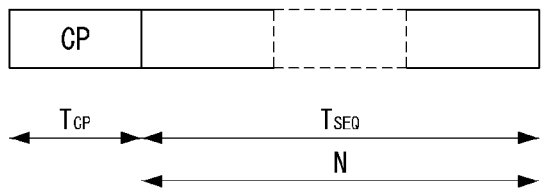
FIG. 13 illustrates a structure of a random access symbol group.

FIG. 13 illustrates a structure of a random access symbol group.

As shown in FIG. 13, a random access symbol group is composed of a cyclic prefix of length and a sequence of identical symbols having a total length. The total number of symbol groups in the preamble repeating unit is denoted by P. The number of time-continuous symbol groups is given by G.

The parameter values of frame structures 1 and 2 are shown in Tables 36 and 37, respectively.

TABLE 36

| Preamble format | G | P | N | $T_{CP}$ | $T_{SEQ}$ |
|---|---|---|---|---|---|
| 0 | 4 | 4 | 5 | $2048T_s$ | $5 \cdot 8192\ T_s$ |
| 1 | 4 | 4 | 5 | $8192T_s$ | $5 \cdot 8192\ T_s$ |
| 2 | 6 | 6 | 3 | $24576T_s$ | $3 \cdot 24576T_s$ |

TABLE 37

| Preamble format | Supported uplink-downlink configurations | G | P | N | $T_{CP}$ | $T_{SEQ}$ |
|---|---|---|---|---|---|---|
| 0 | 1, 2, 3, 4, 5 | 2 | 4 | 1 | $4778T_s$ | $1 \cdot 8192T_s$ |
| 1 | 1, 4 | 2 | 4 | 2 | $8192T_s$ | $2 \cdot 8192T_s$ |
| 2 | 3 | 2 | 4 | 4 | $8192T_s$ | $4 \cdot 8192T_s$ |
| 0-a | 1, 2, 3, 4, 5 | 3 | 6 | 1 | $1536T_s$ | $1 \cdot 8192T_s$ |
| 1-a | 1, 4 | 3 | 6 | 2 | $3072T_s$ | $2 \cdot 8192T_s$ |

The transmission of a random access preamble, if triggered by the MAC layer, is restricted to certain time and frequency resources. Up to three NPRACH resource settings may be configured in a cell where each NPRACH resource configuration corresponds to a different coverage level. NPRACH resource configuration is provided by periodicity, number of repetitions, start time, frequency location, and subcarrier count.

Discontinuous Reception (DRX) Procedure of NB-IoT

While performing the general signal transmission and reception procedure of the NB-IoT, the NB-IoT UE may transit to an idle state (e.g., RRC_IDLE state) and/or an inactive state (e.g., RRC_INACTIVE state) to reduce power consumption. The NB-IoT UE may be configured to operate in DRX mode after transiting to the idle state and/or the inactive state. For example, after transiting to the idle state and/or the inactive state, the NB-IoT UE may be configured to monitor an NPDCCH related to paging only in a specific subframe (frame or slot) according to a DRX cycle determined by the BS. Here, the NPDCCH related to paging may refer to an NPDCCH scrambled with a P-RNTI (Paging Access-RNTI).

Figure 14:
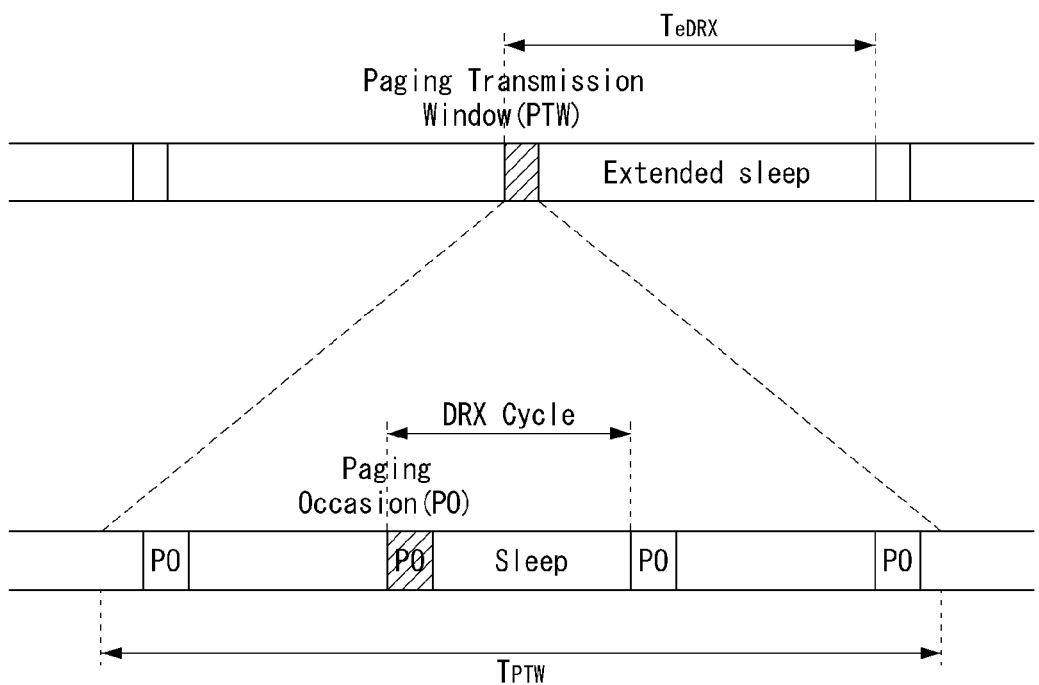
FIG. 14 illustrates an example of DRX mode in an idle state and/or an inactive state.

FIG. 14 illustrates an example of DRX mode in an idle state and/or an inactive state.

As shown in FIG. 14, the NB-IoT UE in the RRC_IDLE state only monitors some of the Subframes (SFs) with respect to paging (i.e., the paging occasions, PO) within a subset of radio frames (i.e., the paging frames, PF). Paging is used to trigger an RRC connection and to indicate a change in system information for UE in RRC_IDLE mode.

Figure 15:
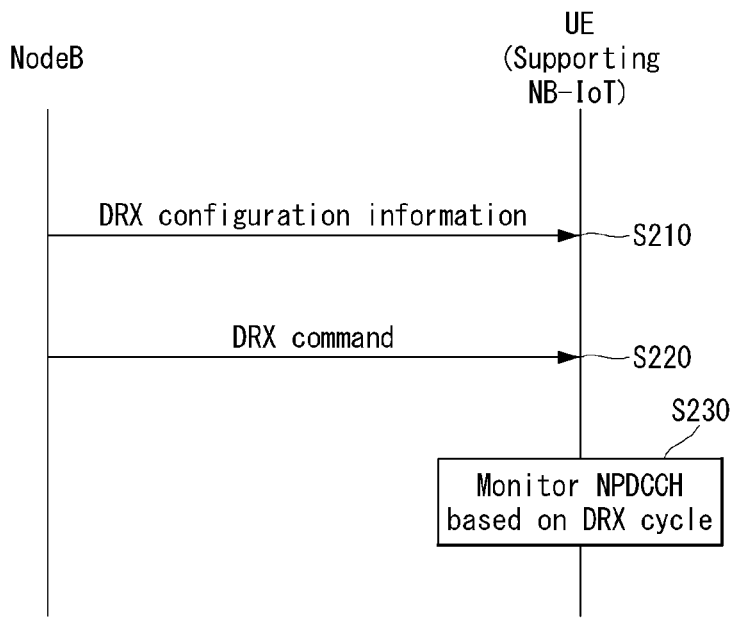
FIG. 15 illustrates an example of a DRX configuration and indication procedure for an NB-IoT UE.

FIG. 15 illustrates an example of a DRX configuration and indication procedure for an NB-IoT UE.

That is, a DRX configuration and indication for the NB-IoT UE may be provided as shown in FIG. 15. However, the procedure in FIG. 15 is merely exemplary, and the methods proposed in the present disclosure are not limited thereto.

Referring to FIG. 15, the NB-IoT UE may receive DRX configuration information from the base station (e.g., NodeB, eNodeB, eNB, gNB, etc.) (S210). In this case, the UE may receive the information from the base station through higher layer signaling (e.g., RRC signaling). The DRX configuration information may include DRX cycle information, a DRX offset, configuration information for DRX-related timers, etc.

Thereafter, the NB-IoT UE may receive a DRX command from the base station (S220). In this case, the UE may receive the DRX command from the base station through higher layer signaling (e.g., MAC-CE signaling).

Upon receiving the DRX command, the NB-IoT UE may monitor an NPDCCH in a specific time unit (e.g., subframe, slot, etc.) based on the DRX cycle (S230). The NPDCCH monitoring may mean a process of decoding a specific portion of the NPDCCH based on a DCI format to be received in a corresponding search space and scrambling a corresponding CRC with a specific predefined RNTI value in order to check whether the scrambled CRC matches (i.e. corresponds to) a desired value.

When the NB-IoT UE receives its paging ID and/or information indicating that system information is changed over the NPDCCH during the process shown in FIG. 15, the NB-IoT UE may initialize (or reconfigure) the connection (e.g., RRC connection) with the base station. Alternatively, the NB-IoT UE may receive (or obtain) new system information from the base station.

If the NB-IoT UE detects a NPDCCH with a Paging Access Radio Network Temporary Identifier (P-RNTI) in the PO, then the NB-IoT UE decodes a corresponding NPDSCH. A paging message is sent over the NPDSCH and may contain a list of NB-IoT UEs to be paged and the information, whether paging is for connection setup or whether system information has changed. Each NB-IoT UE which finds its ID in this list forwards to its upper layer that it is paged, and may receive in turn the command to initialize an RRC connection. If system information has changed, the NB-IoT UE starts to read SIB1-NB and may obtain from there the information, which SIBs have to be read again.

Figure 16:
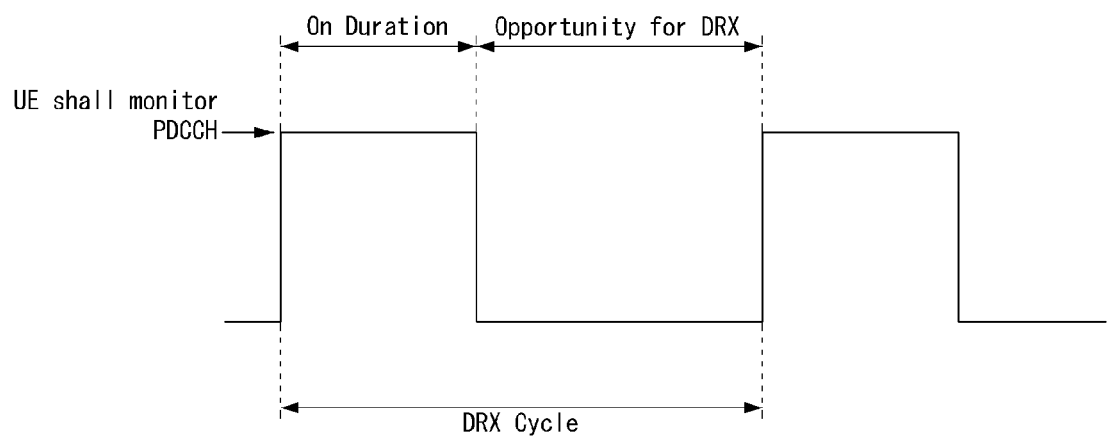
FIG. 16 illustrates an example of a DRX cycle.

FIG. 16 illustrates an example of a DRX cycle.

As shown in FIG. 16, the DRX Cycle specifies the periodic repetition of the On Duration followed by a possible period of inactivity. The MAC entity may be configured by RRC with a DRX functionality that controls the UE's PDCCH monitoring activity for the MAC entity's RNTIs (e.g., C-RNTI). Accordingly, the NB-IoT UE monitors the PDCCH for a short period (e.g., On Duration), and may stop monitoring the PDCCH for a long period (e.g., Opportunity for DRX). When in RRC_CONNECTED, if DRX is configured (i.e., Connected Mode DRX, CDRX), the MAC entity is allowed to monitor the PDCCH discontinuously using the DRX operation specified below; otherwise the MAC entity monitors the PDCCH continuously. For NB-IoT, the PDCCH may refer to the NPDCCH. For NB-IoT, an extended DRX cycle of 10.24 s is supported in RRC Connected.

RRC controls DRX operation by configuring the timers onDurationTimer, drx-InactivityTimer, drx-Retransmission-Timer (for HARQ processes scheduled using 1 ms TTI, one per DL HARQ process except for the broadcast process), drx-RetransmissionTimerShortTTI (for HARQ processes scheduled using short TTI, one per DL HARQ process), drx-ULRetransmissionTimer (for HARQ processes scheduled using 1 ms TTI, one per asynchronous UL HARQ process), drx-ULRetransmissionTimerShortTTI (for HARQ processes scheduled using short TTI, one per asynchronous UL HARQ process), the longDRX-Cycle, the value of the drxStartOffset and optionally the drxShortCycleTimer and shortDRX-Cycle. A HARQ RTT timer per DL HARQ process (except for the broadcast process) and UL HARQ RTT Timer per asynchronous UL HARQ process is also defined.

Machine Type Communication (MTC)

The Machine Type Communication (MTC) refers to communication technology adopted by 3rd Generation Partnership Project (3GPP) to meet Internet of Things (IoT) service requirements. Since the MTC does not require high throughput, it may be used as an application for machine-to-machine (M2M) and Internet of Things (IoT).

The MTC may be implemented to satisfy the following requirements: (i) low cost and low complexity; (ii) enhanced coverage; and (iii) low power consumption.

The MTC was introduced in 3GPP release 10. Hereinafter, the MTC features added in each 3GPP release will be described.

The MTC load control was introduced in 3GPP releases 10 and 11.

The load control method prevents IoT (or M2M) devices from creating a heavy load on the base station suddenly.

Specifically, according to release 10, when a load occurs, the base station may cut off connections with IoT devices to control the load. According to release 11, the base station may prevent the UE from attempting to establish a connection by informing the UE that access will become available through broadcasting such as SIB 14.

In release 12, the features of low-cost MTC were added, and to this end, UE category 0 was newly defined. The UE category is an index representing the amount of data the UE is capable of processing using a communication modem.

That is, a UE that belongs to UE category 0 may use a reduced peak data rate, a half-duplex operation with relaxed RF requirements, and a single reception antenna, thereby reducing the baseband and RF complexity of the UE.

In Release 13, enhanced MTC (eMTC) was introduced. In the eMTC, the UE operates in a bandwidth of 1.08 MHz, which is the minimum frequency bandwidth supported by legacy LTE, thereby further reducing the cost and power consumption.

Although the following description relates to the eMTC, the description is equally applicable to the MTC, 5G (or NR) MTC, etc. For convenience of description, all types of MTC is commonly referred to as 'MTC'.

In the following description, the MTC may be referred to as another terminology such as "eMTC", "LTE-M1/M2", "bandwidth reduced low complexity(BL)/coverage enhanced(CE)", "non-BL UE (in enhanced coverage)", "NR MTC", or "enhanced BL/CE". Further, the term "MTC" may be replaced with a term defined in the future 3GPP standards.

General Features of MTC (1) The MTC operates only in a specific system bandwidth (or channel bandwidth).

The specific system bandwidth may use 6 RBs of the legacy LTE as shown in Table 38 below and defined by considering the frequency range and subcarrier spacing (SCS) of the NR shown in Tables 39 to 41. The specific system bandwidth may be referred to as narrowband (NB). Here, the legacy LTE may encompass what is described in the 3GPP standards except the MTC. In the NR, the MTC may use RBs corresponding the smallest system bandwidth in Tables 40 and 41 as in the legacy LTE. Alternatively, the MTC may operate in at least one bandwidth part (BWP) or in a specific band of a BWP.

TABLE 38

| Channel bandwidth BWChannel [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Table 39 shows the frequency ranges (FRs) defined for the NR.

TABLE 39

| Frequency range designation | Corresponding frequency range |
|---|---|
| FR1 | 450 MHz-6000 MHz |
| FR2 | 24250 MHz-52600 MHz |

Table 40 shows an example of the maximum transmission bandwidth configuration (NRB) for the channel bandwidth and SCS in NR FR1.

TABLE 40

| SCS (kHz) | 5 MHz NRB | 10 MHz NRB | 15 MHz NRB | 20 MHz NRB | 25 MHz NRB | 30 MHz NRB | 40 MHz NRB | 50 MHz NRB | 60 MHz NRB | 80 MHz NRB | 90 MHz NRB | 100 MHz NRB |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

Table 41 shows an example of the maximum transmission bandwidth configuration (NRB) for the channel bandwidth and SCS in NR FR2.

TABLE 41

| SCS (kHz) | 50 MHz NRB | 100 MHz NRB | 200 MHz NRB | 400 MHz NRB |
|---|---|---|---|---|
| 60 | 66 | 132 | 264 | N.A |
| 120 | 32 | 66 | 132 | 264 |

Hereinafter, the MTC narrowband (NB) will be described in detail.

The MTC follows narrowband operation to transmit and receive physical channels and signals, and the maximum channel bandwidth is reduced to 1.08 MHz or 6 (LTE) RBs.

The narrowband may be used as a reference unit for allocating resources to some downlink and uplink channels, and the physical location of each narrowband in the frequency domain may vary depending on the system bandwidth.

The 1.08 MHz bandwidth for the MTC is defined to allow an MTC UE to follow the same cell search and random access procedures as those of the legacy UE.

The MTC may be supported by a cell with a much larger bandwidth (e.g., 10 MHz), but the physical channels and signals transmitted/received in the MTC are always limited to 1.08 MHz.

The larger bandwidth may be supported by the legacy LTE system, NR system, 5G system, etc.

The narrowband is defined as 6 non-overlapping consecutive physical RBs in the frequency domain.

If $N_{NB}^{UL} \geq 4$, a wideband is defined as four non-overlapping narrowbands in the frequency domain. If $N_{NB}^{UL} < 4$, $N_{WB}^{UL}=1$ and a single wideband is composed of $N_{NB}^{UL}$ non-overlapping narrowband(s).

For example, in the case of a 10 MHz channel (50 RBs), 8 non-overlapping narrowbands are defined.

Figure 17:
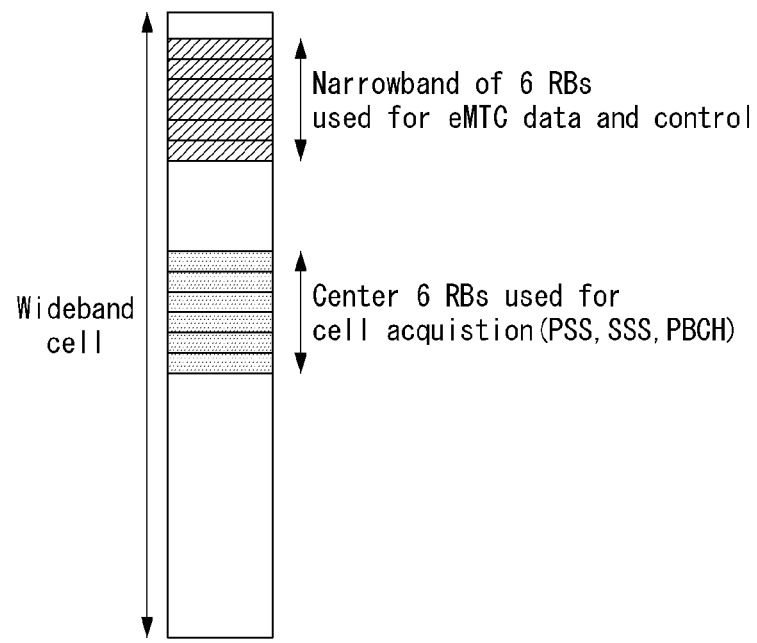
FIG. 17(a) illustrates an example of the narrowband operation.
FIG. 17(b) illustrates an example of repetitions with RF retuning.
Figure 17:
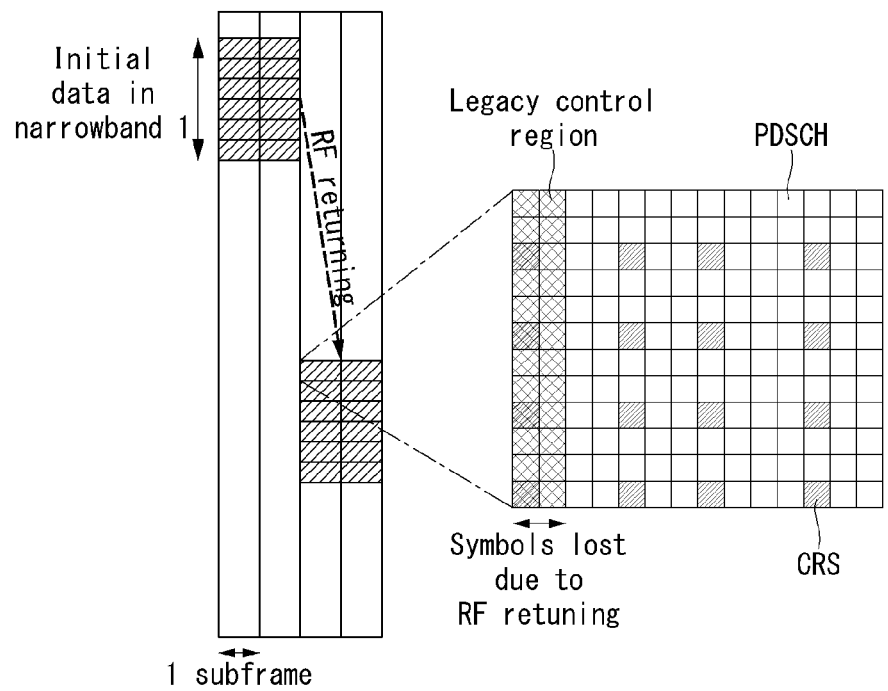

FIG. 17 illustrates an example of the narrowband operation of MTC and an example of repetitions with RF retuning of MTC FIG. 17(a) illustrates an example of the narrowband operation, and FIG. 17(b) illustrates an example of repetitions with RF retuning.

Referring to FIG. 17(b), frequency diversity by RF retuning will be described.

The MTC supports limited frequency, spatial, and time diversity due to the narrowband RF, single antenna, and limited mobility. In order to reduce the effect of fading and outages, frequency hopping is introduced among different narrowbands by RF retuning.

This hopping is applied to the different uplink and downlink physical channels when repetition is enabled.

For example, if 32 subframes are used for transmission of PDSCH, the 16 first subframes may be transmitted over the first narrowband; then the RF front-end is retuned to a different narrowband, and the remaining 16 subframes are transmitted over the second narrowband.

The MTC narrowband may be configured by system information or DCI (downlink control information).

(2) The MTC operates in half-duplex mode and uses limited (or reduced) maximum transmission power.

(3) The MTC does not use a channel (defined in the legacy LTE or NR) that should be distributed over the full system bandwidth of the legacy LTE or NR.

For example, the MTC does not use the following legacy LTE channels: PCFICH, PHICH, and PDCCH.

Thus, a new control channel, an MTC PDCCH (MPDCCH), is defined for the MTC since the above channels are not monitored.

The MPDCCH may occupy a maximum of 6 RBs in the frequency domain and one subframe in the time domain.

The MPDCCH is similar to an evolved PDCCH (EPDCCH) and supports a common search space for paging and random access.

The concept of the MPDCCH is similar to that of the EPDCCH used in the legacy LTE.

(4) The MTC uses newly defined DCI formats. For example, DCI formats 6-0A, 6-0B, 6-1A, 6-1B, 6-2, etc. may be used.

(5) In the MTC, a physical broadcast channel (PBCH), physical random access channel (PRACH), MPDCCH, PDSCH, PUCCH, and PUSCH may be repeatedly transmitted. The MTC repeated transmission enables decoding of an MTC channel in a poor environment such as a basement, that is, when the signal quality or power is low, thereby increasing the radius of a cell or supporting the signal propagation effect. The MTC may support a limited number of transmission modes (TMs), which are capable of operating on a single layer (or single antenna), or support a channel or reference signal (RS), which are capable of operating on a single layer. For example, the MTC may operate in TM 1, 2, 6, or 9.

(6) In the MTC, HARQ retransmission is adaptive and asynchronous and performed based on a new scheduling assignment received on the MPDCCH.

(7) In the MTC, PDSCH scheduling (DCI) and PDSCH transmission occur in different subframes (cross-subframe scheduling).

(8) All resource allocation information (e.g., a subframe, a transport block size (TBS), a subband index, etc.) for SIB1 decoding is determined by a master information block (MIB) parameter (in the MTC, no control channel is used for the SIB 1 decoding).

(9) All resource allocation information (e.g., a subframe, a TBS, a subband index, etc.) for SIB2 decoding is determined by several SIB1 parameters (in the MTC, no control channel is used for the SIB2 decoding).

(10) The MTC supports an extended discontinuous reception (DRX) cycle.

(11) The MTC may use the same primary synchronization signal/secondary synchronization signal/common reference signal (PSS/SSS/CRS) as that used in the legacy LTE or NR. In the NR, the PSS/SSS is transmitted in the unit of SS block (or SS/PBCH block or SSB), and a tracking RS (TRS) may be used for the same purpose as the CRS. That is, the TRS is a cell-specific RS and may be used for frequency/time tracking.

MTC Operation Mode and Level

Hereinafter, MTC operation modes and levels will be described. To enhance coverage, the MTC may be divided into two operation modes (first and second modes) and four different levels as shown in Table 42 below.

The MTC operation mode may be referred to CE mode. The first and second modes may be referred to CE mode A and CE mode B, respectively

TABLE 42

| Mode | Level | Description |
| --- | --- | --- |
| Mode A | Level 1 | No repetition for PRACH |
|  | Level 2 | Small Number of Repetition for PRACH |
| Mode B | Level 3 | Medium Number of Repetition for PRACH |
|  | Level 4 | Large Number of Repetition for PRACH |

The first mode is defined for small coverage where full mobility and channel state information (CSI) feedback are supported. In the first mode, the number of repetitions is zero or small. The operation in the first mode may have the same operation coverage as that of UE category 1. The second mode is defined for a UE with a very poor coverage condition where CSI feedback and limited mobility are supported. In the second mode, the number of times that transmission is repeated is large. The second mode provides up to 15 dB coverage enhancement with reference to the coverage of UE category 1. Each level of the MTC is defined differently in RACH and paging procedures.

Hereinafter, a description will be given of how to determine the MTC operation mode and level.

The MTC operation mode is determined by the base station, and each level is determined by the MTC UE. Specifically, the base station transmits RRC signaling including information for the MTC operation mode to the UE. The RRC signaling may include an RRC connection setup message, an RRC connection reconfiguration message, or an RRC connection reestablishment message. Here, the term "message" may refer to an information element (IE).

The MTC UE determines a level within the operation mode and transmits the determined level to the base station. Specifically, the MTC UE determines the level within the operation mode based on measured channel quality (e.g., RSRP, RSRQ, SINR, etc.) and informs the base station of the determined level using a PRACH resource (e.g., frequency, time, preamble, etc.).

MTC Guard Period

As described above, the MTC operates in the narrowband. The location of the narrowband may vary in each specific time unit (e.g., subframe or slot). The MTC UE tunes to a different frequency in every time unit. Thus, all frequency retuning may require a certain period of time. In other words, the guard period is required for transition from one time unit to the next time unit, and no transmission and reception occurs during the corresponding period.

The guard period varies depending on whether the current link is downlink or uplink and also varies depending on the state thereof. An uplink guard period (i.e., guard period defined for uplink) varies depending on the characteristics of data carried by a first time unit (time unit N) and a second time unit (time unit N+1). In the case of a downlink guard period, the following conditions need to be satisfied: (1) a first downlink narrowband center frequency is different from a second narrowband center frequency; and (2) in TDD, a first uplink narrowband center frequency is different from a second downlink center frequency.

The MTC guard period defined in the legacy LTE will be described. A guard period consisting of at most $N_{symb}^{retune}$ SC-FDMA symbols is created for Tx-Tx frequency retuning between two consecutive subframes. When the higher layer parameter ce-RetuningSymbols is configured, $N_{symb}^{retune}$ is equal to ce-RetuningSymbols. Otherwise, is $N_{symb}^{retune}=2$. For an MTC UE configured with the higher layer parameter srs-UpPtsAdd, a guard period consisting of SC-FDMA symbols is created for Tx-Tx frequency retuning between a first special subframe and a second uplink subframe for frame structure type 2.

Figure 18:
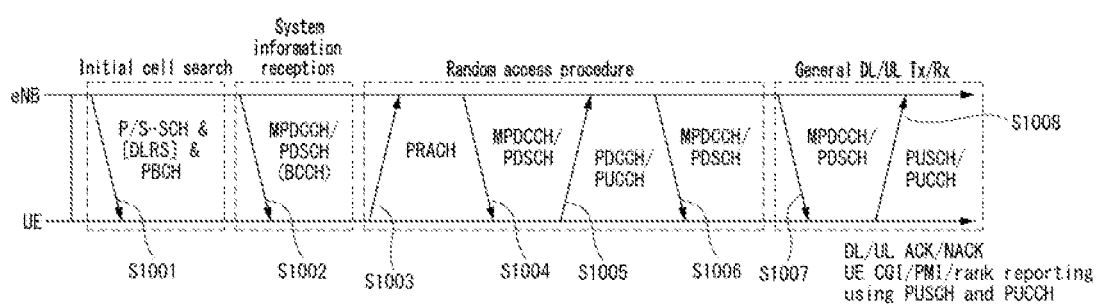
FIG. 18 illustrates physical channels available in MTC and a general signal transmission method using the same.

FIG. 18 illustrates physical channels available in MTC and a general signal transmission method using the same.

When an MTC UE is powered on or enters a new cell, the MTC UE performs initial cell search in step S1101. The initial cell search involves acquisition of synchronization with a base station. Specifically, the MTC UE synchronizes with the base station by receiving a primary synchronization signal (PSS) and a second synchronization signal (SSS) from the base station and obtains information such as a cell identifier (ID). The PSS/SSS used by the MTC UE for the initial cell search may be equal to a PSS/SSS or a resynchronization signal (RSS) of the legacy LTE.

Thereafter, the MTC UE may acquire broadcast information in the cell by receiving a PBCH (physical broadcast channel) signal from the base station.

During the initial cell search, the MTC UE may monitor the state of a downlink channel by receiving a downlink reference signal (DL RS). The broadcast information transmitted on the PBCH corresponds to the MIB. In the MTC, the MIB is repeated in the first slot of subframe #0 of a radio frame and other subframes (subframe #9 in FDD and subframe #5 in TDD).

The PBCH repetition is performed such that the same constellation point is repeated on different OFDM symbols to estimate an initial frequency error before attempting PBCH decoding.

Figure 19:
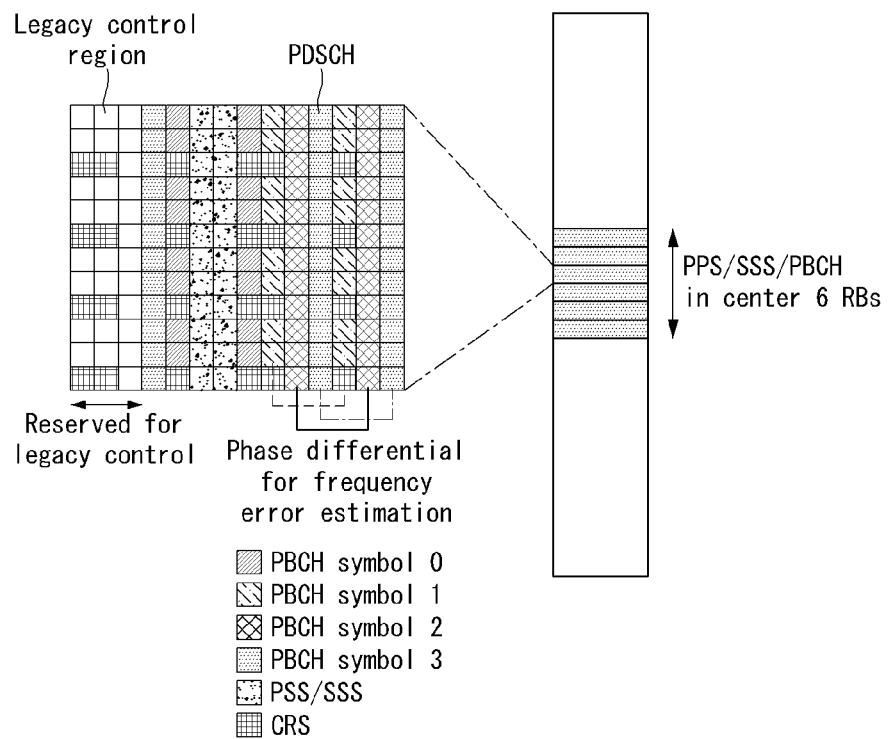
FIG. 19(a) illustrates an example of a repetition pattern for subframe #0 in FDD and a frequency error estimation method for a normal CP and repeated symbols.
FIG. 19(b) illustrates an example of transmission of an SIB-BR on a wideband LTE channel.
Figure 19:
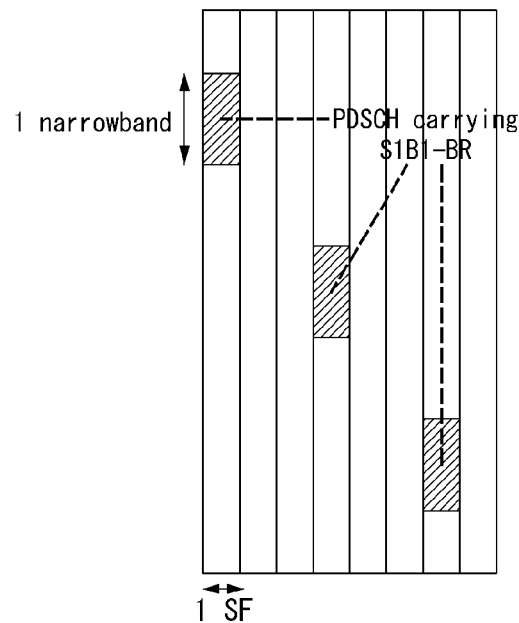

FIG. 19 illustrates an example of a repetition pattern for subframe #0 in FDD and a frequency error estimation method for a normal CP and repeated symbols and an example of transmission of an SIB-BR on a wideband LTE channel.

FIG. 19(*a*) illustrates an example of a repetition pattern for subframe #0 in FDD and a frequency error estimation method for a normal CP and repeated symbols, and FIG. 19(*b*) illustrates an example of transmission of an SIB-BR on a wideband LTE channel.

Five reserved bits in the MIB are used in the MTC to transmit scheduling information for a new system information block for bandwidth reduced device (SIB1-BR) including a time/frequency location and a transport block size.

The SIB-BR is transmitted on a PDSCH directly without any related control channels.

The SIB-BR is maintained without change for 512 radio frames (5120 ms) to allow a large number of subframes to be combined.

Table 43 shows an example of the MIB.

TABLE 43

```
-- ASN1START
MasterInformationBlock ::=     SEQUENCE {
    dl-Bandwidth               ENUMERATED {
                                   n6, n15, n25, n50, n75, n100},
    phich-Config               PHICH-Config,
    systemFrameNumber          BIT STRING (SIZE (8)),
    schedulingInfoSIB1-BR-r13  INTEGER (0..31),
    systemInfoUnchanged-BR-r15 BOOLEAN,
    spare                      BIT STRING (SIZE (4))
}
-- ASN1STOP
```

In Table 43, the schedulingInfoSIB1-BR field indicates the index of a table that defines SystemInformationBlock-Type1-BR scheduling information. The zero value means that SystemInformationBlockType1-BR is not scheduled. The overall function and information carried by SystemInformationBlockType1-BR (or SIB1-BR) is similar to SIB 1 of the legacy LTE. The contents of SIB1-BR may be categorized as follows: (1) PLMN; (2) cell selection criteria; and (3) scheduling information for SIB2 and other SIBs.

After completing the initial cell search, the MTC UE may acquire more detailed system information by receiving a MPDCCH and a PDSCH based on information in the MPDCCH in step S1102. The MPDCCH has the following features: (1) The MPDCCH is very similar to the EPDCCH; (2) The MPDCCH may be transmitted once or repeatedly (the number of repetitions is configured through higher layer signaling); (3) Multiple MPDCCHs are supported and a set of MPDCCHs are monitored by the UE; (4) the MPDCCH is generated by combining enhanced control channel elements (eCCEs), and each CCE includes a set of REs; and (5) the MPDCCH supports an RA-RNTI, SI-RNTI, P-RNTI, C-RNTI, temporary C-RNTI, and semi-persistent scheduling (SPS) C-RNTI.

To complete the access to the base station, the MTC UE may perform a random access procedure in steps S1103 to S1106. The basic configuration of an RACH procedure is carried by SIB2. SIB2 includes parameters related to paging. A paging occasion (PO) is a subframe in which the P-RNTI is capable of being transmitted on the MPDCCH. When a P-RNTI PDCCH is repeatedly transmitted, the PO may refer to a subframe where MPDCCH repetition is started. A paging frame (PF) is one radio frame, which may contain one or multiple POs. When DRX is used, the MTC UE monitors one PO per DRX cycle. A paging narrowband (PNB) is one narrowband, on which the MTC UE performs paging message reception.

To this end, the MTC UE may transmit a preamble on a PRACH (S1103) and receive a response message (e.g., random access response (RAR)) for the preamble on the MPDCCH and the PDSCH related thereto (S1104). In the case of contention-based random access, the MTC UE may perform a contention resolution procedure including transmission of an additional PRACH signal (S1105) and reception of a MPDCCH signal and a PDSCH signal related thereto (S1106). In the MTC, the signals and messages (e.g., Msg 1, Msg 2, Msg 3, and Msg 4) transmitted during the RACH procedure may be repeatedly transmitted, and a repetition pattern may be configured differently depending on coverage enhancement (CE) levels. Msg 1 may represent the PRACH preamble, Msg 2 may represent the RAR, Msg 3 may represent uplink transmission for the RAR at the MTC UE, and Msg 4 may represent downlink transmission for Msg 3 from the base station.

For random access, signaling of different PRACH resources and different CE levels is supported. This provides the same control of the near-far effect for the PRACH by grouping UEs that experience similar path loss together. Up to four different PRACH resources may be signaled to the MTC UE.

The MTC UE measures RSRP using a downlink RS (e.g., CRS, CSI-RS, TRS, etc.) and selects one of random access resources based on the measurement result. Each of four random access resources has an associated number of PRACH repetitions and an associated number of RAR repetitions.

Thus, the MTC UE in poor coverage requires a large number of repetitions so as to be detected by the base station successfully and needs to receive as many RARs as the number of repetitions such that the coverage levels thereof are satisfied.

The search spaces for RAR and contention resolution messages are defined in the system information, and the search space is independent for each coverage level.

A PRACH waveform used in the MTC is the same as that in the legacy LTE (for example, OFDM and ZadoffChu sequences).

After performing the above-described processes, the MTC UE may perform reception of an MPDCCH signal and/or a PDSCH signal (S1107) and transmission of a PUSCH signal and/or a PUCCH signal (S1108) as a normal uplink/downlink signal transmission procedure. Control information that the MTC UE transmits to the base station is commonly referred to as uplink control information (UCI). The UCI includes a HARQ-ACK/NACK, scheduling request, channel quality indicator (CQI), precoding matrix indicator (PMI), rank indicator (RI), etc.

When the MTC UE has established an RRC connection, the MTC UE blindly decodes the MPDCCH in a configured search space to obtain uplink and downlink data assignments.

In the MTC, all available OFDM symbols in a subframe are used to transmit DCI. Accordingly, time-domain multiplexing is not allowed between control and data channels in the subframe. Thus, the cross-subframe scheduling may be performed between the control and data channels as described above.

If the MPDCCH is last repeated in subframe #N, the MPDCCH schedules a PDSCH assignment in subframe #N+2.

DCI carried by the MPDCCH provides information for how many times the MPDCCH is repeated so that the MTC UE may know the number of repetitions when PDSCH transmission is started.

The PDSCH assignment may be performed on different narrowbands. Thus, the MTC UE may need to perform retuning before decoding the PDSCH assignment.

For uplink data transmission, scheduling follows the same timing as that of the legacy LTE. The last MPDCCH in subframe #N schedules PUSCH transmission starting in subframe #N+4.

Figure 20:
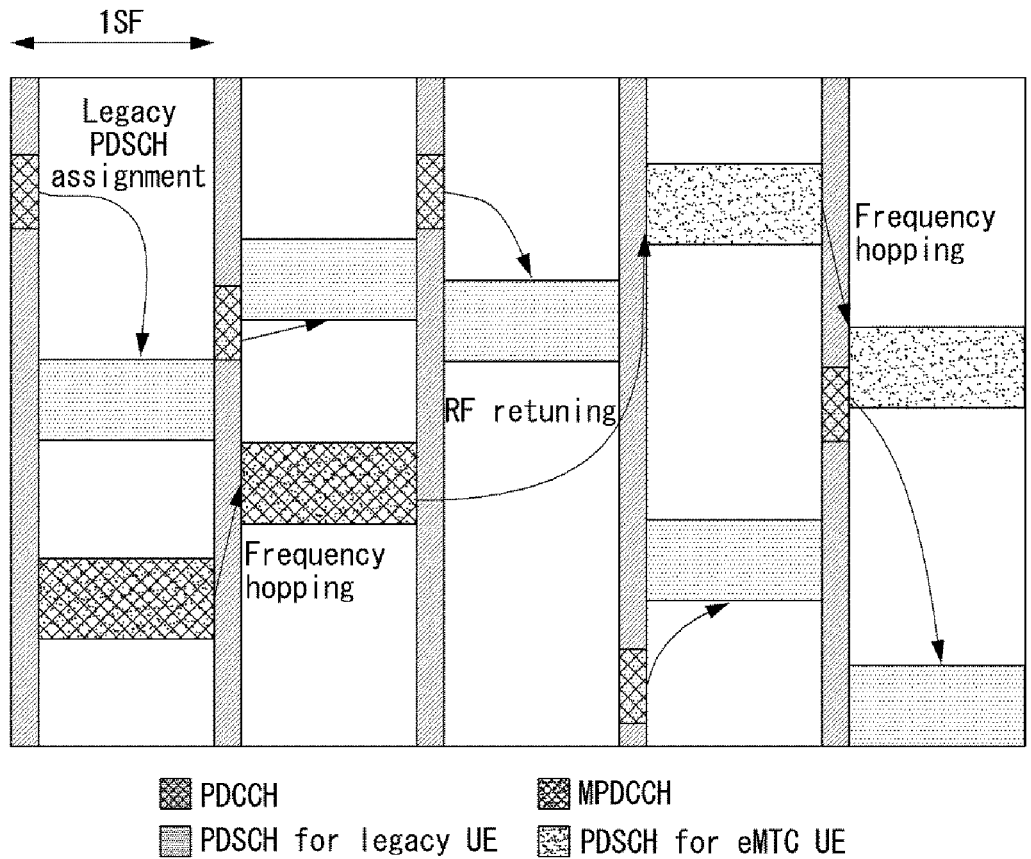
FIG. 20 illustrates an example of scheduling for each of MTC and legacy LTE.

FIG. 20 illustrates an example of scheduling for each of MTC and legacy LTE.

A legacy LTE assignment is scheduled using the PDCCH and uses the initial OFDM symbols in each subframe. The PDSCH is scheduled in the same subframe in which the PDCCH is received.

On the other hand, the MTC PDSCH is cross-subframe scheduled, and one subframe is defined between the MPDCCH and PDSCH to allow MPDCCH decoding and RF retuning.

MTC control and data channels may be repeated for a large number of subframes to be decoded in an extreme coverage condition. Specifically, the MTC control and data channels may be repeated for a maximum of 256 subframes for the MPDCCH and a maximum of 2048 subframes for the PDSCH.

Cell Search of MTC

Hereinafter, the initial cell search procedure of MTC described in step S1001 of FIG. 18 will be described in more details.

Cell search is the procedure by which a UE acquires time and frequency synchronization with a cell and detects the Cell ID of that cell. E-UTRA cell search supports a scalable overall transmission bandwidth corresponding to 6 RBs and upwards. PSS and SSS are transmitted in the downlink to facilitate cell search. If a resynchronization signal is transmitted in the downlink, it can be used to re-acquire time and frequency synchronization with the cell. Physical layer provides 504 unique cell identities using synchronization signals.

The UE searches for the PSS/SSS in the center 6 PRBs to obtain the cell ID, subframe timing information, duplexing mode (time division duplex (TDD), or frequency division duplex (FDD)), and cyclic prefix (CP) length. The PSS uses Zadoff-Chu (ZC) sequence. For frame structure type 1 (i.e. FDD), the PSS shall be mapped to the last orthogonal frequency division multiplexing (OFDM) symbol in slots 0 and 10. For frame structure type 2 (i.e. TDD), the PSS may be related to a OFDM symbol in subframes 1 and 6. The SSS uses an interleaved concatenation of two length-31 binary sequences. The concatenated sequence is scrambled with a scrambling sequence given by the PSS. For FDD, the SSS shall be mapped OFDM symbol number $N_{symb}^{DL-2}$ in slots 0 and 10, where $N_{symb}^{DL}$ is the number of OFDM symbols in a downlink slot. For TDD, the SSS shall be mapped OFDM symbol number NsymbDL-1 in slots 1 and 11, where $N_{symb}^{DL}$ is the number of OFDM symbols in a downlink slot.

System Information Acquisition of MTC

Hereinafter, the system information acquisition procedure of the MTC described in step S1002 of FIG. 18 will be described in more details.

Figure 21:
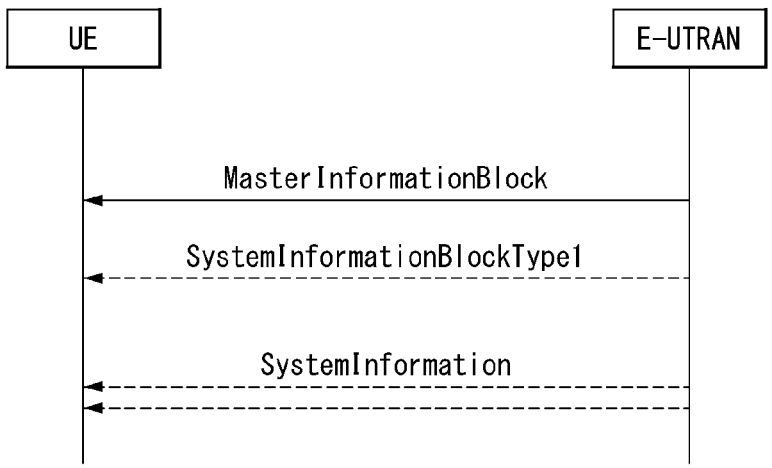
FIG. 21 illustrates a normal system for a system information acquisition procedure.

FIG. 21 illustrates a normal system for a system information acquisition procedure.

Upon searching the cell by using the PSS/SSS, the UE acquires system information (SI).

The UE applies the system information acquisition procedure to acquire the access layer (AS) and non-access (NAS) layer system information that is broadcasted by the E-UTRAN. The procedure applies to UEs in RRC_IDLE and UEs in RRC_CONNECTED.

System information is divided into the MasterinformationBlock (MIB) and a number of SystemInformationBlocks (SIBs). The MIB defines the most essential physical layer information of the cell required to receive further system information. The MIB is transmitted on PBCH. SIBs other than SystemInformationBlockType1 SIB1 are carried in SI messages and mapping of SIBs to SI messages is flexibly configurable by schedulingInfoList included in SystemInformationBlockType1, with restrictions that: each SIB is contained only in a single SI message, and at most once in that message; only SIBs having the same scheduling requirement (periodicity) can be mapped to the same SI message; SystemInformationBlockType2 SIB2 is always mapped to the SI message that corresponds to the first entry in the list of SI messages in schedulingInfoList. There may be multiple SI messages transmitted with the same periodicity. SystemInformationBlockType1 and all SI messages are transmitted on DL-SCH. The BL UEs and UEs in CE apply BR version of the SIB or SI messages.

The MIB uses a fixed schedule with a periodicity of 40 ms and repetitions made within 40 ms. The first transmission of the MIB is scheduled in subframe #0 of radio frames for which the SFN mod 4=0, and repetitions are scheduled in subframe #0 of all other radio frames. For TDD/FDD system with a bandwidth larger than 1.4 MHz that supports BL UEs or UEs in CE, MIB transmission may be additionally repeated in subframe #0 of the same radio frame, and in subframe #9 of the previous radio frame for FDD and subframe #5 of the same radio frame for TDD.

The SystemInformationBlockType1 contain information relevant when evaluating if a UE is allowed to access a cell and defines the scheduling of other system information blocks. The SystemInformationBlockType1 uses a fixed schedule with a periodicity of 80 ms and repetitions made within 80 ms. The first transmission of SystemInformationBlockType1 is scheduled in subframe #5 of radio frames for which the SFN mod 8=0, and repetitions are scheduled in subframe #5 of all other radio frames for which SFN mod 2=0.

For BL UEs or UEs in CE, MIB is applied which may be provided with additional repetitions, while for SIB1 and further SI messages, separate messages are used which are scheduled independently and with content that may differ. The separate instance of SIB1 is named as SystemInformationBlockType1-BR. The SystemInformationBlockType1-BR include information such as valid downlink and uplink subframes, maximum support of coverage enhancement, and scheduling information for other SIBs. The SystemInformationBlockType1-BR is transmitted over PDSCH directly, without any control channel associated with it. The SystemInformationBlockType1-BR uses a schedule with a periodicity of 80 ms. Transport block size (TBS) for SystemInformationBlockType1-BR and the repetitions made within 80 ms are indicated via schedulingInfoSIB1-BR in MIB or optionally in the RRCConnectionReconfiguration message including the MobilityControlInfo. Specifically, five reserved bits in the MIB are used in eMTC to convey scheduling information about SystemInformationBlockType1-BR, including time and frequency location, and transport block size. SIB-BR remains unchanged for 512 radio frames (5120 ms) to allow a large number of subframes to be combined.

The SI messages are transmitted within periodically occurring time domain windows (referred to as SI-windows) using dynamic scheduling. Each SI message is associated with a SI-window and the SI-windows of different SI messages do not overlap. That is, within one SI-window only the corresponding SI is transmitted. The length of the SI-window is common for all SI messages, and is configurable. Within the SI-window, the corresponding SI message can be transmitted a number of times in any subframe other than multimedia broadcast multicast service single frequency network (MBSFN) subframes, uplink subframes in TDD, and subframe #5 of radio frames for which SFN mod 2=0. The UE acquires the detailed time-domain scheduling (and other information, e.g. frequency-domain scheduling, used transport format) from decoding system information radio network temporary identity (SI-RNTI) on PDCCH. For a BL UE or a UE in CE, the detailed time/frequency domain scheduling information for the SI messages is provided in SystemInformationBlockType1-BR.

The SystemInformationBlockType2 contains common and shared channel information.

Random Access Procedure of MTC

Hereinafter, the random access procedure of MTC described in steps S1003 to S1006 of FIG. 18 will be described in more details.

The random access procedure is performed for the following events.

Initial access from RRC_IDLE;
RRC Connection Re-establishment procedure;
Handover;
DL data arrival during RRC_CONNECTED requiring random access procedure;
UL data arrival during RRC_CONNECTED requiring random access procedure;
For positioning purpose during RRC_CONNECTED requiring random access procedure.

Figure 22:
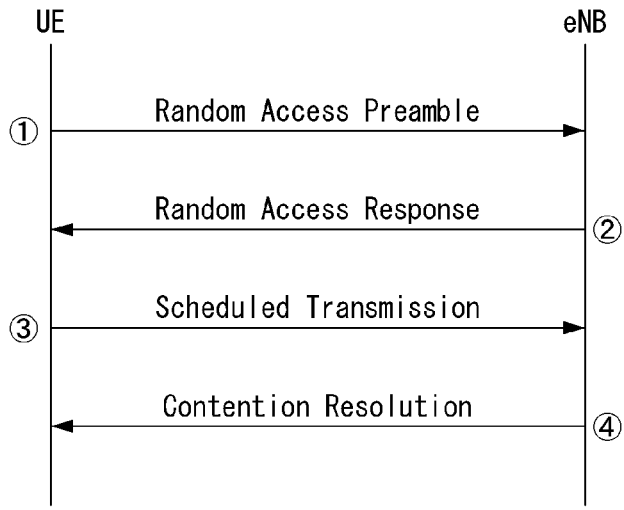
FIG. 22 illustrates a contention-based random access procedure.

FIG. 22 illustrates a contention-based random access procedure.

A random access preamble (also referred to as "Msg1") over PRACH. A UE randomly selects one random access preamble from a set of random access preambles indicated by system information or a handover command, selects a PRACH resource able to transmit the random access preamble, and transmits the same.

The physical layer random access preamble consists of a cyclic prefix of length TCP and a sequence part of length TSEQ. The parameter values are listed in Table 1 below and depend on the frame structure and the random access configuration. Higher layers control the preamble format.

TABLE 44

| Preamble format | $T_{CP}$ | $T_{SEQ}$ |
| --- | --- | --- |
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 | $448 \cdot T_s$ | $4096 \cdot T_s$ |

Discontinuous Reception (DRX) Procedure of MTC

While performing the general signal transmission and reception procedure of the MTC, the MTC UE may transit to an idle state (e.g., RRC_IDLE state) and/or an inactive state (e.g., RRC_INACTIVE state) to reduce power consumption. The MTC UE may be configured to operate in DRX mode after transiting to the idle state and/or the inactive state. For example, after transiting to the idle state and/or the inactive state, the MTC UE may be configured to monitor an MPDCCH related to paging only in a specific subframe (frame or slot) according to a DRX cycle determined by the BS. Here, the MPDCCH related to paging may refer to an MPDCCH scrambled with a P-RNTI (Paging Access-RNTI).

Figure 23:
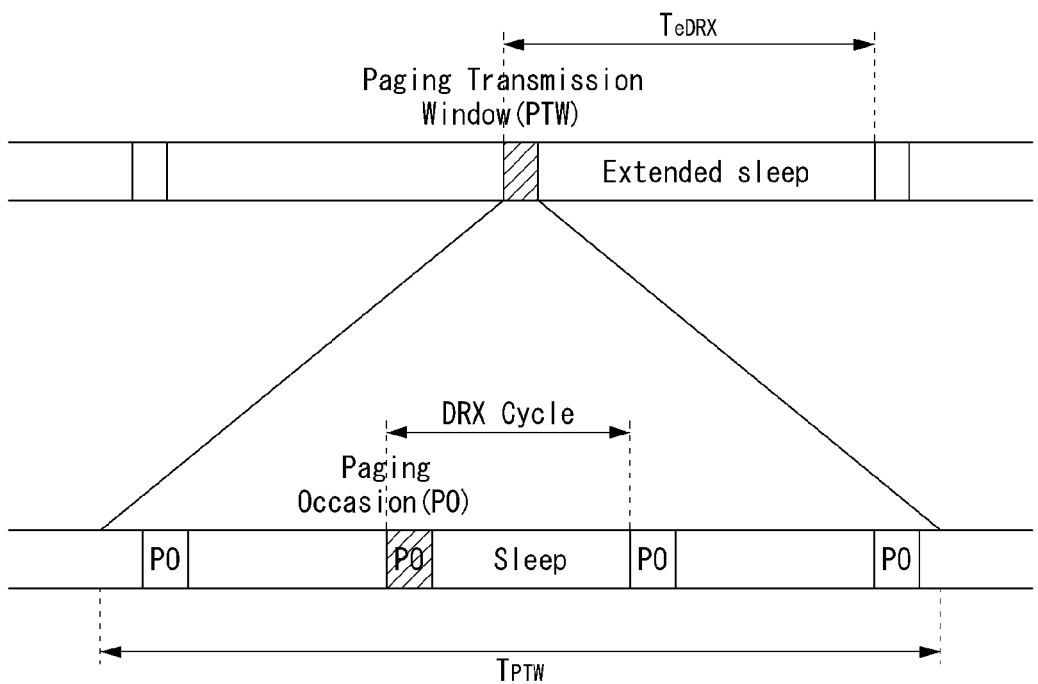
FIG. 23 illustrates an example of DRX mode in an idle state and/or an inactive state.

FIG. 23 illustrates an example of DRX mode in an idle state and/or an inactive state.

As shown in FIG. 23, the MTC UE in the RRC_IDLE state only monitors some of the subframes (SFs) with respect to paging (i.e., paging occasion PO) within a subset (i.e., paging frame PF) of a radio frame. Paging is used to trigger an RRC connection and to indicate a change in system information for UE in RRC_IDLE mode.

Figure 24:
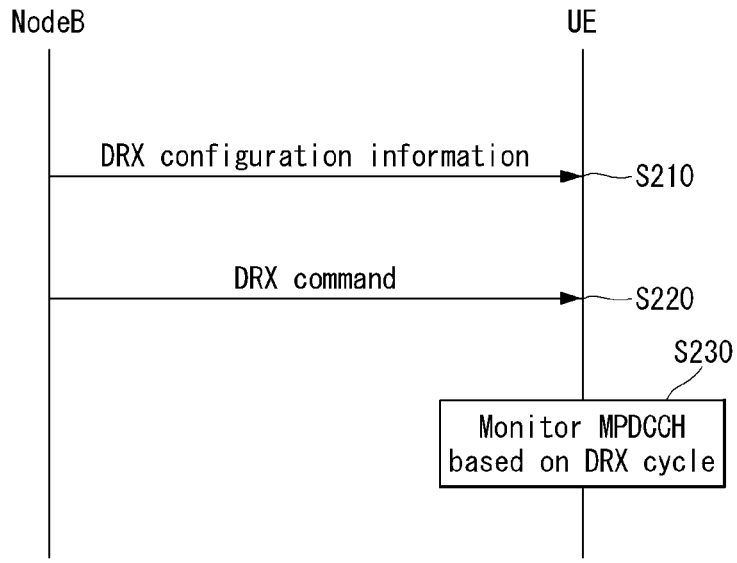
FIG. 24 illustrates an example of a DRX configuration and indication procedure for an MTC UE.

Also, a DRX configuration and indication for the MTC UE may be provided as shown in FIG. 24.

FIG. 24 illustrates an example of a DRX configuration and indication procedure for an MTC UE. However, the procedure in FIG. 24 is merely exemplary, and the methods proposed in the present disclosure are not limited thereto.

Referring to FIG. 24, the MCT UE may receive DRX configuration information from the base station (e.g., NodeB, eNodeB, eNB, gNB, etc.) (S210). In this case, the UE may receive the information from the base station through higher layer signaling (e.g., RRC signaling). The DRX configuration information may include DRX cycle information, a DRX offset, configuration information for DRX-related timers, etc.

Thereafter, the MCT UE may receive a DRX command from the base station (S220). In this case, the UE may receive the DRX command from the base station through higher layer signaling (e.g., MAC-CE signaling).

Upon receiving the DRX command, the MTC UE may monitor an MPDCCH in a specific time unit (e.g., subframe, slot, etc.) based on the DRX cycle (S230). The MPDCCH monitoring may mean a process of decoding a specific portion of the MPDCCH based on a DCI format to be received in a corresponding search space and scrambling a corresponding CRC with a specific predefined RNTI value in order to check whether the scrambled CRC matches (i.e. corresponds to) a desired value.

When the MCT UE receives its paging ID and/or information indicating that system information is changed over the MPDCCH during the process shown in FIG. 24, the MCT UE may initialize (or reconfigure) the connection (e.g., RRC connection) with the base station. Alternatively, the MCT UE may receive (or obtain) new system information from the base station.

Figure 25:
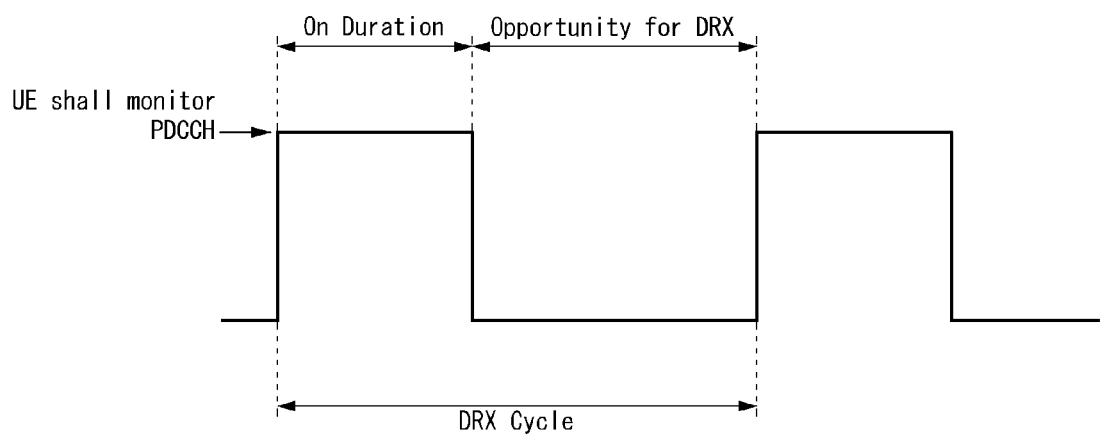
FIG. 25 illustrates an example of a DRX cycle.

FIG. 25 illustrates an example of a DRX cycle.

As shown in FIG. 25, the DRX Cycle specifies the periodic repetition of the On Duration followed by a possible period of inactivity. The MAC entity may be configured by RRC with a DRX functionality that controls the UE's PDCCH monitoring activity for the MAC entity's RNTIs (e.g., C-RNTI). Accordingly, the MTC UE monitors the PDCCH for a short period (e.g., On Duration), and may stop monitoring the PDCCH for a long period (e.g., Opportunity for DRX). When in RRC_CONNECTED, if DRX is configured (i.e., Connected Mode DRX, CDRX), the MAC entity is allowed to monitor the PDCCH discontinuously using the DRX operation specified below; otherwise the MAC entity monitors the PDCCH continuously. For MTC, the PDCCH may refer to the NPDCCH. For MTC, an extended DRX cycle of 10.24 s is supported in RRC Connected.

Abbreviations

The abbreviations and definition of terms to be described are arranged prior to the description of a method proposed in this disclosure.

MIB-NB: masterinformationblock-narrowband
SIB1-NB: systeminformationblock1-narrowband
CRS: cell specific reference signal or common reference signal
ARFCN: absolute radio-frequency channel number
PRB: physical resource block
PRG: precoding resource block group
PCI: physical cell identifier
N/A: non-applicable
EARFCN: E-UTRA absolute radio frequency channel number
RRM: radio resource management
RSRP: reference signal received power
RSRQ: reference signal received quality
TBS: transport block size
TDD/FDD: time division duplex/frequency division duplex Definitions NB-IoT: NB-IoT enables access to a network service through an E-UTRA using a channel bandwidth limited to 200 kHz.

NB-IoT inband operation: NB-IoT operates as an inband using a resource block(s) within a normal E-UTRA carrier.

NB-IoT a guard band operation: NB-IoT operates as a guard band when a resource block(s) not used within the guard band of an E-UTRA carrier is used.

NB-IoT standalone operation: NB-IoT operates as standalone when its own spectrum is used. For example, a spectrum used by a current GERAN system instead of one or more GSM carriers and a scattered spectrum for potential IoT deployment.

Anchor carrier: a carrier in which an NPSS/NSSS/NPBCH is transmitted with respect to TDD or an NPSS/NSSS/NPBCH/SIB-NB is transmitted with respect to FDD by a user equipment in NB-IoT.

Non-anchor carrier: a carrier in which an NPSS/NSSS/NPBCH/SIB-NB is not transmitted with respect to FDD or an NPSS/NSSS/NPBCH is not transmitted with respect to TDD by a user equipment in NB-IoT.

Channel raster: a minimum unit by which a user equipment reads a resource. In the case of an LTE system, channel raster has a value of 100 kHz.

Furthermore, "/" described in this disclosure may be interpreted as "and/or" "A and/or B" may be interpreted as the same meaning as "includes at least one of A or (and/or) B."

The present disclosure provides a method for supporting cell access from a terminal in a wireless communication system.

More specifically, the present disclosure provides a signaling method for supporting cell access from a terminal (Method 1), a method for barring cell access from other types of terminals other than the above terminal at an proper timing (Method 2), and a method for supporting both the terminal and other types of terminals in the same cell.

Particularly, the terminal may be a standalone Machine Type Communication device (sMTC device), and the cell may be a base station, but the present disclosure is not limited to this.

Moreover, other types of terminals other than the above terminal may include an LTE device or an eMTC device, but the present disclosure is not limited to this.

It assumed that the methods 1 to 3 are carried out while the above terminal and other types of terminals coexist, but the present disclosure is not limited to this.

Hereinafter, the methods proposed in the present disclosure will be described concretely in the order of Methods 1 to 3.

Hereinafter, for convenience of explanation, a terminal that may include a Standalone Machine Type Communication device may be abbreviated as "sMTC", and other types of terminals other than the above terminal may be abbreviated as "non-sMTC".

Moreover, the expression "A and/or B" used hereinbelow means "at least one of A and B".

Method for Supporting Cell Access from sMTC (Method 1)

A conventional eMTC device may know information about whether a corresponding cell transmits SIB1-BR (System Information Block 1-BR) and scheduling information of SIB1-BR through a schedulingInforSIB1-BR field consisting of 5 bits among the reserved bits contained in an MIB (Master Information Block).

If the bit value of the schedulingInfoSIB1-BR field is set to 0, the eMTC device may know that the corresponding cell does not transmit SIB1-BR.

On the contrary, if the bit value of the schedulingInforSIB1-BR field is set to a value other than 0, the eMTC device may know that the corresponding cell transmits SIB1-BR and also know scheduling information of the SIB1-BR.

The eMTC device checks the content contained in the MIB during LTE inband operation, and if the schedulingInfoSIB1-BR field is 0, acknowledges that the corresponding cell does not support eMTC.

If the corresponding cell does not support a specific device, this means that the specific device's cell access to the cell and the operations the specific device performs in the corresponding cell are not supported, which are as follows:

On the contrary, the eMTC device checks the content contained in the MIB during LTE inband operation, and if the schedulingInfoSIB1-BR field is not 0, the eMTC device may acquire SIB1-BR scheduling information by using schedulingInfoSIB1-BR information and receive SIB1-BR based on the acquired SIB1-BR scheduling information.

Even when the eMTC device coexists with an sMTC device and/or LTE device, the eMTC device may check whether the corresponding cell supports eMTC devices or not, through the above method.

Also, even when the sMTC device coexists with an eMTC device and/or LTE device, the sMTC device may check whether the corresponding cell supports sMTC and/or sMTC devices or not, through the above method.

When the sMTC device checks whether the corresponding cell supports sMTC devices or not through the above method, information required for an SMTC-only operation performed only by the sMTC device is transmitted to the sMTC device after the steps subsequent to MIB.

The sMTC-only operation may be an operation such as using an LTE control region.

Hereinafter, a method for signaling through the content contained in MIB (Proposal 1), a method for signaling in the step in which an sMTC device decodes received MIB (Proposal 2), and a method for signaling at a timing before sMTC acquires MIB information (Proposal 3) are proposed as concrete methods for indicating whether the corresponding cell supports sMTC devices or not.

(Proposal 1) Method for Signaling Through MIB Content

The present (Proposal 1) provides a method for indicating whether a cell supports an SMTC device or not by using the content contained in MIB.

If a cell does not indicate whether it supports sMTC devices or not (whether it permits cell access or not) before a UE decodes received MIB, information about whether the cell supports sMTC devices or not may be signaled to the UE through the content contained in MIB.

That is, a UE receives MIB from a cell and decodes the received MIB to see the information contained in the MIB, and therefore is able to check whether the cell supports sMTC devices or not.

In the conventional art, among the reserved bits contained in MIB, only the values 0 to 18 are used, which are some of the reserved values 0 to 31 5 bits of the schedulingINfo-SIB1-BR field may possess.

In an example of the present (Proposal 1), unlike the conventional art, a cell transmits MIB indicating whether the corresponding cell supports sMTC devices and containing SIB1-BR scheduling information for sMTC devices (Embodiment 1).

Specifically, the values 19 to 31, among the reserved values contained in MIB, may correspond to information indicating whether the corresponding cell supports sMTC devices or not and SIB1-BR scheduling information.

The scheduling information may include a combination of Transport Block Size (TBS), repetition number, narrowband index information, etc.

In the above method, the eMTC may be set to determine that the corresponding cell does not support eMTC if the eMTC acknowledges that the schedulingInfoSIB1-BR field contained in the received MIB is one of the values 19 to 31.

However, if necessary, the values 0 to 18 used in the following Embodiment 2, besides the values 19 to 31 in Embodiment 1, may be used.

In another example of (Proposal 1), a cell may set the schedulingINfoSIB1-BR field to 0 to bar an eMTC device's access to the corresponding cell, and may transmit information indicating whether it supports sMTC and SIB1-BR scheduling information for sMTC by using the remaining reserved bits (e.g., the remaining 5 bits) contained in MIB (Embodiment 2).

The SIB1-BR scheduling information in the (Embodiment 2) may contain more information than the SIB-BR1 scheduling information in (Embodiment 1).

That is, (Embodiment 2) represents a combination of TBS, repetition number, narrowband index information, etc. by using all of the reserved values 0 to 31 of 5 bits, and therefore represent more information than the method of (Embodiment 1) which only uses the values 19 to 31.

(Proposal 2) Method for Signaling in MIB Decoding Step

The present (Proposal 2) provides a method for indicating whether a cell supports sMTC devices or not in the step in which a UE decodes MIB.

That is, a UE that has received MIB from a cell may check whether the corresponding cell supports sMTC devices in a process of decoding the received MIB.

The present (Proposal 2) is different from the (Proposal 1) in that information about whether the cell supports sMTC or not is not contained in the content of MIB.

In order to indicate to the UE whether the corresponding cell supports sMTC devices or not in the process in which the UE decodes MIB, the cell may signal based on a newly defined PBCH scrambling sequence (Embodiment 1).

Also, the cell may indicate whether the corresponding cell supports sMTC devices or not, by signaling based on a newly defined initialization sequence (Embodiment 2) or signaling based on a newly defined PBCH CRC masking sequence.

Hereinafter, each of the above embodiments will be described concretely.

Embodiment 1

A cell may transmit a scrambled MIB to a UE on a PBCH based on a newly defined PBCH scrambling sequence, different form the existing PBCH scrambling sequence.

The newly defined PBCH scrambling sequence may have a length of 1920 bits for a normal cyclic prefix (CP) and a length of 1728 bits for an extended CP.

In this embodiment, after decoding MIB, upon recognizing that a newly defined scrambling sequence, not the existing scrambling sequence, is used, the UE may determine that the cell supports sMTC.

On the contrary, after decoding MIB, upon recognizing that the existing scrambling sequence is used, the UE may determine that the cell does not support sMTC.

The existing scrambling sequence for PBCH scrambling is generated by the following Equations 21 to 23.

$$C(n)=(x_1(n+N_c)+x_2(n+N_c)) \bmod 2 \quad \text{[Equation 21]}$$

$$x_1(n+31)=(x_1(n+3)+x_1(n)) \bmod 2 \quad \text{[Equation 22]}$$

$$x_2(n+31)=(x_2(n+3)+x_2(n+2)+x_2(n+1)+x_2(n)) \bmod 2 \quad \text{[Equation 23]}$$

where c(n) is a scrambling sequence, and x1 (n) and x2(n) are a seed sequence for generating a scrambling sequence, which are set to Nc=1600.

In the PBCH scrambling process, Cint, an initialization sequence of x2(n), is set to PCID, and the PCID is a physical layer cell identifier.

In order to define a new scrambling sequence according to this embodiment, which is different from the existing scrambling sequence, the seed sequence may be defined differently from the existing one or the initialization sequence may be defined different form the existing one.

A method for defining an initialization sequence different from the existing one corresponds to Embodiment 2 of this proposal, which will be described below in details.

Besides, there will be more methods for defining a new scrambling sequence, and the present disclosure is not limited to them.

According to this embodiment, an operation in which a UE checks whether a cell supports sMTC or not will be described in more details.

First of all, a UE receives a scrambled MIB from a cell based on a newly defined PBCH scrambling sequence or the existing PBCH scrambling sequence.

Next, the UE may decode the received MIB and identify a scrambling sequence used for MIB scrambling in the decoding process.

The UE may determine whether the cell supports sMTC or not, based on the identified scrambling sequence.

Embodiment 2

A cell may transmit a scrambled MIB to a UE on a PBCH based on a newly defined initialization sequence, different from the existing initialization sequence, and the existing PBCH scrambling sequence.

In this embodiment, after decoding MIB, upon recognizing that a newly defined initialization sequence, not the existing initialization sequence, is used, the UE may determine that the cell supports sMTC.

On the contrary, after decoding MIB, upon recognizing that the existing initialization sequence is used, the UE may determine that the cell does not support sMTC.

The value of the existing initialization sequence C_init for PBCH scrambling is given by C_init=PCID.

The PCID is a physical layer cell identifier.

The initialization sequence according to this embodiment may be given as a value obtained by adding a specific offset to the existing C_init value.

For example, C_init=PCID+offset (offset=504 or 1008).

According to this embodiment, an operation in which a UE checks whether a cell supports sMTC or not will be described more concretely.

First of all, a UE receives a scrambled MIB from a cell based on a newly defined C inint sequence or the existing C_init sequence.

Next, the UE may decode the received MIB and identify a C_init sequence used for MIB scrambling in the decoding process.

The UE may determine whether the cell supports sMTC or not, based on the identified C_init sequence.

Embodiment 3

A cell may transmit a scrambled MIB to a UE on a PBCH based on a newly defined PBCH CRC masking sequence, different form the existing PBCH CRC masking sequence.

In this embodiment, after decoding MIB, upon recognizing that a newly defined PBCH CRC masking sequence, not the existing PBCH CRC masking sequence, is used, the UE may determine that the cell supports sMTC.

On the contrary, after decoding MIB, upon recognizing that the existing PBCH CRC masking sequence is used, the UE may determine that the cell does not support sMTC.

The existing PBCH CRC masking sequence is used to identify the number of antenna ports (1, 2, or 4) through which CRS (cell specific reference signal) is transmitted.

According to this embodiment, one sequence set may be added as exemplified in the following Table 45, in order for a newly defined PBCH CRC masking to support the function of identifying the number of antenna ports through which CRS is transmitted.

Alternatively, the cell may mask a newly defined PBCH CRC masking sequence to MIB in order to indicate whether the cell supports sMTC or not, and indicate the remaining information through the MIB content.

In this case, only one sequence may be added to the existing PBCH CRC masking sequence. That is, only one row may be added to the standalone mode in Table 45.

The added sequence may be any of the three sequences shown in Table 45.

The newly defined PBCH CRC masking sequences included in the sequence set need to satisfy orthogonality with the existing PBCH CRC masking sequences.

Accordingly, as exemplified in Table 45, part of a Hadamard sequence of length 16 may be used to configure a newly defined PBCH CRC masking sequence.

TABLE 45

| Mode | Number of transmit antenna ports at eNodeB | PBCH CRC mask $<x_{ant,\,0}, x_{ant,\,1}, \ldots, x_{ant,\,15}>$ |
|---|---|---|
| In-band | 1 | <0, 0, 0, 0, 0, 0, 0, 0, 0, 0, 0, 0, 0, 0, 0, 0> |
|  | 2 | <1, 1, 1, 1, 1, 1, 1, 1, 1, 1, 1, 1, 1, 1, 1, 1> |
|  | 4 | <0, 1, 0, 1, 0, 1, 0, 1, 0, 1, 0, 1, 0, 1, 0, 1> |
| Standalone | 1 | <1, 1, 1, 1, 1, 1, 1, 1, 0, 0, 0, 0, 0, 0, 0, 0> |
|  | 2 | <1, 1, 1, 1, 0, 0, 0, 0, 1, 1, 1, 1, 0, 0, 0, 0> |
|  | 4 | <1, 1, 0, 0, 1, 1, 0, 0, 1, 1, 0, 0, 1, 1, 0, 0> |

In this embodiment, the UE may analyze the received content differently depending on the CRC check result.

Specifically, if the UE determines that the cell supports sMTC after checking the CRC, the UE may make reference to an MIB field table defined for sMTC.

According to this embodiment, an operation in which a UE checks whether a cell supports sMTC or not will be described more concretely.

First of all, a UE receives from a cell an MIB masked with a newly defined PBCH CRC masking sequence or the existing PBCH CRC masking sequence.

Next, the UE may decode the received MIB and identify a PBCH CRC masking sequence with which the MIB is masked in the decoding process.

The UE may determine whether the cell supports sMTC or not, based on the identified PBCH CRC masking sequence.

(Proposal 3) Method for Signaling Before UE Acquires MIB Information

The present (Proposal 3) provides a method for indicating whether a cell supports sMTC devices or not before receiving MIB information of an sMTC device, for the sake of the sMTC device.

The present (Proposal 3) is different from the above (Proposal 1) and (Proposal 2) in that it indicates whether the corresponding cell supports sMTC devices or not before receiving MIB of the sMTC device, regardless of the reception of MIB of the sMTC device.

In this method, a cell transmits cell access-related information to a UE before receiving MIB information of the UE in order to indicate whether the corresponding cell supports sMTC devices or not.

The cell access-related information may include information related to barring access to the corresponding cell from the sMTC UE (or information indicating whether the corresponding cell supports sMTC or not) and information related to whether the corresponding cell is an sMTC UE-only cell or not (or information indicating whether an sMTC UE-only cell operation is permitted or not).

The sMTC-only cell operation refers to an operation optimized for sMTC service provided by a cell that only supports sMTC UEs.

The sMTC-only cell operation is performed by sMTC, and may include an operation of not assuming CRS reception and an operation of using an LTE control region for performance enhancement, data transmission, and control signaling.

In this proposal, an sMTC device may find out in an early stage information about whether the corresponding cell supports sMTC or not, by receiving cell access-related information quickly before MIB reception, thereby achieving a battery saving effect or the like.

In order to indicate to the UE whether the corresponding cell supports sMTC devices or not before receiving MIB of the UE, the cell may use an LTE PSS (Primary Synchronization Signal) and/or SSS (Secondary Synchronization Signal) (Embodiment 1) or use an LTE control region (Embodiment 2).

Hereinafter, the embodiments will be described concretely.

Embodiment 1

A cell may transmit cell access-related information to a UE by using a PSS and/or SSS.

In an example, a cell may use an existing LTE PSS and/or SSS as it is, but in a different form than the pattern on the time/frequency resources of the PSS and/or SSS in the existing LTE FDD (Frequency Division Duplex/TDD (Time Division Duplex) (hereinafter, existing PSS and/or SSS pattern).

An sMTC device may receive a PSS and/or SSS by detecting a PSS and/or SSS pattern of a different form than the existing PSS and/or SSS pattern, and receive cell access-related information based on the received PSS and/or SSS.

Accordingly, the sMTC device is able to find out whether the corresponding cell supports sMTC devices or not and whether an sMTC-only operation is permitted in the corresponding cell, based on the received cell access-related information.

On the other hand, a legacy eMTC device may not be able to detect a PSS and/or SSS pattern of a different form than the existing PSS and/or SSS pattern. Thus, the cell access-related information may not be received.

In another example, the cell copies a PSS and/or SSS pattern whose time and frequency are reversed from those of the existing PSS and/or SSS pattern to time/frequency resources.

Hereinafter, a pattern whose time and frequency are reversed from those of the PSS and/or SSS pattern is represented as a time/frequency-reversed PSS and/or SSS pattern.

The sMTC device may detect the time/frequency-reversed PSS and/or SSS pattern, and therefore may receive a PSS and/or SSS and receive cell access-related information based on the received PSS and/or SSS.

Accordingly, the sMTC device is able to find out whether the corresponding cell supports sMTC devices or not and whether an sMTC-only operation is permitted in the corresponding cell, based on the received cell access-related information.

On the other hand, a legacy eMTC device may not be able to detect the time/frequency-reversed PSS and/or SSS pattern, and therefore may not be able to receive a PSS and/or SSS, thereby eliminating the possibility that the cell access-related information is wrongly received by the legacy eMTC device.

Embodiment 2

A cell may transmit cell access-related information to a UE by using an existing LTE control region.

In an example, a cell may transmit a known sequence through an existing LTE control region.

The known sequence may contain the cell access-related information, and an sMTC may already know the known sequence.

Accordingly, the sMTC may detect the known sequence which it already knows that is being transmitted in the LTE control region, and acquire cell access-related information.

In another example, a cell may copy all or some of OFDM (orthogonal frequency division multiplexing) symbols constituting a PBCH to an existing LTE control region and signal them.

The PBCH may consist of four OFDM symbols.

Specifically, the cell may indicate a standalone mode or the like to an sMTC device by repeating the PBCH in a specific pattern.

That is, the cell may indicate to an sMTC whether the corresponding cell supports sMTC or not and whether the corresponding cell permits an sMTC-only operation or not, by repeating the PBCH in a specific pattern in an LTE control region.

A repetition unit may be the entire PBCH or part of the PBCH consisting of four OFDM symbols.

Figure 26:
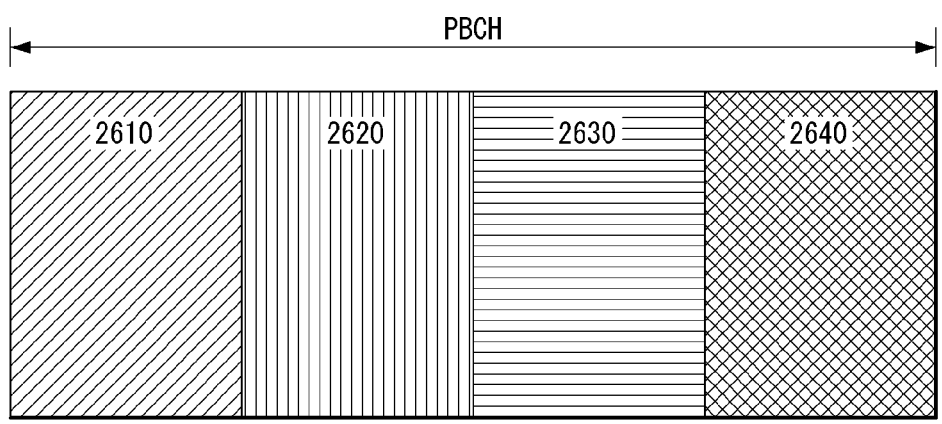
FIG. 26 is a view for explaining a UE's operation for performing a cell access supporting method according to an embodiment of the present disclosure.

FIG. 26 is a view for helping understanding of a method for copying all or some of OFDM symbols of a PBCH to configure a specific pattern.

In a first method for copying OFDM symbols of a PBCH to an LTE control region, different parts of the PBCH may be copied to configure a pattern, and may be copied to an LTE control region.

At least one OFDM symbol may be selected from four OFDM symbols (2610 to 2640) of a PBCH in order to create a specific pattern.

Referring to FIG. 26, when selecting only two, a total of 6 combinations of two may be selected, such as (2610, 2620) and (2610, 2630).

Here, the selected OFDM symbols are not arranged in a new order but in the same order as on the PBCH.

In a second method for copying OFDM symbols of a PBCH to an LTE control region, three may be selected from the four OFDM symbols of the PBCH, and as many patterns as the number of sequences of the selected three OFDM symbols may be created.

That is, referring to FIG. 26, there are a total of four methods for selecting three OFDM symbols from the four OFDM symbols, including (2610, 2620, 2630) and (2610, 2620, and 2640).

Moreover, there are a total of six methods for arranging three selected symbols. Thus, according to a method for arranging three symbols out of the four OFDM symbols, information for a total of 24 states may be represented.

Each of the 24 states may correspond to information indicating whether the corresponding cell supports sMTC or not and information related to whether an sMTC-only operation is permitted in the corresponding cell.

Although the description has been made with an example in which three OFDM symbols are copied, the present disclosure is not limited thereto.

In a second method for copying OFDM symbols of a PBCH to an LTE control region, a pattern may be created by multiplying the same OFDM symbols by an orthogonal sequence.

In another example, channel coding may be applied to cell access-related information, and a modulation symbol may be generated from the coded bits of the cell access-related information to map REs (resource elements) to an LTE control region and transmit them.

(Method 2) Access Barring Method for Non-sMTC Device

The present (Method 2) provides a method in which a base station (eNB, etc.) bars cell access from non-sMTC devices at an appropriate timing, if non-sMTC devices including an eMTC device and a legacy LTE device attempt to access a cell that only supports sMTC devices.

Through (Method 2), cell access from non-sMTC devices may be barred at an appropriate timing, thereby preventing the non-sMTC devices from attempting to access the corresponding cell for a long period of time while consuming power.

sMTC and non-SMTC UEs commonly receive and decode PSS, SSS, and PBCH, and non-SMTC UEs are barred from cell access in the step of receiving SIB1-BR.

In the case of an LTE device, cell access barring information may be transmitted through SIB1, and therefore cell access from the LTE device may be barred.

Similarly, in the case of an eMTC device, cell access barring information may be transmitted through SIB1-BR, and therefore cell access from the eMTC device may be barred.

In the case where cell access from the eMTC device is barred through SIB1-BR, the sMTC device also may receive SIB1-BR.

At this point, the sMTC device may implicitly find out that the cell only supports sMTC, based on the eMTC device's cell access barring information contained in the SIB 1-BR.

That is, an sMTC may not be given an explicit indication of information that the corresponding cell only supports sMTC devices, but instead may infer that the cell only supports sMTC based on information that the cell does not support eMTC.

Having explicitly found out that the cell only supports sMTC, the sMTC device may perform an sMTC-only operation, i.e., an operation optimized for sMTC service, in the cell.

For example, the sMTC may not expect CRS reception or perform an operation such as receiving at least one of downlink data, reference signal, and signaling information through an LTE control region.

By performing an sMTC-only operation, the sMTC is able to know that there occurs no problem caused by the coexistence with a non-sMTC device within a system bandwidth indicated by the MIB after the SIB1-BR step.

That is, if the sMTC device receives SIB1-BR and determines that the corresponding cell only supports sMTC based on cell access barring information of non-sMTC devices contained in the SIB1-BR, the sMCT device may use all the resources after the corresponding point in time without the problem of coexistence with non-MTC devices.

In other words, within a system bandwidth indicated by the MIB, the sMTC device needs to operate considering the problem caused by the coexistence with non-SMTC UEs, on subframes before the point in time when the sMTC device acquires SIB1-BR.

The subframes before the point in time when the sMTC device acquires SIB1-BR refer to resources or subframes in which at least one of the PSS/SSS, the MIB and the CRS of the corresponding subframe, the SIB1 and the CRS of the corresponding subframe, and the SIB1-BR and the CRS of the corresponding subframe, and the CRS of the control region are transmitted.

In the subframes before the point in time when the sMTC device acquires SIB1-BR, a control region of the same size as the control region applied to non-sMTC devices is applied to the sMTC device.

Accordingly, the sMTC device may have limitations when extensively using the control region in the subframes before the point in time when the sMTC device acquires SIB1-BR.

That is, the sMTC device may not be able to perform an sMTC-only operation in the subframes before the point in time when the sMTC device acquires SIB1-BR.

However, these limitations may apply only within the LTE system bandwidth that is set for non-MTC devices by the MIB.

That is, the limitations may not apply in segments where a narrowband set for the sMTC device and the LTE system bandwidth set for non-MTC devices do not overlap.

Figure 27:
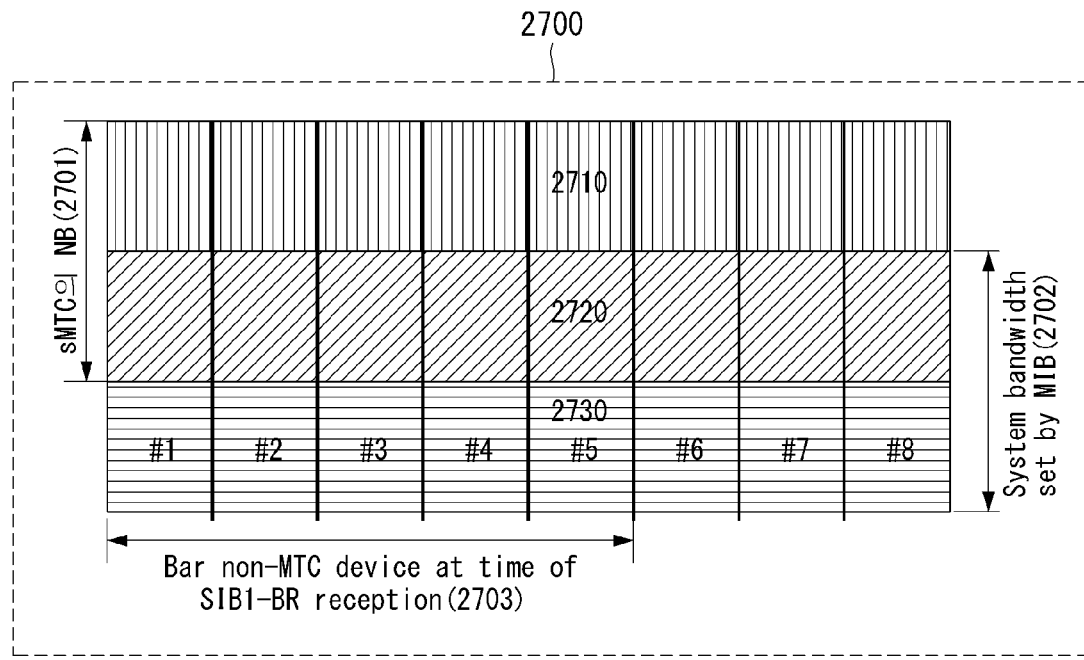
FIG. 27 is a view showing a UE's operation for performing a cell access supporting method according to an embodiment of the present disclosure.
Figure 27:
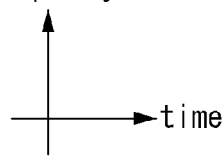

FIG. 27 is a view showing a time-frequency resource region for helping understanding of the above description.

In FIG. 27, the narrowband 2701 set for sMTC and the LTE system bandwidth 2702 set by the MIB are illustrated.

The segments indicated by #1 to #8 in the time-frequency resource region 2700 of FIG. 27 represent subframes.

An sMTC device may receive SIB1-BR from a cell at the starting point of subframe #6 and acknowledge that the corresponding cell does not support non-sMTC devices.

Accordingly, the sMTC may extensively use a control region present in the subframes, from the starting point of subframe #6, in the segments 2720 where the narrowband 2701 set for sMTC and the LTE system bandwidth set by the MIB overlap.

On the other hand, the sMTC may extensively use a control region present in the subframes #1 to #8 without limitations, in the segments 2710 where the narrowband 2701 set for sMTC and the LTE system bandwidth set by the MIB do not overlap.

The same applies when an eMTC device is not barred from cell access and coexists with an sMTC UE.

For example, in order to provide reference to non-sMTC devices or to coexist with an sMTC device, MBSFN subframe configuration may be used.

At this point, the differences in the operation of the sMTC device caused by the differentiation between MBSFN (multicast broadcast single frequency network/non-MBSFN subframes may apply only in the segments where the narrowband set for sMTC and the LTE system bandwidth set by the MIB do not overlap.

That is, for frequency resources which the sMTC device does not share with non-sMTC devices, the sMTC device may construe that each subframe has a different CRS RE (resource element) location, regardless of the MBSFN configuration.

In a case where a non-sMTC device, especially, an eMTC device, is barred from cell access through SIB1-BR, cell access barring information of the sMTC device needs to be transmitted separately.

There may be three methods for an sMTC device to acquire cell access barring information of the sMTC device.

First of all, an sMTC device may acquire cell access barring information by receiving SIB1-BR with the cell access barring information of the sMTC device added to it.

Next, the sMTC device may acquire cell access barring information of the sMTC device through a system information message (including SIB2) scheduled based on SIB 1-BR.

Finally, the cell access barring information of the sMTC may be transmitted through a method for signaling through MIB content or a method for signaling in the MIB decoding step.

In this case, the sMTC device may acquire information indicating whether the corresponding cell supports sMTC devices and LTE access barring information, by receiving MIB. At this point, the sMTC device may find out whether the corresponding cell is an MTC(eMtC/sMTC)-only cell or not.

Afterwards, the sMTC device may receive SIB1-BR containing eMTC device access barring information and finally find out whether the corresponding cell is an sMTC-only cell based on the SIB1-BR.

Alternatively, it may be possible to find out whether the corresponding cell is an sMTC-only cell by getting sMTC device support information of the corresponding cell before MIB reception and acquiring eMTC access barring information in the SIB1-BR step.

(Method 3) Method for Supporting Both Non-SMTC Device and sMTC Device in the Same Cell The present (Method 3) provides a method for supporting a non-MTC device, especially, eMTC device, and an sMTC device, in the same cell.

In a cell where both an eMTC device and an sMTC device are supported, a base station (eNB, etc.) may perform scheduling differently on the eMTC device and the sMTC device in a random access procedure.

Specifically, the base station may schedule downlink (DL) data for the sMTC device through an LTE control region or transmit a control signal to the sMTC device.

(Proposal 1) Differentiation in Random Access Preamble Transmission Step (Proposal 1) provides a method in which an sMTC device and an eMTC device are differentiated by a base station by transmitting a random access preamble (hereinafter, Message 1) to the base station in a random access procedure.

The sMTC device and the eMTC device may report to the base station whether they are an sMTC device or an eMTC device, by selecting random access channel (RACH) resources pre-configured by a higher layer.

Also, they may report UE capability to the base station by selecting the RACH resources configured by a higher layer.

The method provided by (Proposal 1) enables the sMTC device to perform an operation using an LTE control region, from the step of receiving a random access response message (Message 2).

Specifically, the sMTC device may receive downlink data or a control signal in an LTE control region in the message 2 step.

Moreover, in this method, when performing an operation such as MT-EDT (mobile terminated early data transmission) or the like, the base station may transmit downlink early data by using an LTE control region for the sMTC device or transmit a control signal related to the corresponding operation.

The control signal may include signaling of whether there is an additional data transmission or not.

In order for the sMTC device to perform an sMTC-only operation during the random access procedure, the RAR (random access response) information of the sMTC device contained in Message 2 may be defined differently from the eMTC device.

For example, information required to use an LTE control region may be contained in the RAR information of the sMTC device, in the MPDCCH (MTC Physical Downlink Control Channel) monitoring step for retransmitting an RRC connection request message (Message 3) or receiving an RRC connection configuration message (Message 4).

The information required to use an LTE control region may include LTE control region reception information, RE mapping information related to the LTE control region reception information, or information related to options for data encoding or the like.

As described above, in order to differentiate between sMTC and eMTC in the step of Message 1 transmission, the base station splits the RACH resources for the eMTC device and sMTC device and allocates the split RACH resources.

Moreover, the base station broadcasts information related to the split and allocated RACH resources.

In an example, the above information may be included in System Information Block 2 (SIB2) and broadcast.

(Proposal 2) Differentiation in RRC Connection Request Message (Hereinafter, Message 3) Transmission Step In order to support a method for differentiating between an eMTC device and an sMTC in the Message 1 transmission step discussed in (Proposal 1), the base station has to split RACH resource and allocate the split RACH resources to the eMTC device and the sMTC device.

This method is problematic in that, since limited RACH resources are split for various purposes, more collisions occur between devices transmitting Message 1 and therefore the average time required for contention resolution increases.

Due to this reason, the sMTC device and the eMTC device may report to the base station whether they are an sMTC device or an eMTC device and also report UE capability to the base station, in the Message 3 transmission step.

After identifying an sMTC device through Message 3 reception, the base station may schedule an sMTC-only operation for the sMTC device for an sMTC-only operation, from the Message 4 transmission step.

After Message 3 transmission, operations such as MPDCCH monitoring for message 3 retransmission and MPDCCH monitoring for message 4 reception may differ between the sMTC device and the eMTC device.

For example, after Message 3 transmission, the sMTC device may monitor the LTE control region as well when performing MPDCCH monitoring for message 3 retransmission or Message 4 reception.

On the other hand, the eMTC device is not able to monitor the LTE control region during MPDCCH monitoring.

Figure 28:
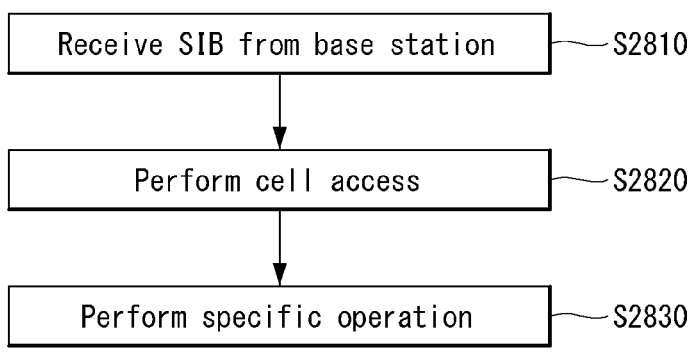
FIG. 28 is a flowchart showing a UE's operation for performing a cell access supporting method according to an embodiment of the present disclosure.

FIG. 28 shows an example of the above-described terminal operation according to the present disclosure.

That is, FIG. 28 shows a terminal's operation for performing cell access in a wireless communication system.

First of all, the terminal receives one SIB among a plurality of system information blocks (SIBs) from a base station (S2810).

The one SIB may be transmitted for the first time among the plurality of SIBs.

The one SIB includes first instruction information related to barring cell access from terminals supporting other services than the sMTC.

Next, the terminal performs the cell access (S2820).

The terminal performs a specific operation related to the sMTC, if the cell does not permit the cell access from the terminals supporting other services than the sMTC, based on the first instruction information (S2830).

The other services are LTE and eMTC (Enhanced Machine Type Communication).

Here, the specific operation may be an operation of recognizing that a cell-specific reference signal (CRS) is not transmitted in the cell.

Alternatively, the specific operation may be an operation of receiving downlink data/control information for terminals supporting sMTC in an LTE control region which is a resource region where control information of terminals supporting LTE (Long-Term-Evolution) is transmitted.

Additionally, the terminal may receive a master information block (MIB) containing second indication information related to permitting the cell access from the terminals supporting the sMTC.

Furthermore, the cell access may be performed based on the second indication information.

Furthermore, the MIB may be scrambled and transmitted through a specific scrambling sequence for the sMTC.

Here, as for the specific scrambling sequence, a scrambling sequence for supporting the other services and an initialization sequence may be different.

Furthermore, the MIB may be masked with a specific CRC (cyclic redundancy check) sequence for the sMTC and transmitted.

Furthermore, the MIB may be recognized as one for the sMTC based on the specific CRC sequence.

Here, the terminal may be a terminal supporting sMTC, and the terminals supporting the other services may be an eMTC terminal and a legacy LTE terminal.

Additionally, the terminal may receive a synchronization signal mapped to a resource region in a specific pattern, wherein the specific pattern may be a pattern whose time and frequency are reversed from those of a pattern in which an LTE primary synchronization signal (PSS) and/or an LTE secondary synchronization signal (SSS) are mapped to the resource region, and the terminal may acquire second indication information related to permitting the cell access from the terminals supporting the sMTC.

Furthermore, the terminal may acquire second indication information related to permitting the cell access from the terminals supporting the sMTC, based on a specific pattern in which a specific number of OFDM (orthogonal frequency division multiplexing) symbols constituting a physical broadcast channel (PBCH) are copied to an LTE control region which is a resource region where control information of terminals supporting LTE is transmitted.

If some of the specific number of OFDM symbols are copied to the LTE control region, the specific pattern may include one or more different OFDM symbols among the specific number of OFDM symbols, wherein the one or more different OFDM symbols may be arranged in a random order within the specific pattern.

Additionally, the terminal may receive configuration information of a DRX (discontinuous reception) mode from the base station, wherein the first indication information may be received during a listening interval of the DRX mode.

More concrete details of implementations in a terminal for performing cell access according to the present disclosure will be described with reference to the terminal operation method of FIG. 28.

A terminal for performing cell access in a wireless communication system comprises: a transmitter for transmitting a radio signal; a receiver for receiving the radio signal; and a processor functionally connected to the transmitter and the receiver.

The processor controls the receiver to receive one SIB among a plurality of system information blocks from a base station.

The one SIB includes first instruction information related to barring cell access from terminals supporting other services than the sMTC.

The processor controls the terminal to perform the cell access.

The processor controls the terminal to perform a specific operation related to the sMTC, if the cell does not permit the cell access from the terminals supporting other services than the sMTC, based on the first instruction information.

Figure 29:
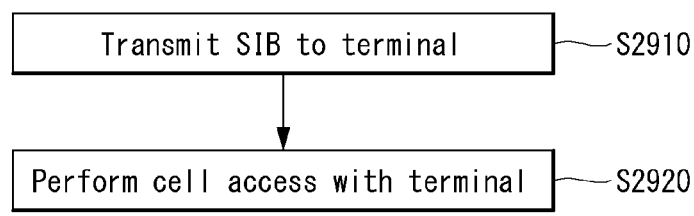
FIG. 29 is a flowchart showing a base station's operation for performing a cell access supporting method according to an embodiment of the present disclosure.

FIG. 29 is a view showing an example of the above-described base station operation according to the present disclosure.

That is, FIG. 29 shows a base station's operation for performing cell access with a terminal in a wireless communication system.

The base station transmits one among a plurality of system information blocks (SIBs) to the terminal (S2910).

The one SIB includes first instruction information related to barring cell access from terminals supporting other services than the sMTC.

The base station performs the cell access with the terminal (S2920).

The terminal performs a specific operation related to the sMTC, if the cell does not permit the cell access from the terminals supporting other services than the sMTC, based on the first instruction information.

More concrete details of implementations in a base station for performing fast cell access according to the present disclosure will be described with reference to the base station operation method of FIG. 29.

A base station for performing cell access in a wireless communication system comprises: a transmitter for transmitting a radio signal; a receiver for receiving the radio signal; and a processor functionally connected to the transmitter and the receiver.

The processor, controls the transmitter to transmit one SIB among a plurality of system information blocks to the terminal.

The one SIB includes first instruction information related to barring cell access from terminals supporting other services than the sMTC.

The processor controls the base station to perform the cell access with the terminal.

The terminal performs a specific operation related to the sMTC, if the cell does not permit the cell access from the terminals supporting other services than the sMTC, based on the first instruction information.

General Apparatus to which Embodiment of the Present Disclosure May be Applied

Figure 30:
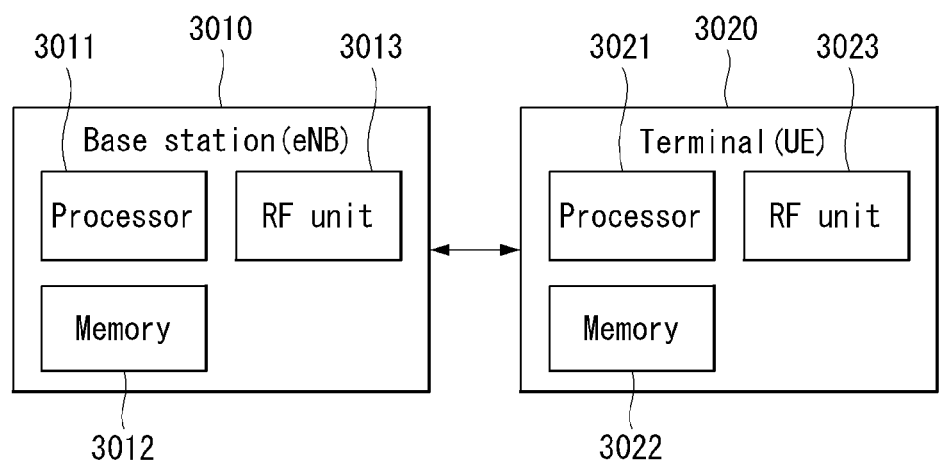
FIG. 30 illustrates a block diagram of a wireless communication device according to an embodiment of the present disclosure.

FIG. 30 illustrates a block diagram of a wireless communication device according to an embodiment of the present disclosure.

Referring to FIG. 30, the wireless communication system includes a base station 3010 and a plurality of terminals 3020 located within the area of the base station 3010.

The base station 3010 includes a processor 3011, memory 3012, and a radio frequency (RF) unit 3013. The processor 3011 may be configured to implement the functions, processes and/or methods proposed in FIGS. 1 to 29. The layers of a wireless interface protocol may be implemented by the processor 3011. The memory 3012 is coupled with the processor 3011 and stores various kinds of information to operate the processor 3011. The RF unit 3013 is coupled with the processor 3011 and transmits and/or receives a radio signal.

A UE 3020 includes a processor 3021, a memory 3022, and an RF unit 3023. The processor 3021 may be configured to implement the functions, processes, and/or methods proposed in FIGS. 1 to 29. The layers of the wireless interface protocol may be implemented by the processor 3021. The memory 3022 is coupled with the processor 3021, and stores various kinds of information to operate the processor 3021. The RF unit 3023 is coupled with the processor 3021 to transmit and/or receive a radio signal.

The memories 3012 and 3022 may be internal or external to the processors 3011 and 3021, and may be connected to the processors 3011 and 3021 by various well-known means. Also, the base station 3010 and/or the UE 3020 may have a single antenna or multiple antennas.

In the aforementioned embodiments, the elements and characteristics of the present disclosure have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present disclosure. The sequence of the operations described in the embodiments of the present disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present disclosure may be implemented by various means, for example, hardware, firmware, software or a combination of them. In the case of an implementation by hardware, the embodiment of the present disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

Figure 31:
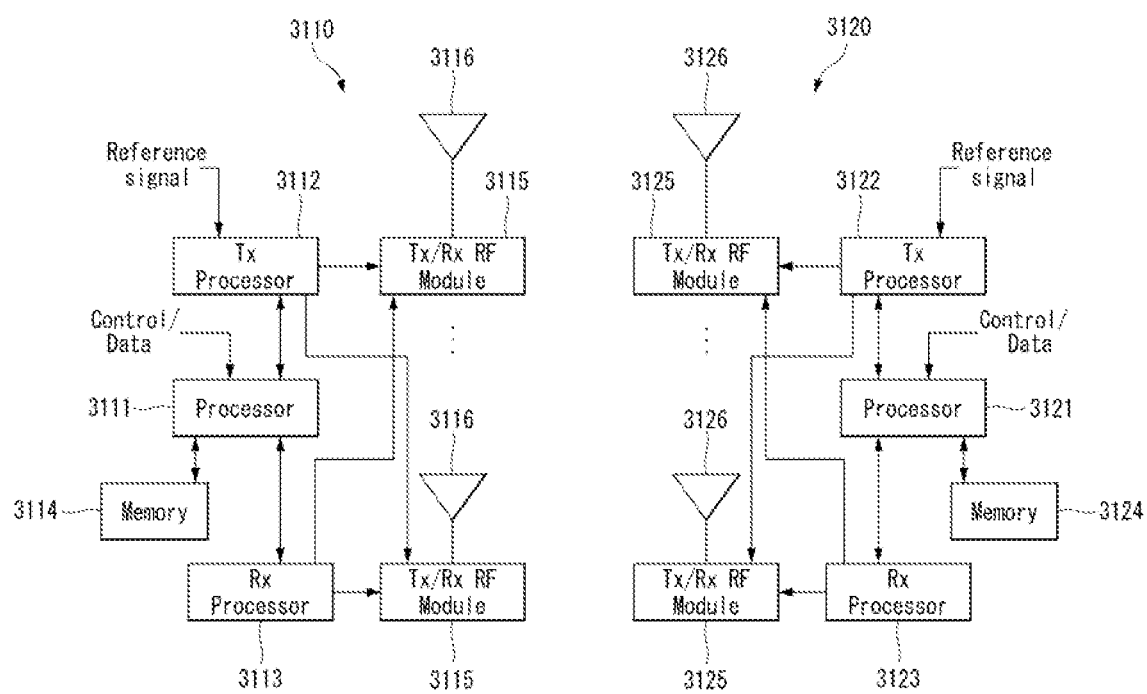
FIG. 31 illustrates a block diagram of a wireless communication device according to an embodiment of the present disclosure.

FIG. 31 shows another example of a block diagram of a wireless communication device to which methods proposed in the present disclosure may be applied.

Referring to FIG. 31, a wireless communication system includes a base station 3110 and a plurality of terminals 3120 located within the area of the base station 3110. The base station 3110 includes a processor 3111, a memory 3112, and an RF unit 3113. The base station may be represented as a transmission device, and the terminal may be represented as a reception device, or vice versa. The base station and the terminal include processors 3111 and 3121, memories 3114 and 3124, one or more Tx/Rx radio frequency (RF) modules 3115 and 3125, Tx processors 3112 and 3122, Rx processors 3113 and 3123, and antennas 3116 and 3126, respectively. The processor implements the above-described functions, processes, and/or methods.

More specifically, in DL (communication from the base station to the terminal), a higher layer packet from a core network is provided to the processor 3111. The processor implements the function of the L2 layer. In DL, the processor provides the terminal 3120 with multiplexing between a logical channel and a transport channel and radio resource allocation, and is responsible for signaling toward the terminal. The TX processor 3112 implements various signal processing functions for the L1 layer (i.e., physical layer). The signal processing function facilitates forward error correction (FEC) in the terminal, and includes coding and interleaving. A coded and modulated symbol is split into parallel streams. Each stream is mapped to an OFDM subcarrier and multiplexed with a reference signal (RS) in the time and/or frequency domain. The streams are combined using inverse fast Fourier transform (IFFT) to generate a physical channel that carries a time domain OFDMA symbol stream. The OFDM stream is spatially precoded in order to generate multiple space streams. Each space stream may be provided to a different antenna 3116 through an individual Tx/Rx module (or transmitter and receiver 3115). Each Tx/Rx module may modulate an RF carrier into each space stream for transmission. In the terminal, each Tx/Rx module (or transmitter and receiver 3125) receives a signal through each antenna 3126 of each Tx/Rx module. Each Tx/Rx module restores information modulated in an RF carrier and provides it to the RX processor 3123. The RX processor implements various signal processing functions of the layer 1. The RX processor may perform space processing on information in order to restore a given space stream toward the terminal. If multiple space streams are directed toward the terminal, they may be combined into a single OFDMA symbol stream by multiple RX processors. The RX processor converts the OFDMA symbol stream from the time domain to the frequency domain using fast Fourier transform (FFT). The frequency domain signal includes an individual OFDMA symbol stream for each subcarrier of an OFDM signal. Symbols on each subcarrier and a reference signal are restored and demodulated by determining signal deployment points having the best possibility, which have been transmitted by the base station. Such soft decisions may be based on channel estimation values. The soft decisions are decoded and deinterleaved in order to restore data and a control signal originally transmitted by the base station on a physical channel. A corresponding data and control signal are provided to the processor 3121.

UL (communication from the terminal to the base station) is processed by the base station 3110 in a manner similar to that described in relation to the receiver function in the terminal 3120. Each Tx/Rx module 3125 receives a signal through each antenna 3126. Each Tx/Rx module provides an RF carrier and information to the RX processor 3123. The processor 3121 may be related to the memory 3124 storing a program code and data. The memory may be referred to as a computer-readable medium.

The above-described method of cell access from a terminal according to the present disclosure may be implemented by an apparatus of FIGS. 32 to 36 as follows.

Figure 32:
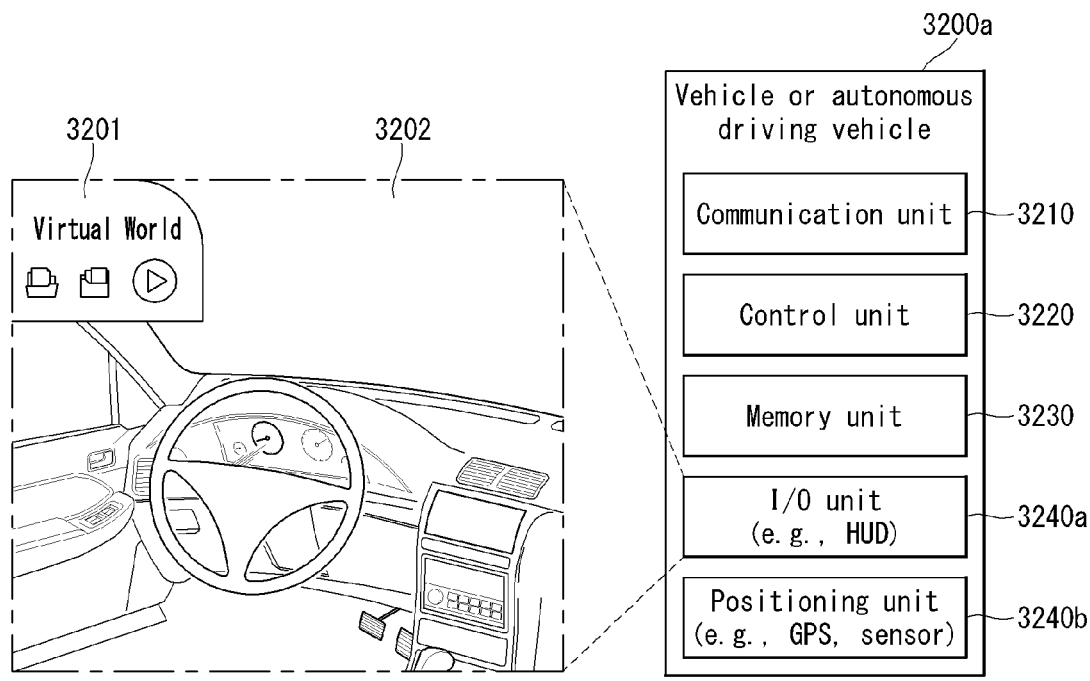
FIG. 32 shows an example of a self-driving vehicle to which channel estimation methods according to an embodiment of the present disclosure may be applied.

FIG. 32 shows an example of a self-driving vehicle to which the methods proposed in the present disclosure may be applied.

Referring to FIG. 32, a vehicle 3200a may include a communication unit 3210, a control unit 3220, a memory unit 3230, an input/output unit 3240a, and a positioning unit 3240b. The blocks 3210 to 3230/3240a and 3240b correspond to the blocks 3610 to 3630/3640 of FIG. 36.

The communication unit 3210 may transmit and receive signals (e.g., data, control signals, and so on) to and from external devices such as other vehicles or a base station. The control unit 3220 may perform various operations by controlling the components of the vehicle 3200a. The memory unit 3230 may store data/parameters/programs/code/commands supporting various functions of the vehicle 3200a. The input/output unit 3240a may output an AR/VR object based on information in the memory unit 3230. The input/output unit 3240a may include an HUD. The positioning unit 3240b may acquire position information about the vehicle 3200a. The position information may include absolute position information, information about a position within a lane, acceleration information, information about a position relative to a neighboring vehicle, and so on of the vehicle 3200a. The positioning unit 3240b may include a GPS and various sensors.

For example, the communication unit 3210 of the vehicle 3200a may receive map information and traffic information from an external server and store the received information in the memory unit 3230. The positioning unit 3240 may acquire vehicle position information through the GPS and various sensors and store the acquired vehicle position information in the memory unit 3230. The control unit 3220 may generate a virtual object based on the map information, traffic information, and vehicle position information, and the input/output unit 3240a may display the generated virtual object on a window in the vehicle (3201 and 3202). Further, the control unit 3220 may determine whether the vehicle 3200a is travelling normally within a lane based on the vehicle position information. When the vehicle 3200 is abnormally outside the lane, the control unit 3220 may display a warning on a window in the vehicle via the input/output unit 3240a. Further, the control unit 3220 may broadcast a warning message about the abnormal driving to neighboring vehicles. Under some circumstances, the control unit 3220 may transmit position information about the vehicle and information about a driving/vehicle abnormality to an authority through the communication unit 3210.

Figure 33:
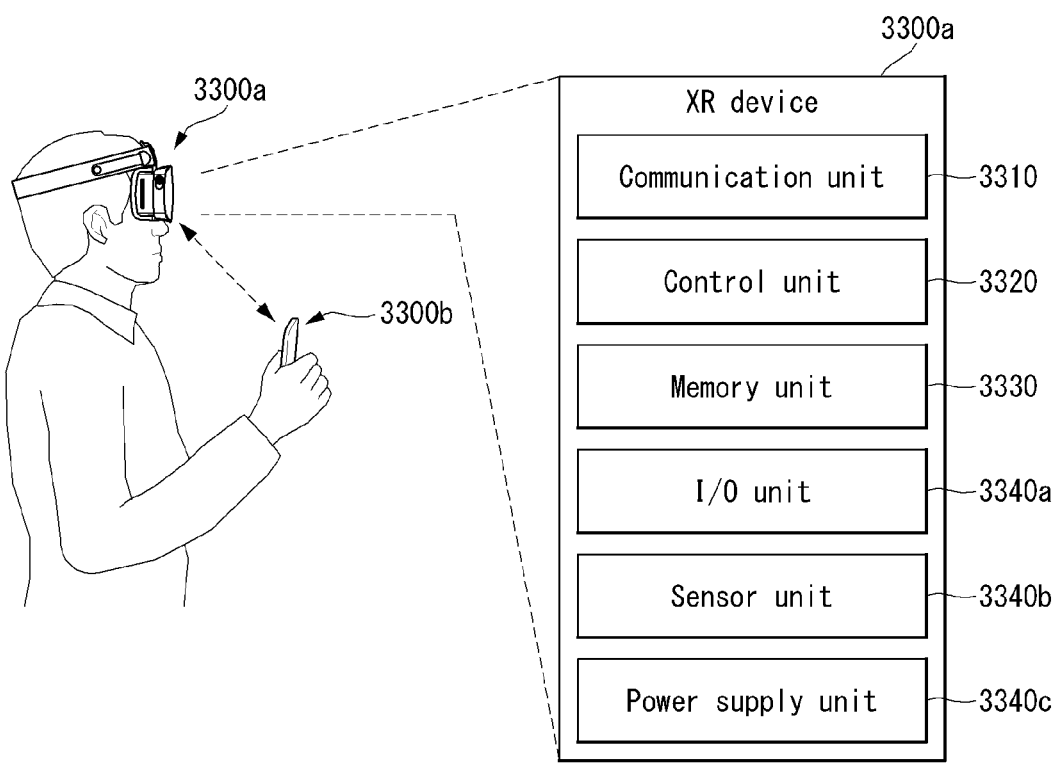
FIG. 33 is a view showing an example of an XR device to which channel estimation methods according to an embodiment of the present disclosure may be applied.

FIG. 33 shows an example of an XR device to which the methods proposed in the present disclosure may be applied.

The XR device may be implemented by an HMD, an HUD mounted in a vehicle, a television, a smartphone, a computer, a wearable device, a home appliance, a digital signage, a vehicle, a robot, etc.

Referring to FIG. 33, an XR device 3300a may include a communication unit 3310, a control unit 3320, a memory unit 3330, an input/output unit 3340a, a sensor unit 3340b, and a power supply unit 3340c. The blocks 3310 to 330/3340a to 3340c correspond to the blocks 3310 to 3330/3340 of FIG. 36, respectively.

The communication unit 3310 may transmit and receive signals (e.g., media data and control signals) to and from external devices such as other wireless devices, handheld devices, or media servers. The media data may include video, images, and sound. The control unit 3320 may perform various operations by controlling constituent elements of the XR device 3300a. For example, the control unit 3320 may be configured to control and/or perform procedures such as video/image acquisition, (video/image) encoding, and metadata generation and processing. The memory 3320 may store data/parameters/programs/code/commands needed to drive the XR device 3300a/generate an XR object. The input/output unit 3340a may externally obtain control information and data and output the generated XR object. The input/output unit 3340a may include a camera, a microphone, a user input unit, a display, a speaker, and/or a haptic module. The sensor unit 3340b may obtain an XR device state, surrounding environment information, user information, etc. The sensor 3340b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar. The power supply unit 3340c may supply power to the XR device 3300a and include a wired/wireless charging circuit, a battery, etc.

For example, the memory unit 3330 of the XR device 3300a may include information (e.g., data) needed to generate the XR object (e.g., an AR/VR/MR object). The input/output unit 3340a may receive a command for manipulating the XR device 3300a from a user and the control unit 3320 may drive the XR device 3300a according to a driving command of a user. For example, when a user desires to watch a film or news through the XR device 3300*a*, the control unit 3320 transmits content request information to another device (e.g., a handheld device 3300*b*) or a media server through the communication unit 3310. The communication unit 3310 may download/stream content such as films or news from another device (e.g., the handheld device 3300*b*) or the media server to the memory unit 3330. The control unit 3320 may control and/or perform procedures such as video/image acquisition, (video/image) encoding, and metadata generation/processing with respect to the content and generate/output the XR object based on information about a surrounding space or a real object obtained through the input/output unit 3340*a*/sensor unit 3340*b*.

The XR device 3300*a* may be wirelessly connected to the handheld device 3300*b* through the communication unit 3310 and the operation of the XR device 3300*a* may be controlled by the handheld device 3300*b*. For example, the handheld device 3300*b* may operate as a controller of the XR device 3300*a*. To this end, the XR device 3300*a* may obtain information about a 3D position of the handheld device 3300*b* and generate and output an XR object corresponding to the handheld device 3300*b*.

In the present disclosure, a wireless device includes a base station, a network node, a transmitting terminal, a receiving terminal, a wireless device, a wireless communication device, a vehicle, a vehicle equipped with a self-driving function, an unmanned aerial vehicle (UAV), an artificial intelligence (AI) module, a robot, an augmented reality (AR) device, a virtual reality (VR) device, an MTC device, an IoT device, a medical device, a FinTech device (or financial device), a security device, a climate/environmental device, or other fourth-order industrial revolution fields, devices associated with a 5G service, or the like. For example, the drone can be a vehicle flying by radio control signals without people. For example, the MTC device and the IoT device are devices that do not require human intervention or manipulation, and may be a smart meter, a bending machine, a thermometer, a smart bulb, a door lock, various sensors, and the like. For example, the medical device is a device used to examine, replace, or modify a device, a structure, or a function used for diagnosing, treating, alleviating, treating, or preventing a disease, and may be a medical device, a surgical device, a (in vitro) diagnostic device, a hearing aid, a surgical operation device, and the like. For example, the security device is a device installed to prevent a risk that may occur and maintain safety, and may be a camera, a CCTV, a black box, or the like. For example, the fintech device is a device that can provide financial services such as mobile payment, and may be a payment device or a point of sales (POS). For example, the climate/environmental device may mean a device for monitoring and predicting the climate/environment.

In the present disclosure, the terminal may include a mobile phone, a smart phone, a laptop computer, a digital broadcasting terminal, personal digital assistants (PDA), a portable multimedia player, navigation, a slate PC, a tablet PC, an ultrabook, a wearable device (e.g., smartwatch, smart glass, head mounted display), a foldable device, and the like. Furthermore, the HMD is a display device of a type worn on the head and may be used to implement VR or AR.

Figure 34:
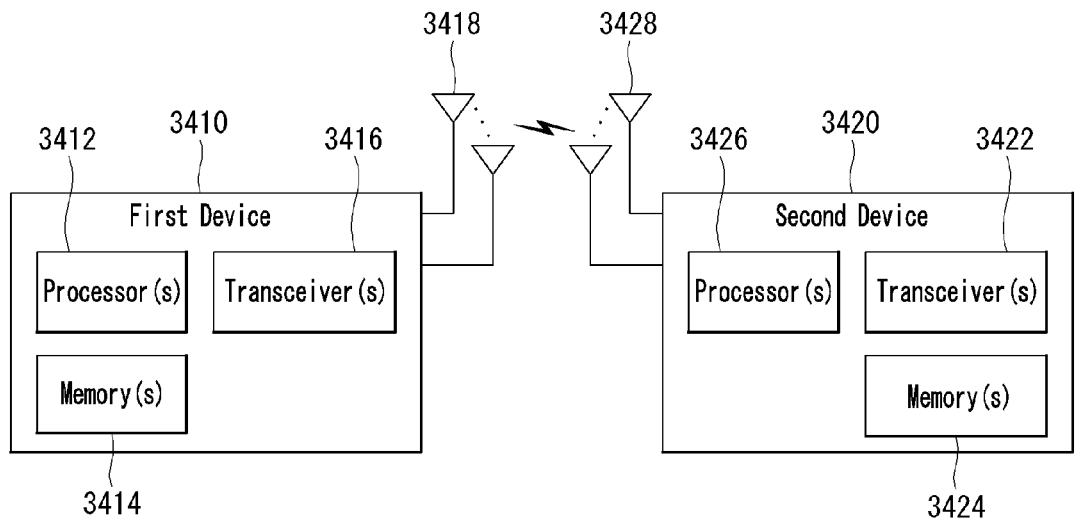
FIG. 34 illustrates a wireless device applicable to the present disclosure.

FIG. 34 illustrates a wireless device applicable to the present disclosure.

Referring to FIG. 34, a first wireless device 3410 and a second wireless device 3420 may transmit radio signals through a variety of RATs (e.g., LTE and NR).

The first wireless device 3410 may include one or more processors 3412 and one or more memories 3414, and additionally further include one or more transceivers 3416 and/or one or more antennas 3418. The processors 3412 may control the memories 3414 and/or the transceivers 3416, and may be configured to implement the descriptions, functions, procedures, proposals, methods, and/or operational flowcharts disclosed in this document. For example, the processors 3412 may process information within the memories 3414 to generate first information/signals and then transmit radio signals including the first information/signals including second information/signals through the transceivers 3416 and then store information obtained by processing the second information/signals in the memories 3414. The memories 3414 may be connected to the processors 3412 and store a variety of information related to operations of the processors 3412. For example, the memories 3414 may store software code including commands for performing part or the entirety of processes controlled by the processors 3412 or for performing the descriptions, functions, procedures, proposals, methods, and/or operational flowcharts disclosed in this document. Herein, the processors 3412 and the memories 3414 may be part of a communication modem/circuit/chip designed to implement RAT (e.g., LTE or NR). The transceivers 3416 may be connected to the processors 3412 and transmit and/or receive radio signals through one or more antennas 3418. Each of the transceivers 3416 may include a transmitter and/or a receiver. The transceivers 3416 may be interchangeably used with Radio Frequency (RF) unit(s). In the present disclosure, the wireless device may represent a communication modem/circuit/chip.

The second wireless device 3420 may include one or more processors 3426 and one or more memories 3424, and additionally further include one or more transceivers 3422 and/or one or more antennas 3428. The processors 3426 may control the memories 3424 and/or the transceivers 3422, and may be configured to implement the descriptions, functions, procedures, proposals, methods, and/or operational flowcharts disclosed in this document. For example, the processors 3426 may process information within the memories 3424 to generate third information/signals and then transmit radio signals including the third information/signals including fourth information/signals through the transceivers 3422 and then store information obtained by processing the fourth information/signals in the memories 3424. The memories 3424 may be connected to the processors 3426 and store a variety of information related to operations of the processors 3426. For example, the memories 3424 may store software code including commands for performing part or the entirety of processes controlled by the processors 3426 or for performing the descriptions, functions, procedures, proposals, methods, and/or operational flowcharts disclosed in this document. Herein, the processors 3426 and the memories 3424 may be part of a communication modem/circuit/chip designed to implement RAT (e.g., LTE or NR). The transceivers 3422 may be connected to the processors 3426 and transmit and/or receive radio signals through one or more antennas 3428. Each of the transceivers 3422 may include a transmitter and/or a receiver. The transceivers 3422 may be interchangeably used with Radio Frequency (RF) unit(s). In the present disclosure, the wireless device may represent a communication modem/circuit/chip.

Hereinafter, hardware elements of the wireless devices 3410 and 3420 will be described more specifically. One or more protocol layers may be implemented by, without being limited to, one or more processors 3412 and 3426. For example, the one or more processors 3412 and 3426 may implement one or more layers (e.g., functional layers such as PHY, MAC, RLC, PDCP, RRC, and SDAP). The one or more processors 3412 and 3426 may generate one or more Protocol Data Units (PDUs) and/or one or more Service Data Unit (SDUs) according to the descriptions, functions, procedures, proposals, methods, and/or operational flowcharts disclosed in this document. The one or more processors 3412 and 3426 may generate messages, control information, data, or information according to the descriptions, functions, procedures, proposals, methods, and/or operational flowcharts disclosed in this document. The one or more processors 3412 and 3426 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 3416 and 3422. The one or more processors 3412 and 3426 may receive the signals (e.g., baseband signals) from the one or more transceivers 3416 and 3422 and acquire the PDUs, SDUs, messages, control information, data, or information according to the descriptions, functions, procedures, proposals, methods, and/or operational flowcharts disclosed in this document.

The one or more processors 3412 and 3426 may be referred to as controllers, microcontrollers, microprocessors, or microcomputers. The one or more processors 3412 and 3426 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 3412 and 3426. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 3412 and 3426 or stored in the one or more memories 3414 and 3424 so as to be driven by the one or more processors 3412 and 3426. The descriptions, functions, procedures, proposals, methods, and/or operational flowcharts disclosed in this document may be implemented using firmware or software in the form of code, commands, and/or a set of commands.

The one or more memories 3414 and 3424 may be connected to the one or more processors 3412 and 3426 and store various types of data, signals, messages, information, programs, code, instructions, and/or commands. The one or more memories 3414 and 3424 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 3414 and 3424 may be located internal and/or external to the one or more processors 3412 and 3426. The one or more memories 3414 and 3424 may be connected to the one or more processors 3412 and 3426 through various technologies such as wired or wireless connection.

The one or more transceivers 3416 and 3422 may transmit user data, control information, and/or radio signals/channels, mentioned in the methods and/or operational flowcharts of this document, to one or more other devices. The one or more transceivers 3416 and 3422 may receive user data, control information, and/or radio signals/channels, mentioned in the descriptions, functions, procedures, proposals, methods, and/or operational flowcharts disclosed in this document, from one or more other devices. For example, the one or more transceivers 3416 and 3422 may be connected to the one or more processors 3412 and 3426 and transmit and receive radio signals. For example, the one or more processors 3412 and 3426 may perform control so that the one or more transceivers 3416 and 3422 may transmit user data, control information, or radio signals to one or more other devices. The one or more processors 3412 and 3426 may perform control so that the one or more transceivers 3416 and 3422 may receive user data, control information, or radio signals from one or more other devices. The one or more transceivers 3416 and 3422 may be connected to the one or more antennas 3418 and 3428, and the one or more transceivers 3416 and 3422 may be configured to transmit and receive user data, control information, and/or radio signals/channels, mentioned in the descriptions, functions, procedures, proposals, methods, and/or operational flowcharts disclosed in this document, through the one or more antennas 3418 and 3428. In this document, the one or more antennas may be a plurality of physical antennas or a plurality of logical antennas (e.g., antenna ports). The one or more transceivers 3416 and 3422 may convert received radio signals/channels etc. from RF band signals into baseband signals in order to process received user data, control information, radio signals/channels, etc. using the one or more processors 3412 and 3426. The one or more transceivers 3416 and 3422 may convert the user data, control information, radio signals/channels, etc. processed using the one or more processors 3412 and 3426 from the base band signals into the RF band signals. To this end, the one or more transceivers 3416 and 3422 may include (analog) oscillators and/or filters.

Figure 35:
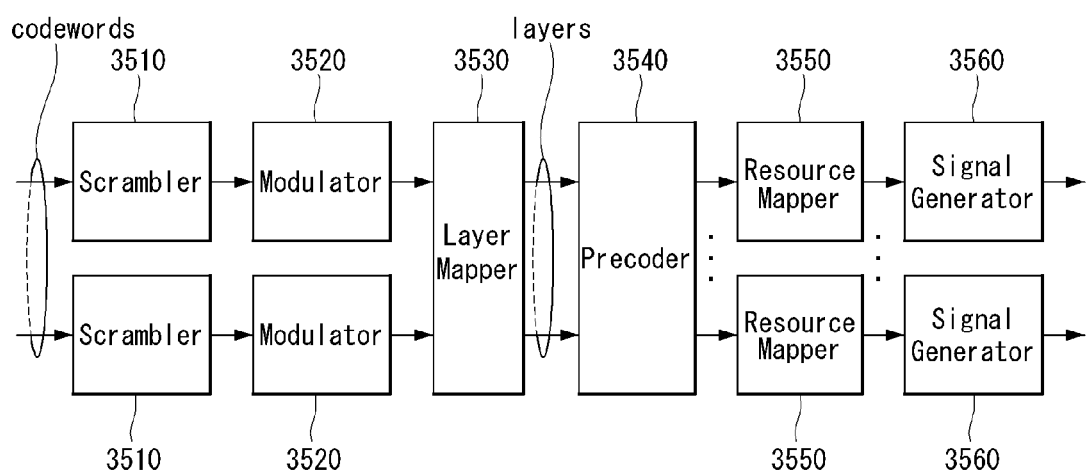
FIG. 35 illustrates a signal processing circuit for a transmit signal applicable to the present disclosure.

FIG. 35 illustrates a signal processing circuit for a transmit signal applicable to the present disclosure.

Referring to FIG. 35, a signal processing circuit 1000 may include a scrambler 3510, a modulator 3520, a layer mapper 3530, a precoder 3540, a resource mapper 3550, and a signal generator 3560. An operation/function of FIG. 35 may be performed by, but not limited to, the processors 3412 and 3426 and/or the transceivers 3416 and 3422 of FIG. 34. The hardware elements of FIG. 35 may be implemented in the processors 3412 and 3426 and/or the transceivers 3426 and 3422 of FIG. 34. For example, the blocks 3510 to 3560 may be implemented in the processors 3412 and 3426 of FIG. 34. Further, the blocks 3510 to 3550 may be implemented in the processors 3412 and 3426 of FIG. 34, and the block 3560 may be implemented in the transceivers 3416 and 3422 of FIG. 34.

Codeword may be transformed into a radio signal via the signal processing circuit 1000 of FIG. 35. Here, the codeword is an encoded bit sequence of information blocks. The information blocks may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 3510. A scramble sequence used for scrambling may be generated based on an initialization value and the initialization value may include ID information of a wireless device. The scrambled bit sequence may be modulated into a modulated symbol sequence by the modulator 3520. A modulation scheme may include pi/2-BPSK(pi/2-Binary Phase Shift Keying), m-PSK (m-Phase Shift Keying), m-QAM (m-Quadrature Amplitude Modulation), etc. A complex modulated symbol sequence may be mapped to one or more transport layers by the layer mapper 3530. Modulated symbols of each transport layer may be mapped to a corresponding antenna port(s) by the precoder 3540 (precoding). Output z of the precoder 3540 may be obtained by multiplying output y of the layer mapper 3530 by precoding matrix W of N*M. Here, N represents the number of antenna ports, and M represents the number of transport layers. Here, the precoder 3540 may perform precoding after performing transform precoding (e.g., DFT transform) for complex modulated symbols. Further, the precoder 3540 may perform the precoding without performing the transform precoding.

The resource mapper 3350 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 3560 may generate the radio signal from the mapped modulated symbols and the generated radio signal may be transmitted to another device through each antenna. To this end, the signal generator 3560 may include an Inverse fast Fourier Transform (IFFT) module, a Cyclic Prefix (CP) inserter, a Digital-to-Analog Converter (DAC), a frequency uplink converter, and the like.

A signal processing process for a receive signal in the wireless device may be configured in the reverse of the signal processing process (3510 to 3560) of FIG. 35. For example, the wireless devices (e.g., 3410 and 3420 of FIG. 34) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Figure 36:
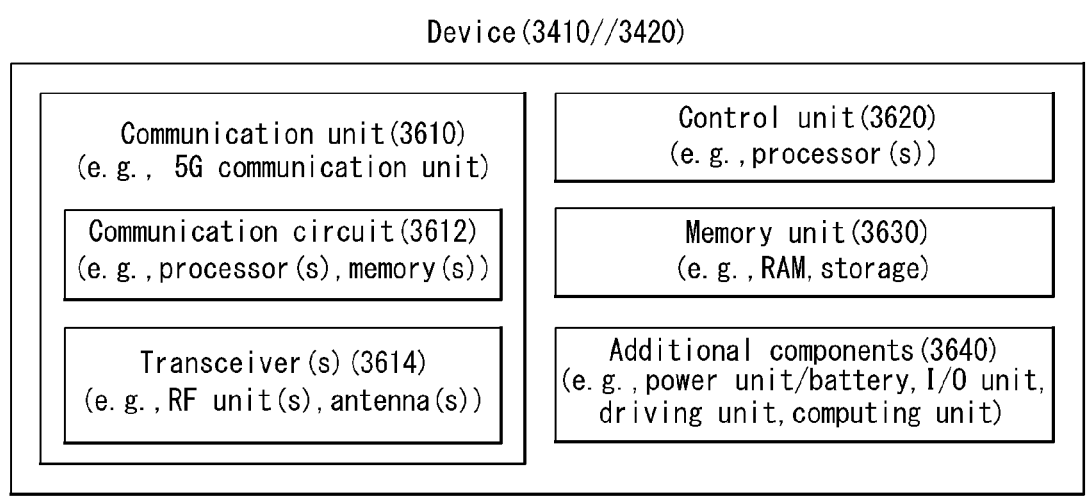
FIG. 36 shows another example of a wireless device applied to the present disclosure.

FIG. 36 shows another example of a wireless device applied to the present disclosure.

The wireless device may be implemented in various forms according to a use-case/service.

Referring to FIG. 36, the wireless devices may correspond to the wireless devices 3410 and 3420 of FIG. 34, and may be configured by various elements, components, units/portions, and/or modules. For example, each of the wireless devices 3410 and 3420 may include a communication unit 3610, a control unit 3620, a memory unit 3630, and additional components 3640. The communication unit may include a communication circuit 3612 and a transceiver(s) 3614. For example, the communication circuit 3612 may include the one or more processors 3412 and/or 3426 and/or the one or more memories 3414 and 3424 of FIG. 34. For example, the transceiver(s) 3612 may include the one or more transceivers 3416 and 3422 and/or the one or more antennas 3418 and 3428 of FIG. 34. The control unit 3620 is electrically connected to the communication unit 3610, the memory 3630, and the additional components 3640 and controls the overall operation of the wireless device. For example, the control unit 3620 may control an electric/mechanical operation of the wireless device based on programs/code/commands/information stored in the memory unit 3630. The control unit 3620 may transmit the information stored in the memory unit 3630 to the outside (e.g., other communication devices) over a wireless/wired interface through the communication unit 3610, or store, in the memory unit 3630, information received from the outside (e.g., other communication devices) over a wired/wireless interface through the communication unit 3610.

The additional components 3640 may be configured in various ways depending on the type of the wireless device. For example, the additional components 140 may include at least one of a power unit/battery, input/output (I/O) unit, a driving unit, and a computing unit. The wireless device may be configured as, but not limited to, a robot, a vehicle, an XR device, a handheld device, a home appliance, an IoT device, a digital broadcast terminal, a hologram device, a public safety device, an MTC device, a medical device, a fintech device (or a financial device), a security device, a climate/environmental device, an AI server/device, a base station, a network node, etc. The wireless device may be mobile or may be used in a fixed place depending on usage/service.

In FIG. 36, all of the various elements, components, units/portions, and/or modules in the wireless devices 3410 and 3420 may be connected to each other through a wired interface, or at least some thereof may be wirelessly connected through the communication unit 3410. For example, the control unit 3620 and the communication unit 3610 may be connected via wires within the wireless devices 3410 and 3420, and the control unit 3620 and a first unit (e.g., 3630 and 3640) may be connected wirelessly through the communication unit 3610. In addition, each of the elements, components, units/portions, and/or modules in the wireless device 3410 and 3420 may further include at least one element. For example, the control unit 3620 may include at least one processor set. For example, the control unit 3620 may be configured as a set of a communication control processor, an application processor, an electronic control unit (ECU), a graphics processing processor, a memory control processor, and the like. In another example, the memory unit 3430 may include a random access memory (RAM), a dynamic RAM (DRAM), a read-only memory (ROM), a flash memory, a volatile memory, a non-volatile memory, and/or a combination thereof.

In the aforementioned embodiments, the elements and characteristics of the present disclosure have been combined in specific forms. Each of the elements or characteristics may be considered to be optional unless otherwise described explicitly. Each of the elements or characteristics may be implemented in a form to be not combined with other elements or characteristics.

Furthermore, some of the elements and/or the characteristics may be combined to form an embodiment of the present disclosure. The sequence of the operations described in the embodiments of the present disclosure may be changed. Some of the elements or characteristics of an embodiment may be included in another embodiment or may be replaced with corresponding elements or characteristics of another embodiment.

It is evident that an embodiment may be constructed by combining claims not having an explicit citation relation in the claims or may be included as a new claim by amendments after filing an application.

The embodiments of the present disclosure may be implemented by various means, for example, hardware, firmware, software, or a combination thereof. In a hardware implementation, an embodiment of the present disclosure may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be materialized in other specific forms without departing from the essential characteristics of the present disclosure.

Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

INDUSTRIAL APPLICABILITY

Although a scheme for requesting scheduling for uplink data transmission in a wireless communication system has been described with reference to an example applied to a 3GPP LTE/LTE-A system, the scheme also may be applied to various wireless communication systems in addition to the 3GPP LTE/LTE-A system.

The invention claimed is:

1. A method for accessing a cell that supports standalone machine type communication (sMTC) in a wireless communication system, which is performed by the terminal, the method comprising:
receiving one system information block (SIB) among a plurality of SIBs from a base station,
wherein the one SIB includes first instruction information related to barring cell access of terminals supporting services other than the sMTC;
performing the cell access; and
performing a specific operation related to the sMTC, based on that the cell does not permit the cell access of the terminals supporting other services than the sMTC based on the first instruction information.

2. The method of claim 1, wherein the specific operation is an operation of recognizing that a cell-specific reference signal (CRS) is not transmitted in the cell.

3. The method of claim 1, wherein the specific operation is an operation of receiving downlink data/control information for terminals supporting sMTC in an LTE (Long-Term-Evolution) control region which is a resource region where control information of terminals supporting the LTE is transmitted.

4. The method of claim 1, further comprising:
receiving a master information block (MIB) containing second indication information related to permitting the cell access from the terminals supporting the sMTC, wherein the cell access is performed based on the second indication information.

5. The method of claim 4, wherein the MIB is scrambled and transmitted through a specific scrambling sequence for the sMTC.

6. The method of claim 5, wherein an initialization sequence for the specific scrambling sequence is different from that of a scrambling sequence for supporting the other services.

7. The method of claim 4, wherein the MIB is masked with a specific CRC (cyclic redundancy check) sequence for the sMTC and transmitted.

8. The method of claim 7, wherein the MIB is recognized as one for the sMTC based on the specific CRC sequence.

9. The method of claim 1, wherein the other services are LTE and eMTC (Enhanced Machine Type Communication).

10. The method of claim 1, wherein the one SIB is transmitted for a first time among the plurality of SIBs.

11. The method of claim 1, wherein the terminal is a terminal supporting sMTC, and the terminals supporting the other services are an eMTC terminal and a legacy LTE terminal.

12. The method of claim 1, further comprising:
receiving a synchronization signal mapped to a resource region in a specific pattern,
wherein the specific pattern is that a pattern in which the LTE primary synchronization signal (PSS) and/or the LTE secondary synchronization signal (SSS) is mapped to the resource domain is time/frequency inverted; and
acquiring second indication information related to permitting the cell access of the terminals supporting the sMTC.

13. The method of claim 1, further comprising:
acquiring second indication information related to permitting the cell access of the terminals supporting the sMTC, based on a specific pattern in which a specific number of OFDM (orthogonal frequency division multiplexing) symbols constituting a physical broadcast channel (PBCH) are copied to an LTE control region which is a resource region where control information of terminals supporting LTE is transmitted.

14. The method of claim 13, wherein the specific pattern includes one or more different OFDM symbols among the specific number of OFDM symbols based on that some of the specific number of OFDM symbols are copied to the LTE control region, and
wherein the one or more different OFDM symbols are arranged in a random order within the specific pattern.

15. The method of claim 1, further comprising:
receiving configuration information of a DRX (discontinuous reception) mode from the base station,
wherein the first indication information is received during a listening interval of the DRX mode.

16. A method for accessing a cell of a terminal in a wireless communication system, which is performed by a base station, the method comprising:
transmitting one system information block (SIB) among a plurality of SIBs to the terminal,
wherein the one SIB includes first instruction information related to barring cell access of terminals supporting services other than the sMTC;
performing the cell access with the terminal,
wherein the terminal performs a specific operation related to the sMTC, based on that the cell does not permit the cell access of the terminals supporting other services than the sMTC based on the first instruction information.

17. A terminal for performing cell access by a base station in a wireless communication system, the terminal comprising:
- a transmitter for transmitting a radio signal;
- a receiver for receiving the radio signal; and
- a processor functionally connected to the transmitter and the receiver,
- wherein the processor controls to:
- receive one system information block (SIB) among a plurality of SIBs from a base station,
- wherein the one SIB includes first instruction information related to barring cell access of terminals supporting services other than the sMTC;
- perform the cell access; and
- perform a specific operation related to the sMTC, based on that the cell does not permit the cell access of the terminals supporting other services than the sMTC based on the first instruction information.

* * * * *